US009497495B2

(12) United States Patent
Krishnamoorthi et al.

(10) Patent No.: US 9,497,495 B2
(45) Date of Patent: Nov. 15, 2016

(54) APPARATUS AND METHODS OF PROVIDING AND RECEIVING VENUE LEVEL TRANSMISSIONS AND SERVICES

(71) Applicant: QUALCOMM Incorporated, San Diego, CA (US)

(72) Inventors: Raghuraman Krishnamoorthi, San Diego, CA (US); Pankaj V. Rahate, San Diego, CA (US); Pankaj Jain, San Diego, CA (US); Devarshi P. Shah, San Diego, CA (US); Pavel A. Seliverstov, San Diego, CA (US); George A. Rothrock, San Diego, CA (US); Nilabh Khare, San Diego, CA (US); Anil K. Wadhwani, San Diego, CA (US); Jiming Guo, Beijing (CN); Sanjiv Nanda, San Diego, CA (US); Fuyun Ling, San Diego, CA (US); Murali R. Chari, San Diego, CA (US); Avneesh Agrawal, San Diego, CA (US); Rinat Burdo, San Diego, CA (US); Prasanna Kannan, San Diego, CA (US); Krishna K. Mukkavilli, San Diego, CA (US); Reynaldo W. Newman, San Diego, CA (US); Michael M. Fan, Beijing (CN); Manoj M. Deshpande, San Diego, CA (US); Ranjith S. Jayaram, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 153 days.

(21) Appl. No.: 14/102,342

(22) Filed: Dec. 10, 2013

(65) Prior Publication Data

US 2014/0223479 A1 Aug. 7, 2014

Related U.S. Application Data

(62) Division of application No. 12/569,792, filed on Sep. 29, 2009, now Pat. No. 8,635,645.

(60) Provisional application No. 61/101,545, filed on Sep. 30, 2008, provisional application No. 61/106,409, (Continued)

(51) Int. Cl.
*H04N 21/2385* (2011.01)
*H04L 12/18* (2006.01)
(Continued)

(52) U.S. Cl.
CPC ........ *H04N 21/2385* (2013.01); *H04L 12/189* (2013.01); *H04L 67/16* (2013.01);
(Continued)

(58) Field of Classification Search
CPC ............ H04N 21/2385; H04N 21/482; H04L 12/189; H04L 67/16; H04L 67/18; H04W 4/02; H04W 4/04; H04W 72/005
See application file for complete search history.

(56) References Cited

U.S. PATENT DOCUMENTS 6,181,955 B1 * 1/2001 Dartois ................ H01Q 3/2682
342/368
6,363,260 B1 3/2002 Achour et al.
(Continued)

FOREIGN PATENT DOCUMENTS

| CN | 1607400 A | 4/2005 |
|---|---|---|
| WO | WO-0103464 | 1/2001 |
| WO | WO-2006110445 A1 | 10/2006 |

OTHER PUBLICATIONS

International Search Report and Written Opinion—PCT/US09/059029, International Search Authority—European Patent Office, May 6, 2010.

*Primary Examiner* — Chi H Pham
*Assistant Examiner* — Weibin Huang
(74) *Attorney, Agent, or Firm* — Norton Rose Fulbright US LLP

(57) ABSTRACT

A venue-cast system and method for providing and receiving venue level transmissions and services, including discovery of a venue specific transmission by receiving an overhead signal from a non-venue network, extracting information for receiving the venue specific transmission from the overhead signal, and tuning to receive the venue specific transmission based on the extracted information. The venue level transmission may be provided and received in a manner that does not prevent an access terminal from receiving a local area or wide area transmission.

34 Claims, 50 Drawing Sheets

Related U.S. Application Data filed on Oct. 17, 2008, provisional application No. 61/108,828, filed on Oct. 27, 2008, provisional application No. 61/144,055, filed on Jan. 12, 2009, provisional application No. 61/147,990, filed on Jan. 28, 2009, provisional application No. 61/101,992, filed on Oct. 1, 2008, provisional application No. 61/101,994, filed on Oct. 1, 2008.

(51) Int. Cl.
*H04W 4/02* (2009.01)
*H04W 72/00* (2009.01)
*H04L 29/08* (2006.01)
*H04N 21/482* (2011.01)
*H04W 4/04* (2009.01)
*H04W 48/16* (2009.01)

(52) U.S. Cl.
CPC ........... *H04L 67/18* (2013.01); *H04N 21/482* (2013.01); *H04W 4/02* (2013.01); *H04W 4/04* (2013.01); *H04W 72/005* (2013.01); *H04W 48/16* (2013.01)

(56) References Cited

U.S. PATENT DOCUMENTS

| | | |
|---|---|---|
| 6,578,203 B1 | 6/2003 | Anderson, Jr. et al. |
| 7,124,425 B1 | 10/2006 | Anderson, Jr. et al. |
| 7,149,549 B1 | 12/2006 | Ortiz et al. |
| 7,376,388 B2 | 5/2008 | Ortiz et al. |
| 7,676,250 B2 | 3/2010 | Rokusek et al. |
| 8,280,368 B2 | 10/2012 | Mantravadi et al. |
| 2002/0089421 A1 | 7/2002 | Farringdon et al. |
| 2003/0007464 A1 | 1/2003 | Balani |
| 2003/0134622 A1* | 7/2003 | Hsu ............... H04W 76/002 455/414.1 |
| 2003/0208595 A1 | 11/2003 | Gouge et al. |
| 2005/0020277 A1 | 1/2005 | Krumm et al. |
| 2005/0122928 A1 | 6/2005 | Vijayan et al. |
| 2006/0003775 A1* | 1/2006 | Bull ............... G01S 5/0205 455/456.1 |
| 2006/0126556 A1* | 6/2006 | Jiang ............... H04L 12/18 370/328 |
| 2006/0174271 A1 | 8/2006 | Chen et al. |
| 2006/0248090 A1 | 11/2006 | Bennett et al. |
| 2007/0127476 A1 | 6/2007 | Seppala |
| 2007/0149212 A1* | 6/2007 | Gupta ............... H04L 67/18 455/456.1 |
| 2007/0204294 A1* | 8/2007 | Walker ............ H04L 12/18 725/38 |
| 2007/0208749 A1 | 9/2007 | Price et al. |
| 2007/0225911 A1 | 9/2007 | Chanick |
| 2007/0232251 A1 | 10/2007 | Murthy et al. |
| 2007/0232366 A1 | 10/2007 | Chen et al. |
| 2007/0293250 A1 | 12/2007 | Kim |
| 2010/0080163 A1 | 4/2010 | Krishnamoorthi et al. |

* cited by examiner

Advertising Opportunities

Usability Options Screen

APPARATUS AND METHODS OF PROVIDING AND RECEIVING VENUE LEVEL TRANSMISSIONS AND SERVICES

The present application is a divisional of commonly assigned, patent application Ser. No. 12/569,792 entitled "APPARATUS AND METHODS OF PROVIDING AND RECEIVING VENUE LEVEL TRANSMISSIONS AND SERVICES," filed Sep. 29, 2009, which itself claims priority to Provisional Application No. 61/101,545 entitled "SYSTEM AND METHOD FOR PROVIDING MOBILE TV TO A VENUE" filed Sep. 30, 2008, Provisional Application No. 61/106,409 entitled "SYSTEM AND METHOD FOR PROVIDING MOBILE TV TO A VENUE" filed Oct. 17, 2008, Provisional Application No. 61/108,828 entitled "INTEGRATED TERRESTRIAL BROADCAST AND LOCAL-AREA VENUE-CAST SERVICE OPERATION VIA ALTERNATIVE AIR-INTERFACE TECHNOLOGIES" filed Oct. 27, 2008, Provisional Application No. 61/144,055 entitled "INTEGRATED TERRESTRIAL BROADCAST AND LOCAL-AREA VENUE-CAST SERVICE OPERATION VIA ALTERNATIVE AIR-INTERFACE TECHNOLOGIES" filed on Jan. 12, 2009, and Provisional Application No. 61/147,990 entitled "VENUE CASTING IN MUSIC CONCERTS" filed Jan. 28, 2009, Provisional Application No. 61/101,992 entitled "SERVICE AND APPLICATION MANAGEMENT FRAMEWORK FOR VENUE-SPECIFIC SERVICES" filed Oct. 1, 2008, Provisional Application No. 61/101,994 entitled "DESIGN FOR IN-BAND VENUE-CAST OVER" filed Oct. 1, 2008, each of which is assigned to the assignee hereof and the entire contents of each of which are hereby expressly incorporated by reference herein.

BACKGROUND

Electronic devices such as mobile telephone handsets and other terminals may be configured to receive a variety of multimedia content items, such as sports, entertainment, informational programs, or other multimedia content items via broadcast, multicast or unicast transmission.

Visitors to venues, such as theme parks, shopping malls, stadiums, trade shows, conventions, campuses, cruise ships, concert halls, airports, museums, and fairs, have a plethora of options for attractions or items of interest within the venue. As such, these visitors often have a desire for venue related information. In traditional broadcasting, the smallest addressable area of broadcast content is the Local-area Operational Infrastructure (LOI), which covers a defined geographical region. For example, the smallest LOIs generally correspond to a metropolitan region. As with all broadcasts over a large geographic area, difficulties arise in addressing content to consumers having varying interests within the large broadcast area. Therefore, there is a need for a service that transmits content on a smaller, venue scale so that venue specific information can be provided to venue visitors.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Aspects described in the application enable the benefits of broadcast to be applied to smaller venues, such as an amusement park, concert hall, sporting event, shopping center, restaurant, airport, or museum.

Aspects include a method for discovery of a venue specific transmission, comprising receiving an overhead signal from a non-venue network; extracting information for receiving the venue specific transmission from the overhead signal; and tuning to receive the venue specific transmission based on the extracted information.

Aspects may further include the overhead signal being received from a BCMCS network or from a mobile broadcast network having a coverage area in which the venue is located.

Aspects may further include receiving the venue specific transmission during a first time slot in a mobile broadcast transmission, receiving a transmission from the non-venue network during a second time slot that overlaps and extends beyond the first time slot, receiving the transmission from the non-venue network only on a reserved portion of the frequency band during the first time slot, receiving the venue specific transmission on at least a portion of the frequency band, receiving a second overhead signal from a venue transmitter on the frequency band, wherein further identification information for the venue specific transmission is included within the second overhead signal, receiving a pilot positioning channel signal, wherein a first portion of the pilot positioning channel signal is received from the non-venue network and a second portion of the pilot positioning channel signal is received from a venue transmitter, and/or detecting the availability of a supplemental service guide, requesting the supplemental service guide via one of a unicast, a scheduled multicast, and a scheduled broadcast.

The information for receiving the venue specific transmission includes information about the type of venue specific transmission and an energy ratio for the venue specific transmission.

The overhead signal from the non-venue transmitter may be received during a first time slot and the overhead signal from the venue transmitter is received during a second time slot reserved for venue transmission overhead information.

A portion of the pilot positioning channel may be reserved portion of the frequency band that is reserved for transmissions from the non-venue network during an inactive state.

Aspects may further include storing information regarding the geographic boundary for the venue transmission, monitoring a current location, and when the current location is within the geographic boundary for the venue transmission, searching for the venue transmission.

Aspects may further include receiving user input to search for a venue specific transmission, and searching for service relating to venue specific transmission in response to receiving the user input.

The extracted may include at least one of a frequency on which the venue transmission is transmitted, a venue identifier, a type of venue transmission, and information on obtaining a service guide for the venue transmission.

Further aspects include an apparatus for receiving a venue specific transmission, comprising means for receiving an overhead signal from a non-venue network; means for extracting information for receiving the venue specific transmission from the overhead signal; and means for tuning to receive the venue specific transmission based on the extracted information.

Further aspects may include a computer program product, comprising: a computer-readable medium comprising: code for causing a computer to receive an overhead signal from a non-venue network; code for causing a computer to extract information for receiving a venue specific transmission from the overhead signal; and code for causing a computer to tune to receive the venue specific transmission based on the extracted information.

Further aspects may include apparatus for receiving a venue specific transmission, comprising a receiver for receiving an overhead signal from a non-venue network; a processor for extracting information for receiving the venue specific transmission from the overhead signal; and a communications component for tuning to receive the venue specific transmission based on the extracted information Further aspects may include the receiver being configured to receive the venue specific transmission during a first time slot in a mobile broadcast transmission; the receiver being configured to receive a transmission from the non-venue network during a second time slot that overlaps and extends beyond the first time slot; the receive receiving at least a portion of the non-venue network transmission and the venue specific transmission on a frequency band, and being configured to receive the transmission from the non-venue network only on a reserved portion of the frequency band during the first time slot; the overhead signal being received on a frequency band, and the receiver being configured to receive the venue specific transmission on at least a portion of the frequency band; the information for receiving the venue specific transmission including information about the type of venue specific transmission and an energy ratio for the venue specific transmission; the receiver being configured to receive a second overhead signal from a venue transmitter on the frequency band, wherein further identification information for the venue specific transmission is included within the second overhead signal; the overhead signal from the non-venue transmitter being received during a first time slot and the overhead signal from the venue transmitter being received during a second time slot reserved for venue transmission overhead information; the receiver being configured to receive a pilot positioning channel signal, wherein a first portion of the pilot positioning channel signal is received from the non-venue network and a second portion of the pilot positioning channel signal is received from a venue transmitter; a third portion of the pilot positioning channel being reserved portion of the frequency band that is reserved for transmissions from the non-venue network during an inactive state, and/or the extracted information including at least one of a frequency on which the venue transmission is transmitted, a venue identifier, a type of venue transmission, and information on obtaining a service guide for the venue transmission.

The apparatus may further include memory storing information regarding the geographic boundary for the venue transmission; a location determination component configured to monitor a current location of the apparatus; a service detection component configured to search for the venue specific transmission when the current location is within the geographic boundary for the venue specific transmission; a user interface to receive user input to search for a venue transmission; a service detection component configured to search for service relating to venue transmission in response to receiving the user input; and/or a service guide component for detecting the availability of a supplemental service guide.

The service guide component may be further configured to request a supplemental service guide via one of a unicast, a scheduled multicast, and a scheduled broadcast.

Aspects may further include a method of receiving venue specific content at a mobile device, the method comprising: receiving information regarding the availability of a venue transmission; extracting information for receiving the venue transmission; receiving the venue transmission; decoding the content of the venue transmission; and providing the decoded content for presentation at the mobile device.

Aspects may further include a method of transmitting venue specific content, the method comprising: receiving venue specific content from a venue content provider; and receiving information regarding a local area transmission; and transmitting the venue specific content in combination with the local area transmission at a venue transmitter.

Aspects may further include a method of transmitting venue specific content to a venue coverage area, the method comprising: receiving venue specific content from a content provider; and transmitting the venue specific content to a venue coverage area via a static Broadcast Multicast Service (BCMCS).

Aspects may further include a method of wirelessly transmitting venue specific content, the method comprising receiving venue specific content from a content provider; providing overhead information to enable an access terminal to access the venue-specific content; and transmitting the venue specific content to a plurality of access terminals within a boundary of the venue.

A method of planning a visit to a venue through the reception of a venue specific transmission at a mobile device, the method comprising receiving a venue transmission of information regarding the availability of a plurality of attractions at the venue; receiving a venue transmission with the wait time for each of the plurality of attractions at the venue; creating a list of available attractions; determining a first location of the mobile device within the venue; receive a user input identifying desired attractions within the list of available attractions; removing all attractions from the list, if the attraction was not identified as a desired attraction; determining the time required to reach each desired attraction from the first location of the mobile device; determining a total visit time for each desired attraction by adding the time to reach the desired attraction to the received wait time; selecting a first attraction having the minimum total visit time; and displaying the selected attraction.

Aspects may further include a method of indicating that a venue dedicated mobile device is outside the venue, the method comprising: storing a defined first geographic area in the mobile device, the geographic area being within the venue; determining the geographic location of the mobile device; determining if the mobile device is located within the defined first area; and signaling an alarm, if the mobile device is determined to be within the defined first area.

Aspects may further include a method of indicating that a venue dedicated mobile device is outside the venue, the method comprising: storing a defined central point of the venue; storing a defined periphery of the venue; determining the geographic location of the mobile device; determining if the mobile device is located between the central point and the defined periphery; and signaling an alarm, if the mobile device is determined to not be between the central point and the defined periphery.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
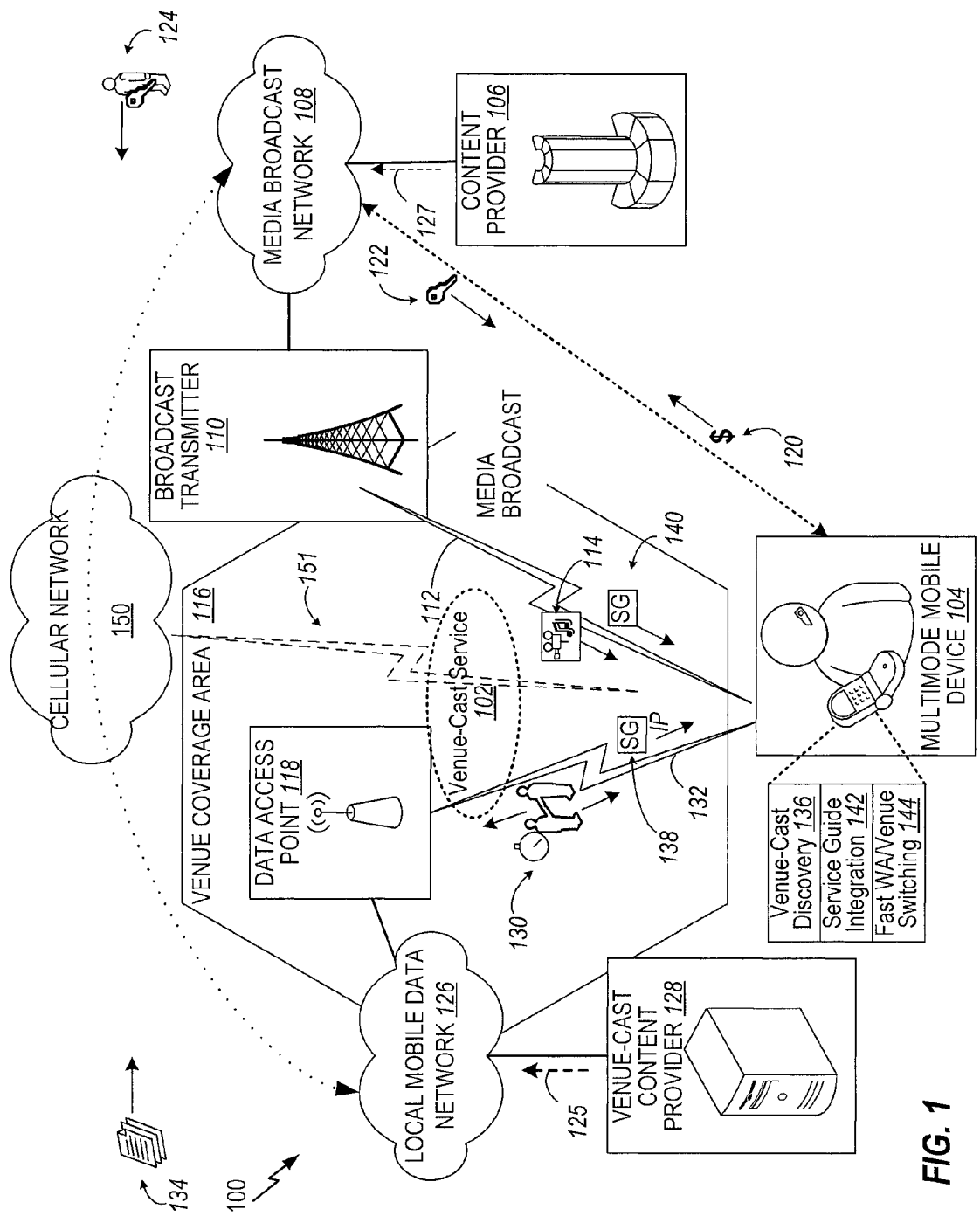
FIG. 1 depicts a block diagram of a mobile broadcast system enables a venue-cast service for consumers who use multi-mode mobile devices.

Visitors to venues are often interested in venue related information. The described aspects provide a transmission service on a geographic scale associated with the venue, thereby providing venue visitors with venue-related information. As used herein, the term "venue" or the terms "geographic scale associated with a venue" mean a location at which an event or local hotspot is present, or an area where a number of people gather for a common activity or interest. A venue transmission is also referred to interchangeably herein as a venue-cast. A venue-cast system may include applications directed to the venue-specific information. The venue information may be either previously created information, live information, or a combination of previously created information and live information. The transmission may be targeted to dedicated devices that may be purpose built for the venue, to multipurpose wireless mobile devices that can be used beyond a particular venue, or to a combination of dedicated and multi-purpose devices.

The venue-cast system may transmit information via unicast, multicast, and/or broadcast. It is noted that broadcast provides spectral efficiencies over unicast or multicast, and can provide content to a large number of users at a lower cost. Any of these technologies, however, may be applied in a venue-cast system.

As with all broadcasts over a large geographic area, difficulties arise in addressing content to consumers having varying interests within the broadcast area. To enable broadcasts to address varying interests within the broadcast area, the described aspects provide a larger area delivery of general content that is integrated with a smaller area delivery of venue-specific content. For example, the described aspects enhance the service coverage of terrestrial mobile TV, as well as providing value-added service to mobile broadband services, such as 3G cdma2000. This type of event-based or venue-based service, referred to as venue-cast, has the potential of becoming an attractive value-added service to current mobile broadcast customers.

The described aspects efficiently deliver the venue-cast content to mobile broadcast customers and enhance the user experience with a smooth integration at a mobile device between venue-cast channels, such as may be received from a WAN or hotspot technology, and broadcast channels, such as may be received from a mobile broadcast technology, including but not limited to a FLO channel in the MediaFLO™ system or other wireless network broadcast technologies. MediaFLO™ technology is described in further detail in "Flo™ Technology Overview" available via Floforum at http://www.floforum.org/technology/MF_WP_TechOverview.pdf and "Mux to Transmit Station Interface (MTI) Document available via Floforum at http://www.floforum.org, the entire contents of both of which are herein incorporated by reference.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

With reference to FIG. 1, a mobile broadcast system 100 enables a venue-cast service 102 provided by a local data access point 118 utilizing a unicast, multicast or broadcast technology to be integrated with a broadcast service 112, such as a wide area broadcast service, provided by a media broadcast network 108, for consumers who use purpose-built or multi-mode mobile devices 104. Also illustrated is cellular network 150 that transmits signal 151 to device 104. For example, some of the illustrative applications include mobile TV, mobile advertisement, and up-to-date media distribution via clip-cast and data-cast, and any venue- or location-specific content. In some aspects, for example, the venue-cast service may use a broadcast service such as a MediaFLO™ type broadcast. In other aspects, for example, the venue-cast service 102 can leverage a static Broadcast and Multicast Service (BCMCS). In other aspects, the venue-cast service 102 can leverage a cellular network 150. Alternatively or in addition, venue-cast service 102 can combine unicast, dynamic BCMCS, and adaptive resource allocation to maximize air link efficiency, and enable dynamic on-site service features such as venue application download to enhance service flexibility.

Venue-cast content 125 is provided by venue-cast content provider 128 to access point 118, which transmits the venue-cast content 125 to one or more mobile devices 104, for example, via a venue-cast channel 132. Further, efficient delivery of other area content 127 received from a content provider 106 is managed by the media broadcast network (e.g., the MediaFLO™ system) 108. A broadcast transmitter 110 transmits a transmission 112 containing broadcast content, such as mobile television channels, to the mobile device 104. In one aspect, included in this media transmission 112 is one of a plurality of media channels 114 (e.g., audio, video, etc.). In the venue coverage area 116, mobile device 104 is operable to receive, process, and switch between both the wide area channel(s) 114 and the venue-cast channel(s) 132, enabling a user to experience both the wide area content 127 as well as the venue-cast content 125.

Thus, the described aspects enable mobile device 104 to provide a seamless user experience with access to venue-cast content 125 via a unicast, multicast or broadcast transmission, with wide area content 127 via a different transmission.

In order to receive a venue-cast channel 132, the mobile device 104 is advantageously augmented by a venue-cast discovery component 136 that detects the availability of a venue transmission, such as by detecting availability of a venue supplemental service guide (SG) 138. For example, as part of periodically waking up to check for pages by a radio access network (RAN), such as the broadcast network 108, the mobile device 104 can also listen for an Internet Protocol (IP) packet indicating the availability of venue-specific transmissions, such as announcing a current version of a venue supplemental service guide that can be requested via unicast or via a scheduled multicast or broadcast. If the mobile device 104 does not have the current version, for example, as determined based on a version number, then the mobile device 104 can obtain it based on the announcement. The mobile device 104 also may receive periodic updates to a broadcast network area service guide (SG) 140, which, for example, may be broadcast by the transmitter 110. A SG integration component 142 merges the information from the two SGs 138, 140 to generate a combined service guide, accessible via a user interface on mobile device 104, to provide a seamless user experience. In addition, a fast switch wide-area/venue switching component 144 keeps up-to-date on parameters for obtaining and presenting the venue-cast channel as well as the wide area broadcast channels, so that a user can rapidly switch between channels from the two different sources, in a manner similar to switching between two wide-area channels, which also enhances a seamless user experience.

Thus, the mobile broadcast system 100 delivers venue-cast service 102 via a local area or venue-specific network wireless network 126, in combination with a media broadcast service 112 via a second network 108, such as but not limited to MediaFLO™ system or other wireless broadcast systems, to users of multi-mode mobile devices 104 to provide an integrated service experience. The underlying local area or venue-specific network can be WAN or hotspot deployment providing a transmission received by multi-mode mobile device 104, for example, but not limited to, a multi-mode cellular/WiFi and broadcast/MediaFLO™ system terminal. Variations of the described system can also utilize other transmission technologies with the benefit of aspects disclosed herein.

Further, in order to provide optimal user experience in application-level integration of venue and wide area channels, the described aspects can provide efficient venue service discovery, efficient delivery of venue-cast content, seamless user interface (UI) operation with smooth channel switching between wide area and venue services and seamless service guide integration at the terminal, and venue-cast billing via subscription to one of the wide area packages or via on-the-spot on-demand charging. Deployment of these aspects can thus be localized broadcast in one cell, without interference from or interfering with neighboring cells. Alternatively, deployment can be localized broadcast over one tier of cells. As a further alternative, deployment can be localized broadcast over two tiers of cells. As yet another alternative, deployment can employ a dedicated carrier deployment.

Figure 2:
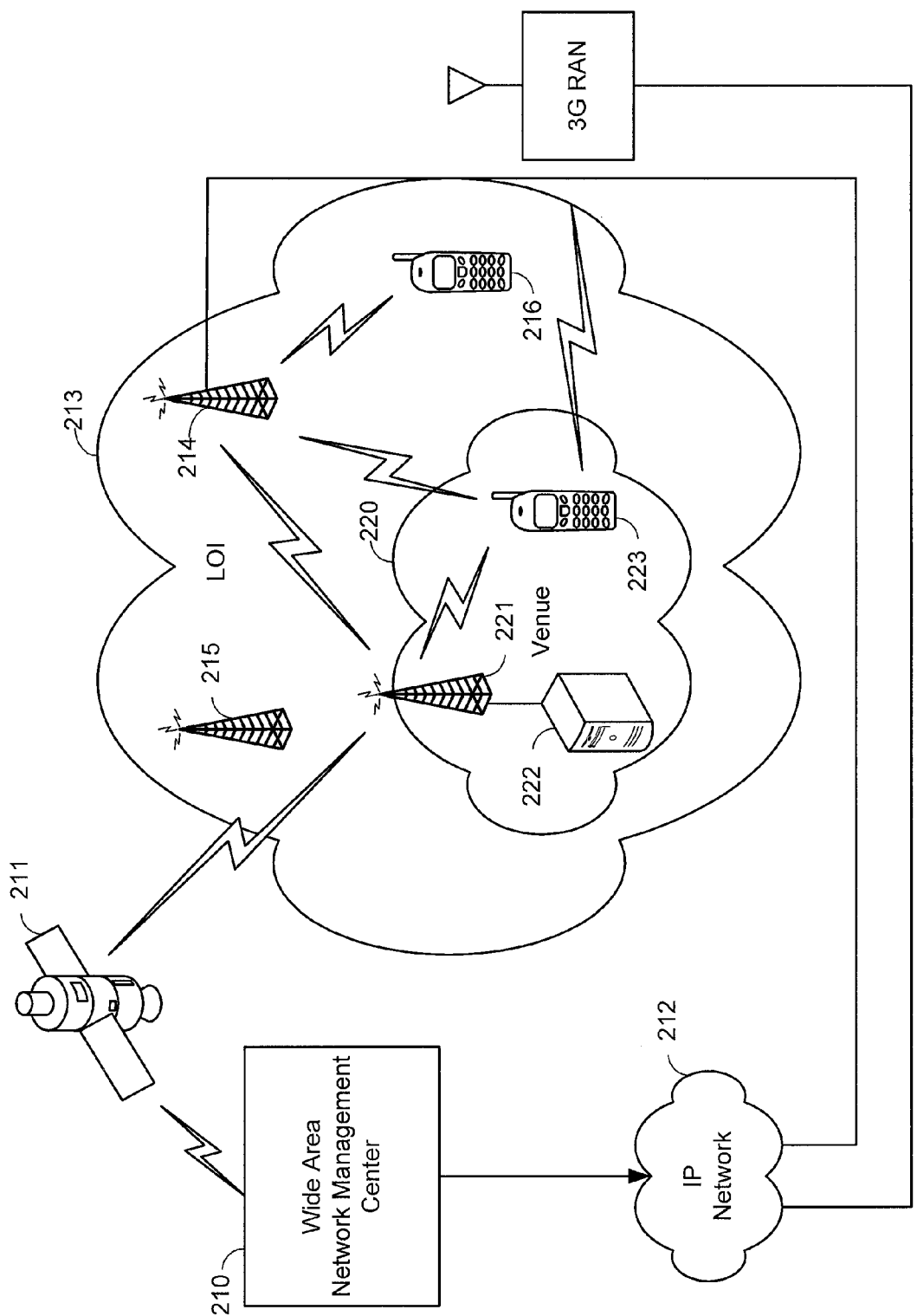
FIG. 2 depicts aspects of an exemplary system overview of a venue-cast transmission system.

FIG. 2 illustrates aspects of an exemplary system overview of a venue-cast system. FIG. 2 depicts a wide area infrastructure, such as a network management center 210, such a Network Operations Center that manages the transmission of a wide area content. For example, the wide area network management center 210 may transmit via satellite 211 or via an IP network 212. Local Operations Infrastructure (LOI) component 213 may receive the wide area transmission and insert local area information, thereby generating a combined transmission. This local combined transmission is sent over a local area transmission system. The local area transmission system may include a plurality of transmitters, such as 214 and 215.

The combined transmission may be created such that mobile device 216 inside the LOI coverage area, receiving separate transmissions of the wide area transmission and the local area combined transmission, will be able to decode both transmissions without interference.

Venue system 220 provides a venue-cast coverage area located at least partially within LOI 213. The venue-cast system includes at least one transmitter 221 at venue 220. Venue specific content is provided via a venue specific content feed 222 that may include real-time or pre-recorded content. The venue specific information is transmitted to a coverage area for the venue 220 via transmitter 221 in such a manner that it does not interfere with the reception of either the wide area or the local area transmissions by an access terminal 223 located within the venue coverage area. For example, in one aspect, the venue system 220 may receive either the wide or local area transmissions, such as via satellite or over-the-air, and may insert the venue content and transmit a venue-combined transmission.

The venue-cast system may include one or more of a locally situated Operations Center (OC), cameras, datacast servers, and one or more transmitters at the venue. The transmitters may transmit video, audio, and/or data streams. A video signal may include an audio component, very similar to a traditional TV model. An audio signal may be applied to views from multiple cameras, or each camera may include individual audio. The transmitters may be broadcast emitters, unicast emitters, and multicast emitters. Broadcast emitters may broadcast video, audio, and/or data streams, for example, via UHF. A venue broadcast network may include a one-way, linear, or looping format. The broadcast network may be based on the MediaFLO™ service from QUALCOMM, Inc. of San Diego, Calif.

The venue transmission system may further include an on-site network having an RF transmission subsystem including a power amplifier, transmitter, antenna, a modulator or exciter, an encoder, and/or a multiplexer. Additional on-site and off-site elements may be included in the venue transmission system in order to support insertion, interactivity, network management, provisioning, conditional access, and billing, as desired.

Figure 3:
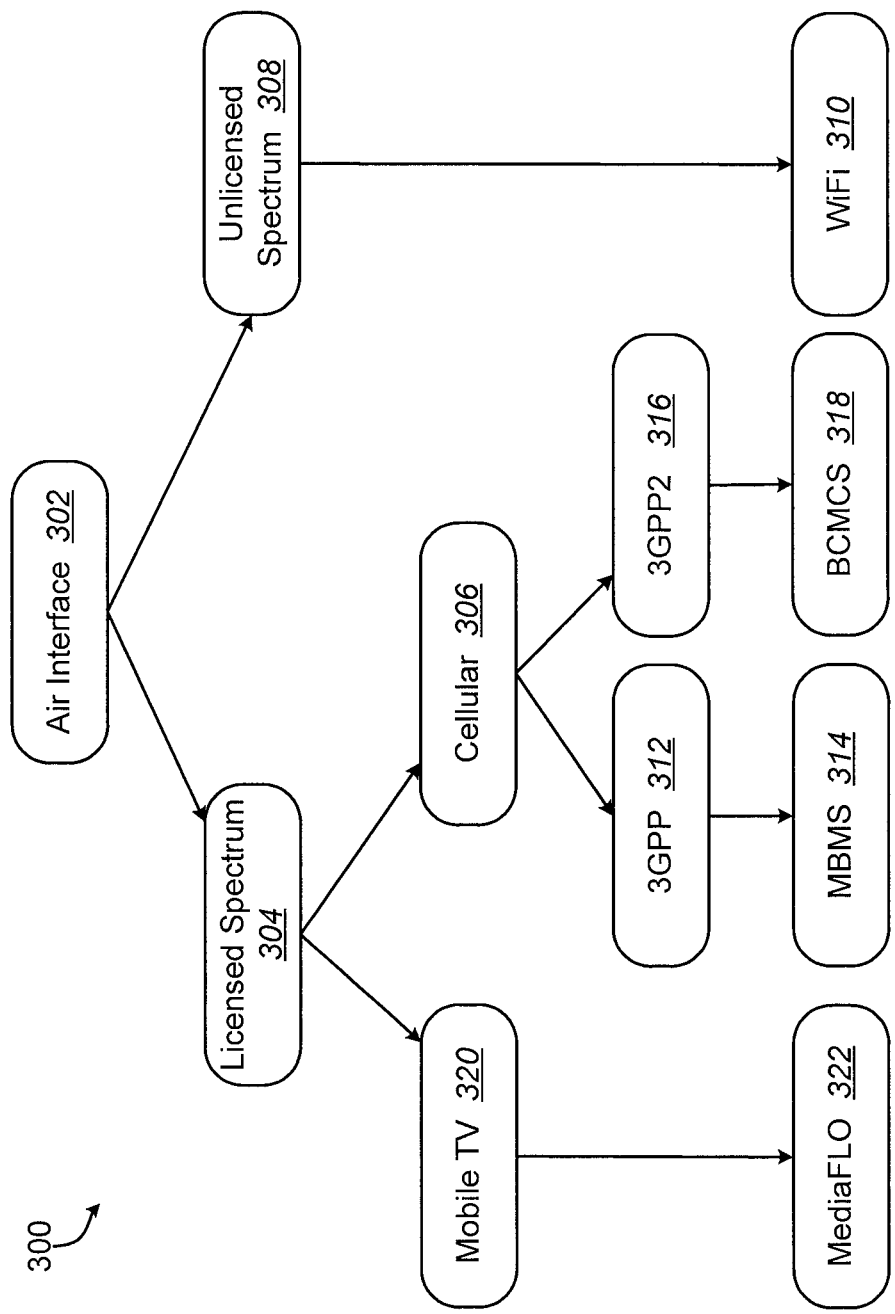
FIG. 3 depicts a delivery hierarchical block diagram of mobile broadcast content sent via an air interface in terms of licensed or unlicensed spectrum allocation.

With reference to FIG. 3, one aspect of a delivery hierarchy 300 of mobile broadcast content via an air interface 302 may be defined in terms of allocation across licensed spectrum 304 and unlicensed spectrum 308. It should be understood, however, that this is but one example, and that venue-cast service may be delivered via a licensed and/or unlicensed spectrum. Licensed spectrum 304 can be grouped into two classes. A first class of broadcast technologies ("cellular") 306 share the spectrum with unlicensed spectrum 308, such as wide-area network (WAN), often referred to as WiFi 310. Third-generation cellular class 306 includes a 3GPP category 312 including Multimedia Broadcast/Multicast Service (MBMS) 314 and 3GPP2 category 316 such as Broadcast-Multicast Service (BCMCS) 318. In particular, in such 3G systems (cdma2000 EV-DO or W-CDMA High Speed Packet Access (HSPA)), a fraction of the resource (time slots or code channels) are reserved from the WAN to deliver broadcast content. Examples of these technologies include EV-DO BCMCS and W-CDMA MBMS. The second class of licensed broadcast technologies provide content delivery over dedicated spectrums via terrestrial mobile TV 320, in which case the entire frequency band is allocated to broadcast at all times. Examples of mobile TV 320 include, but are not limited to, MediaFLO™, DVB-H, ISDB-T and/or T-DMB systems 322. Given the similarity in spectrum allocation and usage among the broadcast with dedicated spectrum, it should be appreciated that use of the MediaFLO™ system in examples throughout this document is illustrative and can be extended to other broadcast systems in this domain.

I. Delivery Architecture Examples

The venue-cast system may use in-band delivery techniques, such as a broadcast including both wide/local area and venue-specific content, or out-of-band delivery techniques, such as different transmission mediums that separately include one of the wide/local area or venue-specific content. In-band broadcasts may be implemented in a number of ways, such as via time sharing, frequency sharing, superposition, gray coding, multiple input, multiple output (MIMO), and single antenna repeater technologies. Out-of-band techniques may include utilizing broadcast in combination with 3G or 4G cellular network technologies. For example, multicast transmits to multiple users simultaneously and provides an efficient use of 3G network resources. Multicasting enables the provision of real-time streaming capability and clip-casting to wide audiences. 3G multicast technologies, such as BCMCS, allow for the delivery of similar content to a wide audience with minimal spectral usage. Another out-of-band technique includes the use of unicast, or transmitting and receiving from individual access terminals, which allows venue-cast information to be accessed on demand at a user's convenience. Unicast allows for additional content and interactivity. A content server may also redirect unicast traffic to multicast traffic based on the increase of user density in a venue area. Through the use of both unicast and multicast, real-time live content may be streamed on demand, stored content may be streamed on demand, additional stored content may be streamed to a user during network non-busy hours, information such as games, statistics, schedules, etc., may be downloaded to enhance a user's venue-cast experience. Live local events may be streamed, and live venue-specific non-local content may be streamed to a user.

An open and independent application programming interface (API) platform may provide support for different operating systems and different user interfaces. The API platform may be aware of the air interface information when content is available. The API may feed different platforms such as BREW, Java, WM, Linux, etc. This facilitates the development of third party applications running on different platforms. Applications such as a service guide, games, advertising, etc. can be downloaded over the air to different kinds of 3G devices.

A. Mobile Broadcast Network

Mobile broadcast such as the MediaFLO™ system is a technology that enables attractive services to consumers, among which some of the applications include mobile TV, mobile advertisement, and up-to-date media distribution via clip-cast and data-cast, multiple real-time audio and video streams, individual, non-real-time video, as well as IP datacast application, data such as stock market quotes, sports scores, and weather reports. The MediaFLO™ system is assignee's innovation to broadcast data to portable devices such as cell phones and PDAs. The MediaFLO™ system transmits data on a frequency separate from the frequencies used by current cellular networks. In the United States, the MediaFLO™ system will use frequency spectrum 716-722 MHz, which was previously allocated to UHF TV Channel 55. Other broadcast systems may include the Korean T-DMB standard and the European DVB-H standard.

With regard to modulation and coding in the current US implementation, the MediaFLO™ system is transmitted by a network of high-power broadcast transmitters operating at powers as high as 50 Kilowatts. This allows for a coverage area of a transmitter to be on the order of tens of kilometers, up to as large as 30-40 km. The transmission is an encrypted orthogonal frequency division modulation (OFDM) set of Quadrature Amplitude Modulation (QAM) signals sent on a 5.55 MHz channel centered at 719 MHz (e.g., the former ultra-high frequency (UHF) television (TV) Channel 55), also known as the Lower 700 MHz Block D. This allows a mobile device to decode the signal from more than one transmitter in the same way that it might if it was a delayed version from the same transmitter.

A venue-cast system may broadcast venue-cast content via an out-of-band transmission or an in-band transmission. If the venue-cast system broadcasts an in-band signal, the venue-cast system may receive wide or local area content and information through various mechanisms. Among others, the venue-cast system may include satellite backhaul support, as discussed below in FIG. 14, or may receive an over-the-air wide or local area signal, as discussed below in FIG. 13.

1. Out-of-Band

A venue-cast system may transmit on a dedicated band, separate from the wide area band, and thus may be referred to as an out-of-band transmission. Control channels on each radio frequency (RF) channel may not convey information about other RF channels. Therefore, service discovery may be accomplished independently for each RF channel. Independent service discovery may be accomplished at a receiving access terminal through scanning for a wide or local area signal power on a venue RF frequency. If the signal is present, the access terminal attempts to decode Overhead Information Symbols (OIS) in the venue channel. The overhead information provides the information necessary to access the venue-cast transmission. The transmission may include combined wide or local area broadcast information and venue broadcast information using an enhanced Multi-Frequency Network (MFN) framework. Transmitters within the network may be non-co-located.

Figure 4:
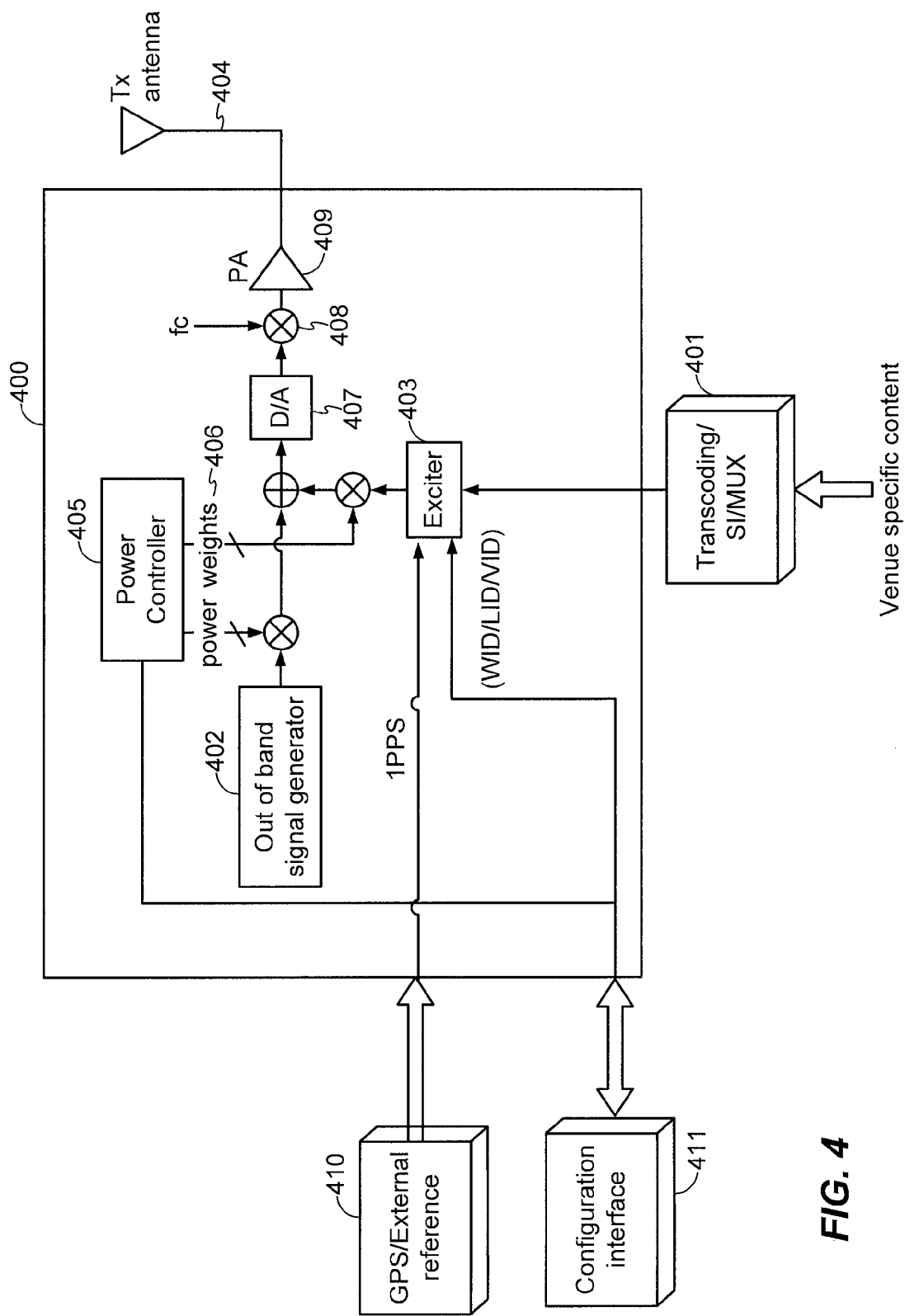
FIG. 4 depicts aspects of an exemplary venue-cast system without a backhaul.

As the venue-cast transmission is on a dedicated band, the venue-cast system may function without a backhaul. FIG. 4 illustrates exemplary aspects of a venue-cast transmitter for a venue-cast system without a backhaul. This venue transmission system 400 receives venue specific content via element 401. The venue content may be transcoded, multiplexed, and combined with system information (SI). The transmission system 400 may include an out-of-band signal generator 402 for generating a transmission signal, an exciter 403 to enhance the signal, and a transmission antenna 404. The transmission system 400 may further include such elements as a power controller 405, power weights 406, a digital to analog converter 407, a frequency converter (Fc) 408 and a power amplifier (PA) 409. The system may include external inputs of reference material or GPS 410 and a configuration interface 411.

2. In-Band

It may be desirable that a venue-cast transmission be made in combination with a wide area or local area transmission in such a manner that the wide area and local area transmissions are not interrupted. Thus, aspects include combining a venue-cast broadcast transmission with a wide or local area transmission or using knowledge of a wide area or local area transmission in order to avoid interfering with the wide or local area transmission.

In this manner, the venue specific content in FIG. 2 can be transmitted to a coverage area for the venue 220 via transmitter 221 in such a manner that it does not interfere with the reception of either the wide area or local area transmissions. Thus, a mobile device 223 in venue 220, could receive the venue transmission without preventing it from receiving either the wide or local area content. For example, the venue system 220 may receive either the wide or local area transmissions, such as via satellite or over the air, and may insert the venue content and transmit a venue combined transmission. Among others, a combined signal may be accomplished using time and frequency sharing, superposition, gray coding, and multiple transmitting antennas.

i. Time, Frequency Multiplexing

Figure 5:
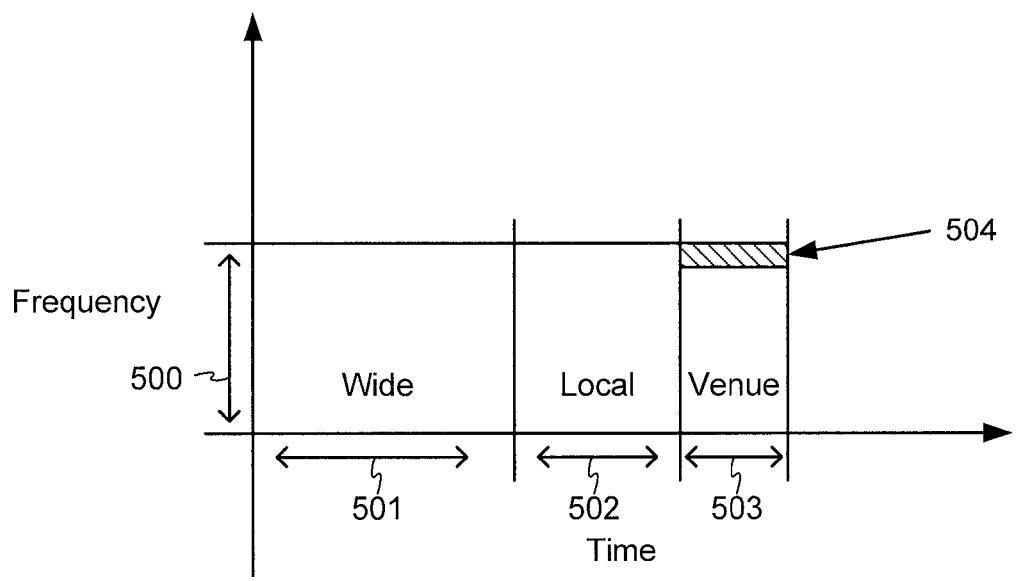
FIGS. 5 and 6 depict a time, frequency diagram for time, frequency multiplexing a venue-cast signal.

A first exemplary implementation for an in-band venue-cast is a Time, Frequency Multiplexing mechanism. Using Time, Frequency Multiplexing, a signal on a shared frequency band is portioned to allow a time slot for at least a local area transmission and a venue-cast transmission. The frequency band may further include a portion reserved for a wide area transmission. FIG. 5 illustrates a frequency band 500 that includes a portion of time reserved for wide area content 501, a second portion reserved for local area content 502, and a portion reserved for venue-cast content 503. Thus, each of these signals shares a frequency band 500.

The transmitters corresponding to the wide, local, and venue coverage area may be coordinated to transmit only during their assigned time. It may be undesirable to turn certain transmitters on and off. Therefore, the transmitters may enter an "inactive" state during portions of time assigned to other transmitters. In an inactive state, a transmitter continues to transmit, so that it does not need to be turned off. However, the transmission is limited to a particular portion of the frequency band that is set aside for inactive type transmissions. This reserved portion of the frequency band may be a single "slot." A slot is a group of sub-carriers or frequency range. Thus, during the inactive state, the transmitters go into a single slot mode and transmit only on the reserved slot. For example, the local area transmitters 214 and 215 in FIG. 2 would enter an inactive state during time portion 503 that is reserved for the venue-cast. During time portion 503, transmitters 214 and 215 are limited to the reserved, inactive frequency band 504. The inactive frequency band is a small, reserved portion of frequency band 500. In this manner, the transmissions share not only the frequency band, but also the assigned time portions.

The high power transmitters may be configured to reduce power during the venue portion of the frame, or during the portion reserved for the venue transmission. This may further enhance venue transmission coverage.

Figure 6:
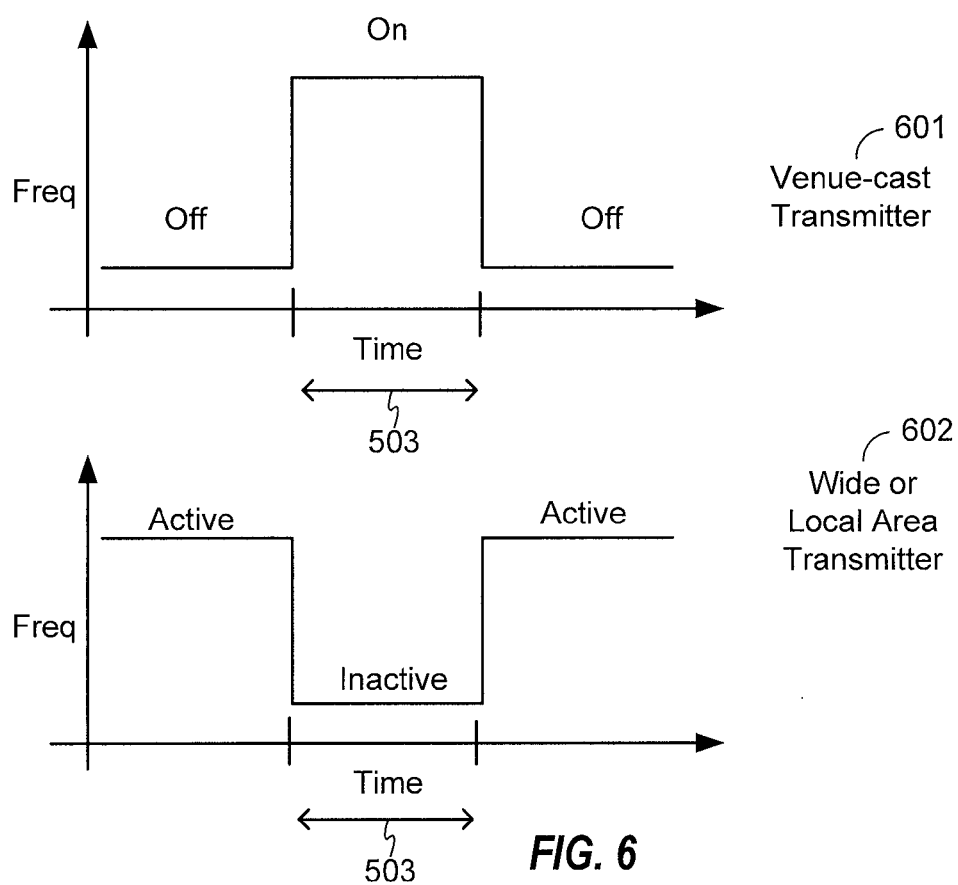

FIG. 6 illustrates exemplary aspects of the state of a wide area or local area transmitter 602 and a venue-cast transmitter 601 during time, frequency multiplexing. During a time slot reserved for a wide are or local area transmission, which corresponds to either portion 501 or 502 from FIG. 5, the venue transmitter 501 may be turned off while the other transmitter 502 actively transmits content. During the time slot reserved for the venue-cast, corresponding to portion 503 in FIG. 5, the venue transmitter 501 turns on and transmits the venue-cast content. At the same time, the other transmitters enter an inactive state, but continue to transmit on a reserved inactive portion of the frequency band. This inactive portion of the frequency band corresponds to portion 504 in FIG. 5. After the time portion reserved for the venue-cast, the venue transmitter again turns off, while the wide or local area transmitter actively transmits content. As used herein, the term "actively transmits" means that the transmitter transmits content using portions of the frequency band other than the reserved, active portion designated for venue-cast.

Figure 7:
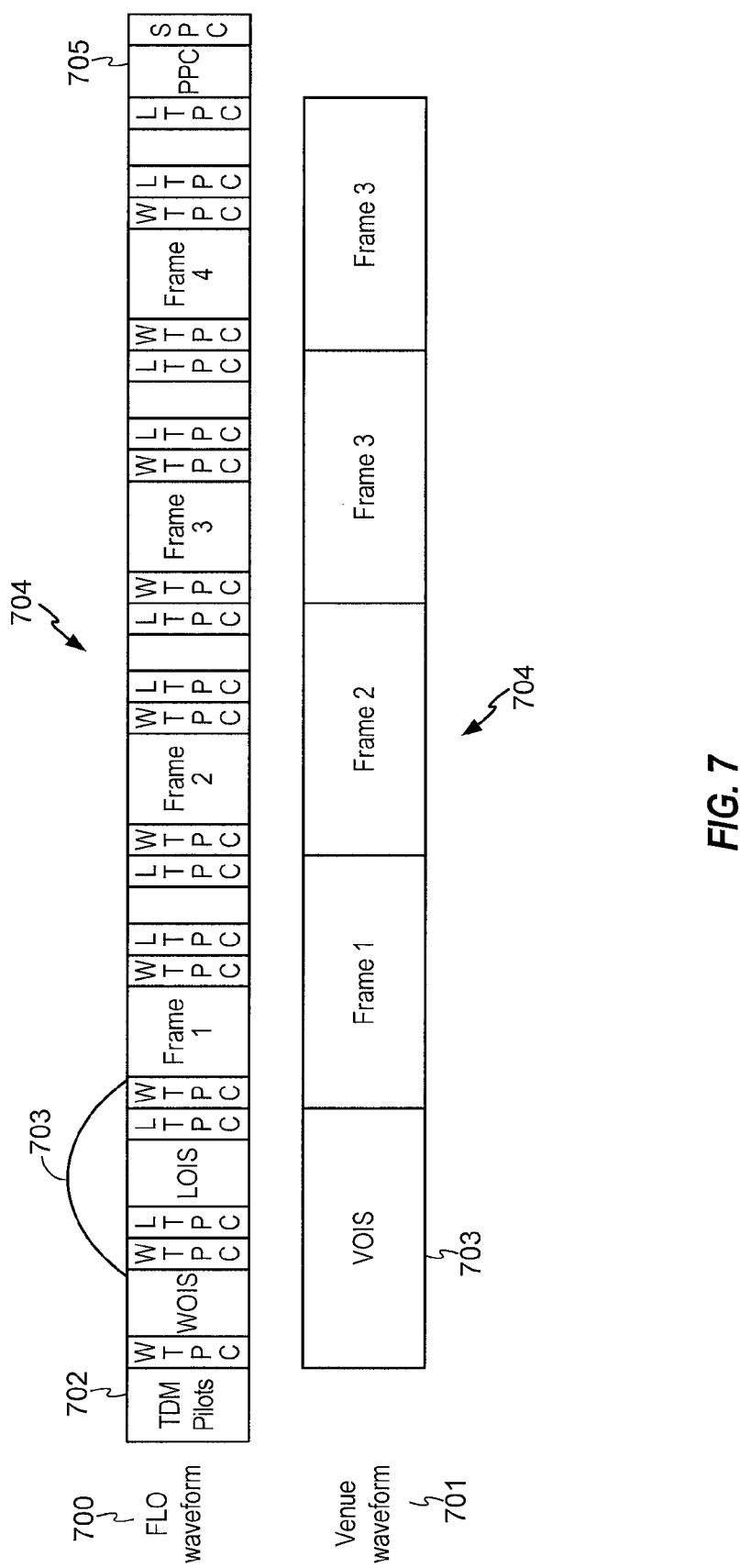
FIG. 7 depicts an exemplary superframe diagram according to aspects of a combined wide/local area and venue-cast transmission.

FIG. 7 shows two MediaFLO™ type superframe diagrams, one superframe 700 for the wide and local area broadcast, and one superframe 701 for the venue-cast broadcast. The wide and local area superframe may include a Time Division Multiplexing (TDM) pilot 702, Overhead Information Symbols (OIS) 703, frames 704, and a Positioning Pilot Channel (PPC) 705. The OIS may be separated into sections for the wide area (WOIS) and the local area (LOIS). Overhead signaling for the venue transmission may be inserted on either a wide or local area OIS, or on both the WOIS and LOIS. In addition, the overhead channels WOIS and LOIS may carry information on the start of the venue portion of the frame. The venue overhead and control information may be sent as a special overhead MLC in the venue portion of the frame. The macronetwork may transmit synchronization pilot TDM and scrambling information. Local area data and wide area data may be sent within each of Frame 1, Frame 2, Frame 3, Frame 4, and so forth.

After the frames, the superframe includes a PPC 705 that may be modified to include information about the availability of a venue broadcast. Thus, the availability of a venue transmission may be signaled using the PPC 705. The PPC may be modified to include information regarding the type of venue transmission service and the energy ratio of the venue transmission. The venue transmission may be provided as a percentage of the slots set aside for the local area transmission. This will enable venue-casts without the use of additional bandwidth. As discussed above in connection with FIGS. 5 and 6, wide and local area transmitters may remain on continuously and transmit scrambled pilots on a reserved, inactive slot, such as slot 7 of the superframe during a venue portion of the frame.

This implementation may be employed in a venue without macro signal coverage. Without macro signal coverage, the venue transmitter transmits the TDM pilot, the WOIS and LOIS in addition to the venue portion of the frame.

Figure 8:
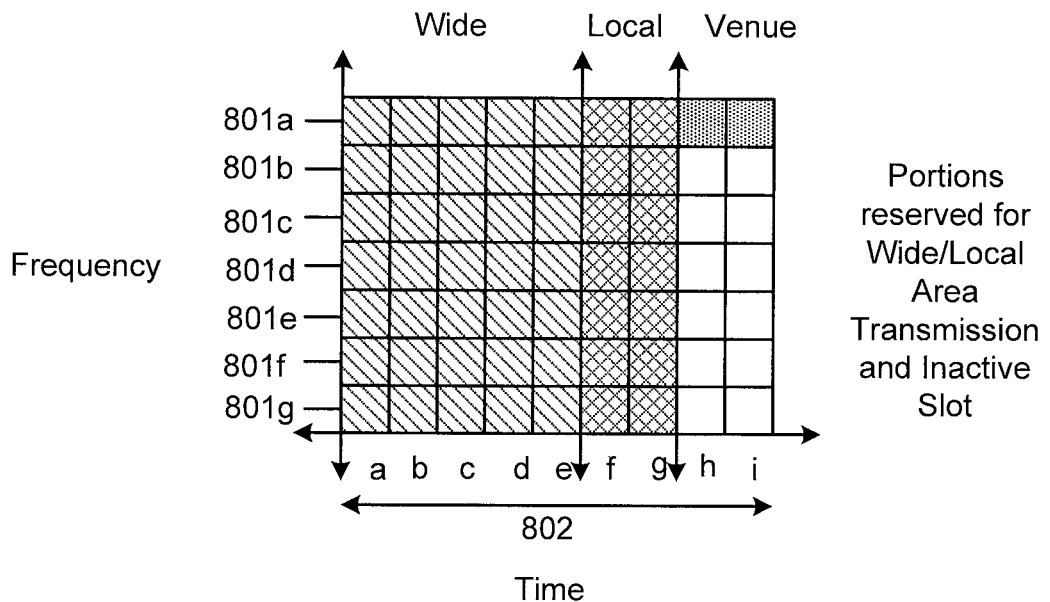
FIGS. 8-9 depicts an exemplary slot diagram for a combined wide/local area and venue-cast transmission using time, frequency multiplexing.

FIG. 8 illustrates that a given frequency band may include a number of frequency band slots 801*a*, 801*b*, 801*c*, etc. for each time slot 802*a*, 802*b*, 802*c*, etc. The high power transmitters in the wide or local area network may be restricted to transmit only on certain slots at certain portions of the superframe. For example, in FIG. 8, frequency slots 801*a-g* are reserved for the transmission of wide area content during time slots 802*a-e*. During time slots 802*f-g*, the same frequency slots 801*a-g* are reserved for the transmission of local area content. At time slots 802*h-i*, a portion of the frequency slots 801*b-g* are reserved for the transmission of venue-cast content. During these time slots 802*h-i*, a venue transmitter may be allowed to transmit on frequency slots 801*b-g*, but not on frequency slot 801*a*. One of or both the wide area and the local area transmission may be reserved in slot 801*a* during time portions other than those reserved for them. Thus, the wide area transmission may occur in slot 801*a* during at least a portion of time slots 802*f-i* and/or local area transmission may occur in frequency slot 801*a* during time slots 802*a-e* and/or 802*h-i*.

Figure 9:
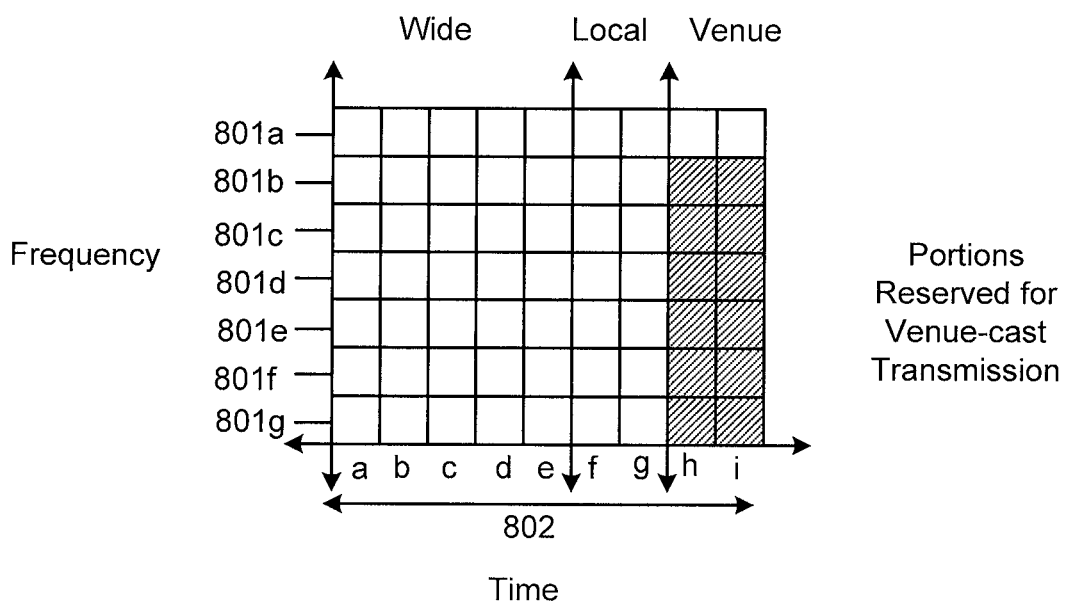

FIG. 9 illustrates the venue transmitter transmitting on the portion of frequency slots that are allotted to the venue-cast during the time corresponding to 802*h-i*. The venue transmitter may be turned off during the rest of the superframe, as illustrated in FIG. 9. Overhead information for the venue transmitter may be sent along with venue data, or a section of the superframe reserved for overhead information may be reserved for venue-cast overhead information.

The venue-cast waveform is transmitted as an insertion to the wide or local area waveform. The modulation for the venue-cast may be Quadrature Phase Shifting Key (QPSK) modulation. The waveform parameters of the venue-cast waveform may be the same as for the wide or local area broadcast. For example, the venue-cast may share parameters such as Fast Fourier Transform (FFT) size, cyclic prefix (CP) length, slot to interlace map, and frame length with the wide or local area transmission.

Figure 10:
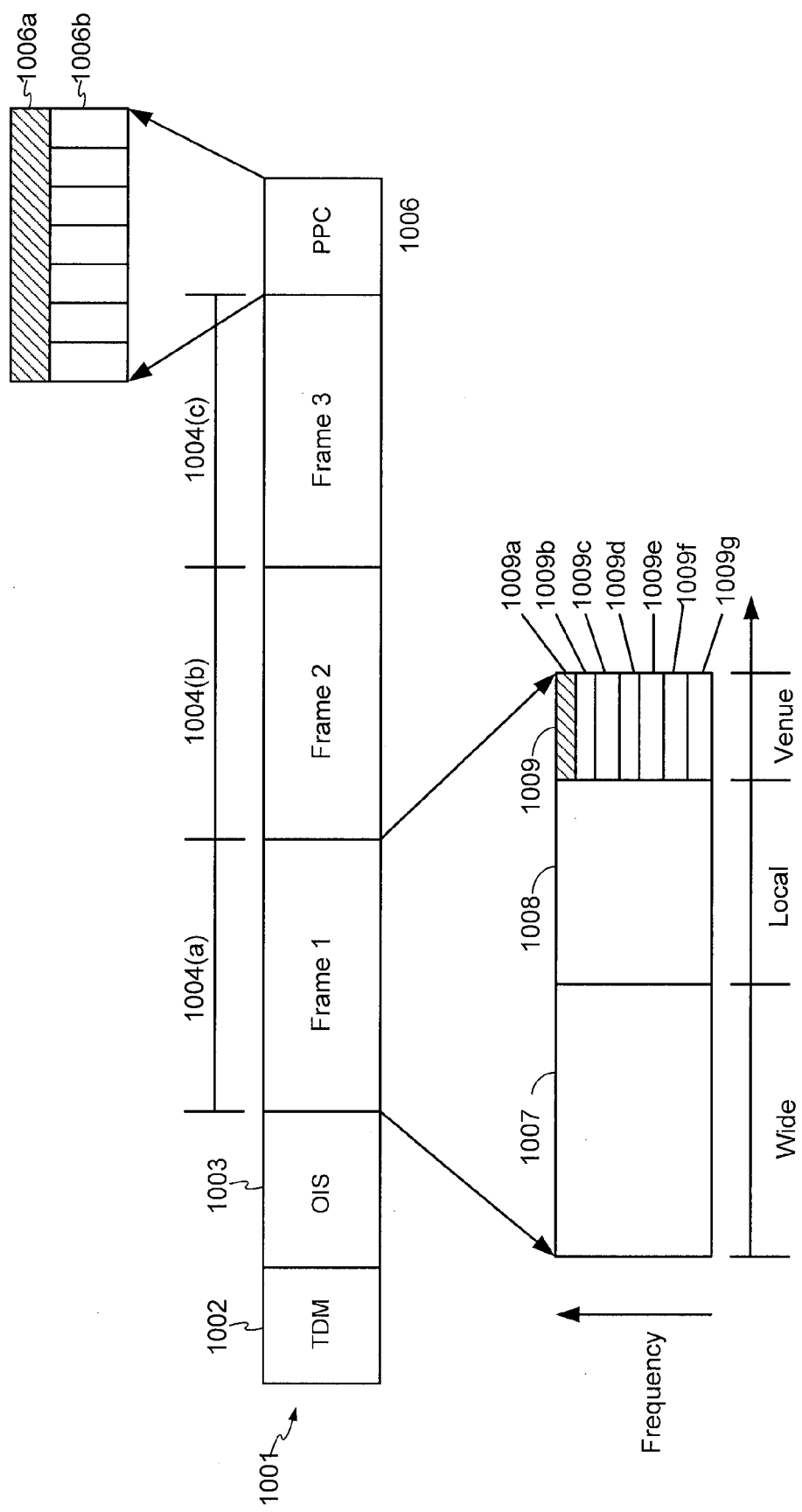
FIG. 10 depicts an exemplary signal diagram for an in-band venue-cast using time, frequency multiplexing.

FIG. 10 illustrates an exemplary PHY diagram for an in-band venue-cast 1001. The PHY diagram includes portions for TDM 1002, OIS 1003, and PPC 1006. The overhead portion OIS 1003 may include portions reserved for both the wide area (WOIS) and local area (LOIS). Although three frames are illustrated, any number of frames may be included in the superframe. Each frame 1004*a*, 1004*b*, 1004*c* may include a wide area portion 1007, a local area portion 1008, and a venue portion 1009.

As discussed in connection with FIGS. 5-9, the frames may include multiple frequency slots 1009*a-g*. During the venue portion 1009, the venue-cast transmitter may be allotted only slots 1009*b-g*. Slot 1009*a* may be the reserved, inactive slot. Similarly, during the PPC portion 1006, the PPC would not be transmitted using the reserved inactive frequency slot 1006*a*. In addition, PPC may include multiple time slots 1006*b*. These time slots may be portioned to PPC information for each of the wide area, local area, and venue.

A venue transmitter inserts the venue content into any reserved venue portions and repeats the superframe having the superposed venue content 1001. The venue portion 1009 that is reserved in the superframe may be reused at different venues.

Figure 11:
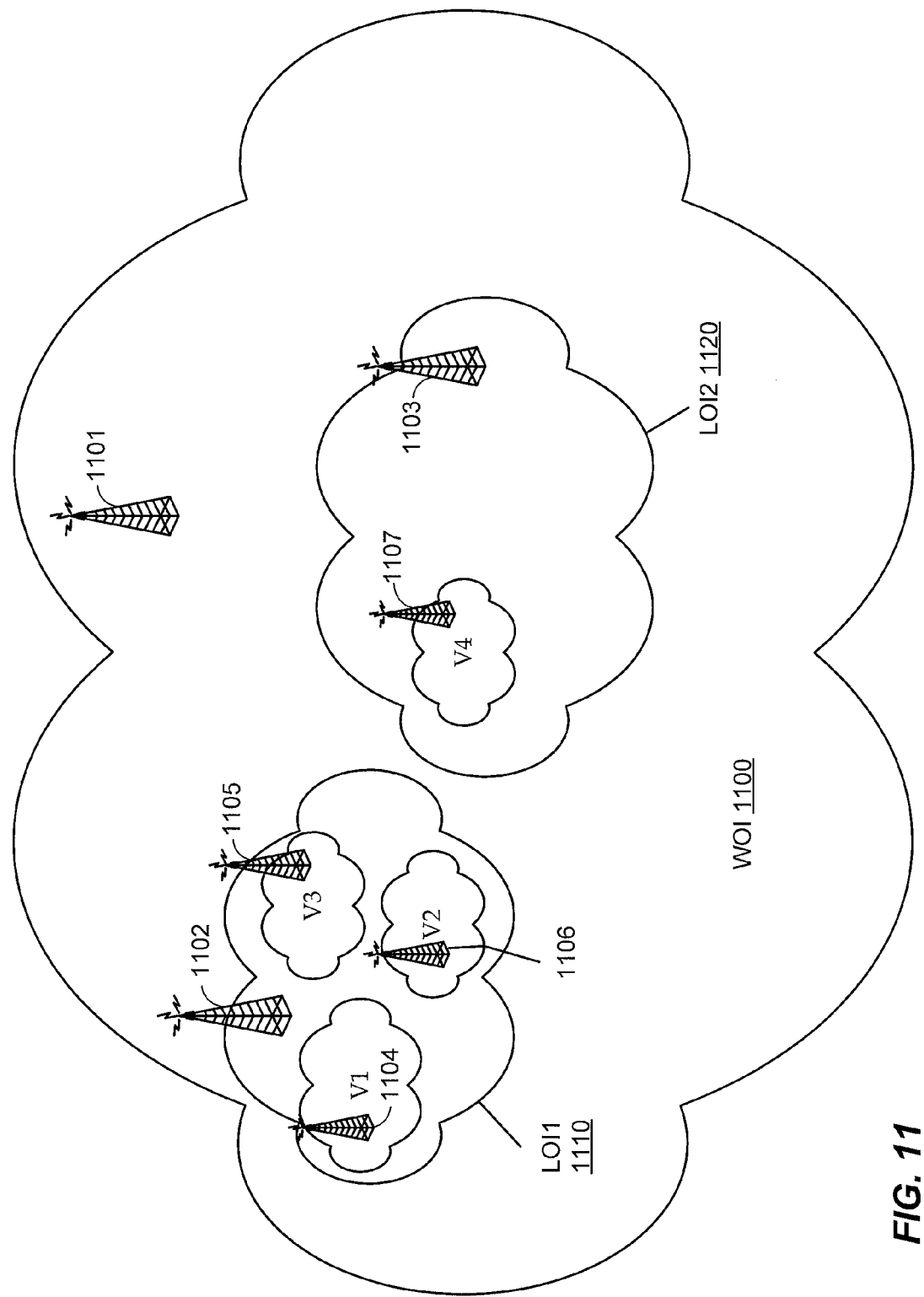
FIG. 11 depicts aspects of a venue-cast system having overlapping wide, local, and venue coverage areas.

Referring to FIG. 11, a WOI 1100 may include more than one local area, such as LOI1 1110 and LOI2 1120 having transmitters 1102 and 1101, respectively. Each local area may include any number of venues. As long as the venue coverage areas are non-overlapping, the venues may each use the same reserved venue portion 1009 in the superframe. For example, venue V1 in FIG. 11 may insert venue content into the reserved venue portion and broadcast the superframe to a coverage area for venue V1 via venue transmitter 1104. Venue V2 may similarly insert venue content for V2 into the same reserved venue portion and broadcast the superframe to a coverage area for V2 via transmitter 1106. As the coverage areas do no overlap, the repeats at the different venues do not interfere with each other. The signal strength of the venue transmitter may be selected to cover only the venue area. Similarly, the same reserved venue portion V may be reused at V3 and V4 and any other non-overlapping venue coverage area via transmitters 1105 and 1107, respectively.

Figure 12:
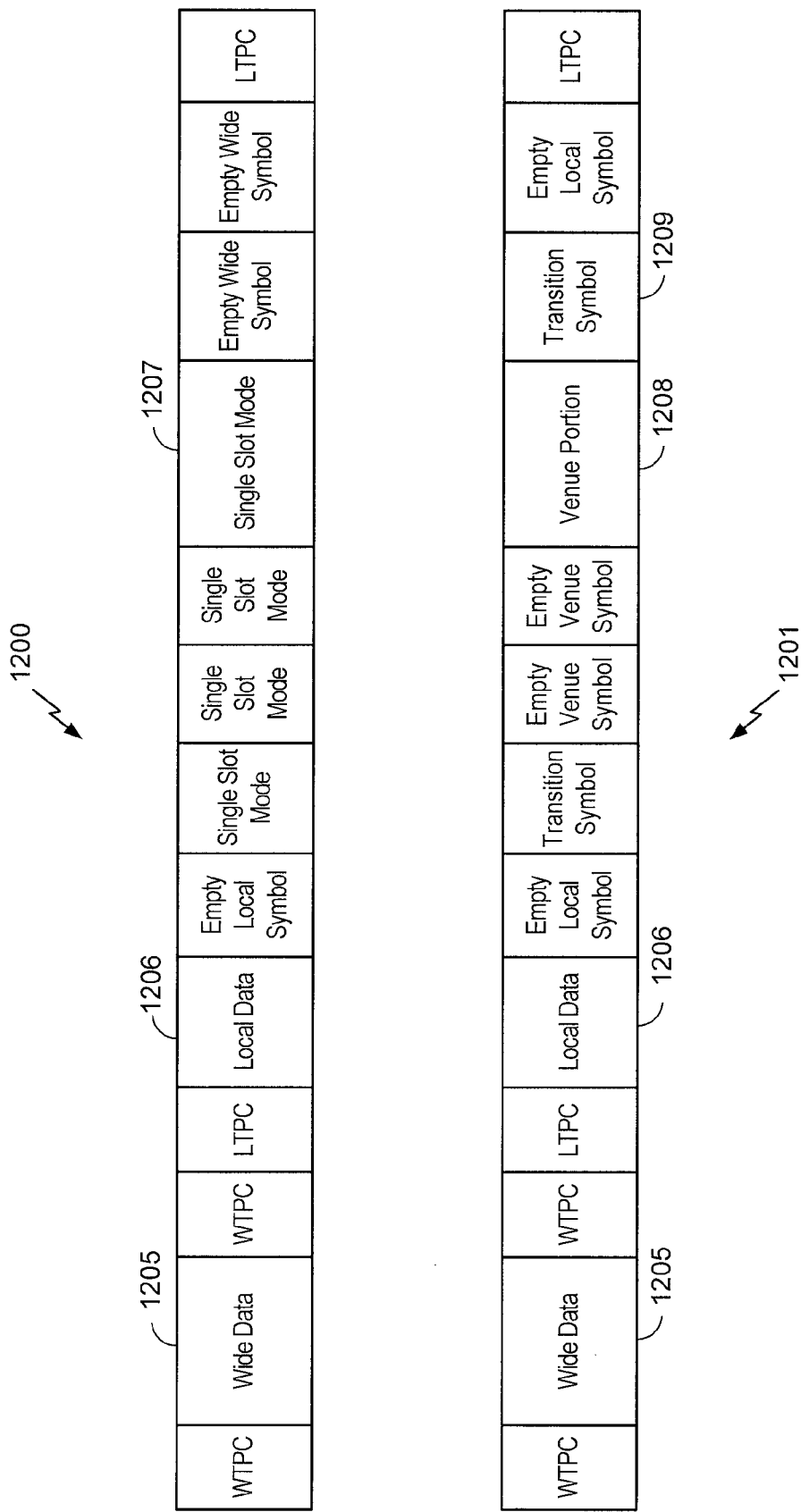
FIG. 12 depicts aspects of an exemplary waveform diagram for a combined venue waveform with wide/local area transmission content.

FIG. 12 illustrates aspects of another exemplary TDM/FDM diagram for a combined venue waveform that includes a wide/local area transmission frame waveform 1200 and a combined venue transmission frame waveform 1201. A portion of the local signal/frame 1200 includes wide area data 1205. The wide area data 1205 may be repeated on the waveform from the venue transmitter 1201. A portion of the local frame 1200 includes local area data 1206. The local area data may be repeated on the waveform from the venue transmitter 1201. A portion 1207 of the wide/local frame 1200 is reserved for venue data. During this time, the local area transmitter may enter a single slot mode or inactive state where it transmits on a single, reserved frequency. The venue transmitter uses this portion to insert and transmit venue data 1208. The venue data may be preceded and followed by a transition symbol 1209 in the venue transmission.

An AT receiving the combined signal will first receive the OIS signal and process it sequentially. Therefore, first, it will receive any WOIS or LOIS information. This overhead information will inform the AT regarding the existence of a venue MLC and provide the venue MLC parameters. Thus, the OIS informs an AT regarding the existence of a venue-cast and provides information on how to access the venue-cast contents. The venue-cast transmission will modify the OIS by inserting its own information.

In order to insert the venue-cast content at the appropriate slots, the venue-cast system requires information regarding the local area signal and the portion of the signal reserved for the venue-cast content. Coordination of the OIS, PPC, and frame portions assigned to a venue need to be coordinated with the macro-network. For example, the venue-cast system will require knowledge of the PPC symbol on which it can transmit. Thus, the venue-cast network requires an IP interface. Coordination of the venue-cast system with the macro-network may occur by providing the venue-cast system with a reception of the macro-network signal. This may occur in a number of ways, for example, the venue-cast network may receive an over-the-air reception of the wide or local area signal, a satellite reception of the wide or local area signal, or receive information regarding the wide or local area signal via an IP network. FIG. 2 illustrates that the venue-cast system for venue 220 may receive information from the wide area network management center via satellite 211, over-the-air information from LOI transmitter 214, etc.

Figure 13:
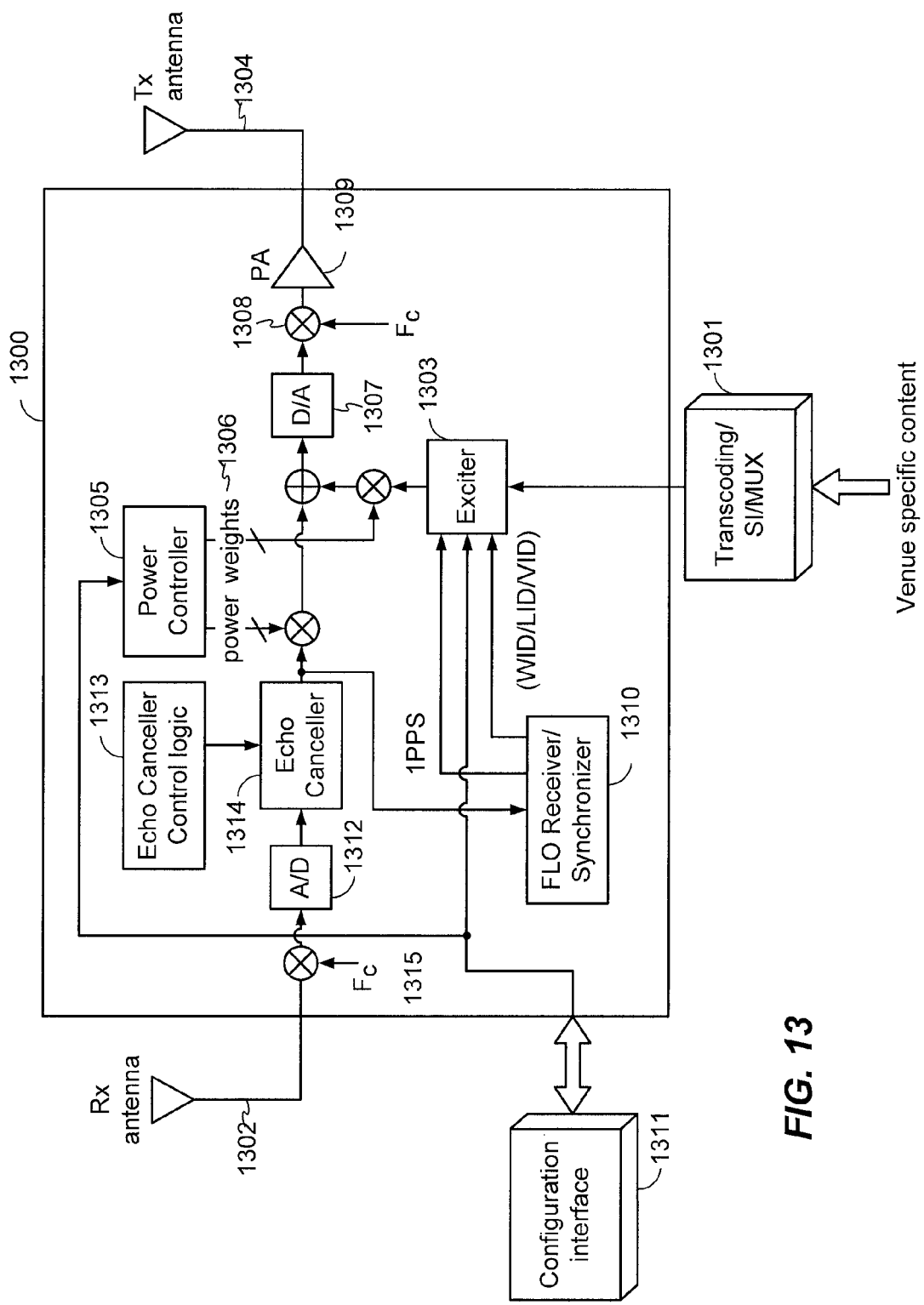
FIG. 13 depicts aspects of an exemplary venue transmission system having an over-the-air backhaul.

FIG. 13 illustrates aspects of a venue transmission system 1300 that receives a wide or local area signal over the air. The venue transmission system may use the over the air wide/local area transmission in order to repeat the wide or local area signal on portions of the received superframe and to insert a venue signal on other portions of the superframe, as discussed in connection with FIGS. 7, 10 and 12. This venue transmission system 1300 includes similar elements to system 400, such as an input of venue content 1301 that may be transcoded, multiplexed, and include system information (SI). The transmission system may use a transcoder, multiplexer and SI from the wide or local area infrastructure. The venue-cast system may further include an exciter 1303, a transmission antenna 1304, a power controller 1305, power weights, 1306, a digital to analog converter 1307, frequency converter (Fc) 1308, power amplifier (PA) 1309, and configuration interface 1311.

In addition to the transmission antenna 1304, this system includes a reception antenna 1302 for receiving the wide or local area signal. The venue transmission system also includes a receiver and synchronizer 1310 for synchronizing the venue signal with the received wide or local area signal, an echo canceller 1314 including echo canceller control logic 1313 for eliminating or reducing echo, an Fc 1315, and an analog to digital converter 1312. Although the receiving antenna and transmission antenna are illustrated as being separate, it is noted that any number of antennas may be used in the system.

Figure 14:
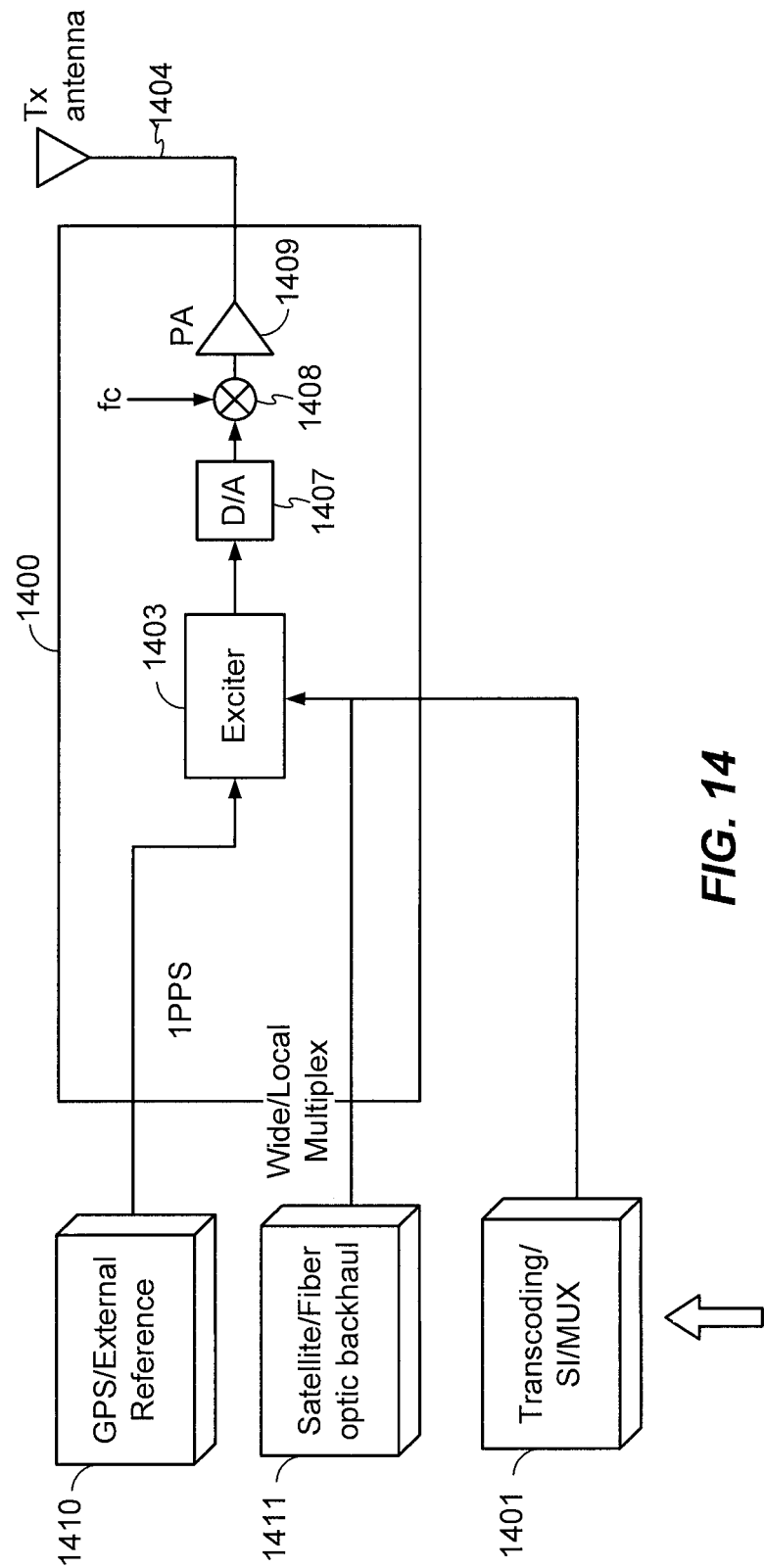
FIG. 14 depicts aspects of an exemplary venue transmission system having a satellite/fiber optic backhaul.

FIG. 14 illustrates a venue transmission system 1400 that includes satellite backhaul support 1411. The system receives venue specific content 1401 from a venue input and wide and local area content via a satellite backhaul 1411. The system may further receive external reference information 1410 such as GPS information. The satellite backhaul 1411 may also include fiber optic elements. The venue transmission system 1400 may include an exciter 1403 to insert the venue signal onto a venue portion of the wide/local superframe and to transmit a combined superframe having the wide and local signals on the wide and local portions of the superframe and the venue signal on the venue portion. Similar to systems 400 and 1300, system 1400 may also include a digital to analog converter 1407, an Fc 1408, a PA 1409, and a transmission antenna 1404. It is noted that any number of transmission antenna may be used. The transmission system may use a transcoder, multiplexer and SI from the wide or local area infrastructure.

If the wide and local area signals are received by the venue transmission system and repeated by the venue transmission system, signal power level changes can be eliminated between wide and local area portions of the frame and venue portions of the frame. As knowledge of the wide/local area signal is received via the backhaul, the venue transmitters do not need be turned on and off.

The local area transmitter may transmit a pilot pattern on all slots in a venue portion of a superframe. A corresponding venue transmitter inside the local area may also transmit venue broadcast information on all slots in the venue portion. A receiver performs pilot interference cancellation in order to receive the venue-cast information. On the venue portion of the superframe, the received signal on each sub-carrier can be written as:

$$Y[k]=H_F[k]P_F[k]+H_V[k]P_V[k],$$

where $P_F[k]$, $P_V[k]$ represent scrambled pilots from the macro network and venue transmitter, respectively, k represents the subcarrier index, $H_F[k]$ represents the channel gain on sub-carrier k for the channel between the macro network and a receiving device. $H_V[k]$ represents the channel gain on sub-carrier k for the channel between the venue transmitter and a receiving device.

A device receiving a time, frequency multiplexed signal may decode the signals as well as perform pilot interference cancellation. For example, the venue signal may be decoded in two steps. First, the wide or local area channel is estimated by exploiting a knowledge of the wide or local area pilot sequence, followed by time filtering and thresholding of the estimated wide/local area signal. Then, the wide or local area signal is cancelled from the received signal Y[k] and the residual signal is decoded to obtain the venue-cast information. The residual signal may be decoded in the same manner as a regular wide or local area signal.

ii. Superposition Coding

A second exemplary implementation for in-band venue-cast transmission is superposition coding the venue-cast signal onto the local area signal. If scheduling information is available, superposition coding may be first done on empty slots. Superposition coding may be done only for Multicast Logical Channels (MLCs) of certain modes. The venue waveform power may be chosen to be a value low enough to not affect existing wide/local signal coverage. Thus, the venue specific broadcasts can be superposed on an existing network such as a wide or local area network, such as the MediaFLO™ network, with no additional bandwidth requirements.

Capacity is partitioned between the wide and local area system and the venue broadcast system so that each system can operate independently of the other, the capacity allocation can be changed at each local area, and devices capable of receiving wide or local area transmissions will continue to receive such transmissions without interruption at venues. FIG. 11 illustrates coverage areas of the macro system WOI and the venue system V1, 2, 3, and 4. Although four venue broadcast towers 1104, 1105, 1106, and 1107 are illustrated in FIG. 11, any number of non-overlapping venue coverage areas may be provided within the macro coverage area. The same capacity may be re-used for each of venues V1, V2, V3, and V4

Successive Interference Cancellation (SIC) may be used by an access terminal receiving the combined signal in order to decode the venue transmission, the local area transmission, and the wide area transmission from the superposed waveform.

A venue transmitter may include an exciter having a field programmable gate array (FPGA) to support a single slot transmission mode and the exciter may be enabled to support single-slot power backoff. For example, in one aspect, the power backoff may be 12 dB. Power backoff can provide improvement to the venue coverage by reducing interference. The exciter may include a feature for turning the venue-cast RF transmission on and off. A timing offset may be included in the exciter for setting the time at which the exciter turns the venue-cast RF transmission on and off. The timing offset of the exciter may be chosen such that venue signals are in time alignment with the wide or local area signal that arrives earliest.

A wide or local area transmitter may also include a scheduler having a portion of the local data frame unallocated so that venue data can be broadcast in that portion of the frame. The scheduler may include additional support at higher layers to allow for a configurable split between wide and local portions and venue portions of the superframe.

The transmitter backhaul may include support for additional multiplexes to tradeoff macro network capacity with venues only in selected Local-area Operational Infrastructures (LOIs).

A local signal and the venue signal may also be generated from the same transmitter. In this single transmitter situation, there may be no local signal components from other transmitters. Thus, the received waveform, Y, can be written as:

$$Y = H_V(aX_F + bX_V) + W$$

where $H_V$ is the channel gain of the venue-cast, $X_F$ is the local area portion of the signal, $X_V$ is the venue area portion of the signal, a and b are selected power levels for the local area and venue area components of the signal, and W is background noise.

The venue transmission involves generalized layered modulation that may include independent scheduling of the venue transmission and wide or local area data. Layered modulation may be used to transmit information for a video channel at both a lower quality, also referred to as a base quality, and at a higher quality, also referred to as an enhancement. Receiving the base broadcast alone will give a base video quality level, whereas receiving both the base broadcast and the enhancement broadcast will provide a better quality video broadcast.

In such aspects, the same data rate is used on both the base and the enhancement signals, and also the same allocations are made for the signals. For example, if n packets of base information are being sent, then n packets of enhancement information must be sent, where n is a positive number.

For a venue transmission superposed with a wide or local area transmission, the wide/local area transmission can be similar to the base transmission and the venue transmission is similar to the enhancement transmission. However, the wide/local area transmission and the venue transmission may be scheduled independently of each other, where an enhancement transmission is tied to the base transmission. This allows receivers to obtain the venue transmission even without decoding and cancelling the wide/local area transmission.

The venue transmission may be received and decoded independently of whether the local/wide area transmission is received and decoded, whereas both a base and an enhancement transmission must be received in order for the enhanced transmission to be decoded.

In some aspects, the spectral efficiency of a venue-cast layer may not be tied to that of the wide or local layer. The venue-cast signal may be scrambled in a similar manner to the wide or local pilot signal. A venue-cast signal of this type may be indicated by the value 0x01 in the Positioning Pilot Channel (PPC).

Additionally, aspects may include determining a power for the venue-cast waveform in relation to the wide or local area waveform. In the above equation, powers a and b represent the power for the local area and venue waveform, respectively. This may include determining the power of the venue transmission in order to allow a predetermined maximum degradation to the performance of the wide or local area transmission. For example, a predetermined maximum degradation may be less than 1 dB.

A signal from more than one transmitter may cause interference. For example, a first transmitter may be located in San Diego, Calif. and a second transmitter may be located in Irvine, Calif. A device located between the two transmitters would receive a signal with interference from the two signals. The signal on each sub-carrier can be written as:

$$Y = H_1 X_1 + H_2 X_2 + W \text{(Local interference)}$$

$$Y = H_F X_F + H_V(aX_F + bX_V) + W \text{(Venue-cast)}$$

where $X_1$ represents the signal from the first transmitter and $X_2$ represents a signal from a second transmitter. The two transmitters may cover separate, yet overlapping coverage areas. In the second equation, $X_F$ is the local area signal, $X_V$ is the venue-cast portion of the signal, W represents background noise, and H represents channel gain. Thus, Hv is the channel gain for the venue-cast signal, $H_F$ is the channel gain for the local area signal, $H_1$ is the channel gain for the signal from the first transmitter, and $H_2$ is the channel gain for the signal from the second transmitter. Parameters a and b may be selected so that the venue-cast signal does not affect the wide/local area signal coverage. Receivers will first decode $X_F$ and then obtain $X_V$, as $X_F$ will have a higher signal strength than $X_V$. For local interference cancellation, either $X_1$ or $X_2$ can have a higher strength. The receiver may determine an order of interference cancellation dynamically.

Figure 15:
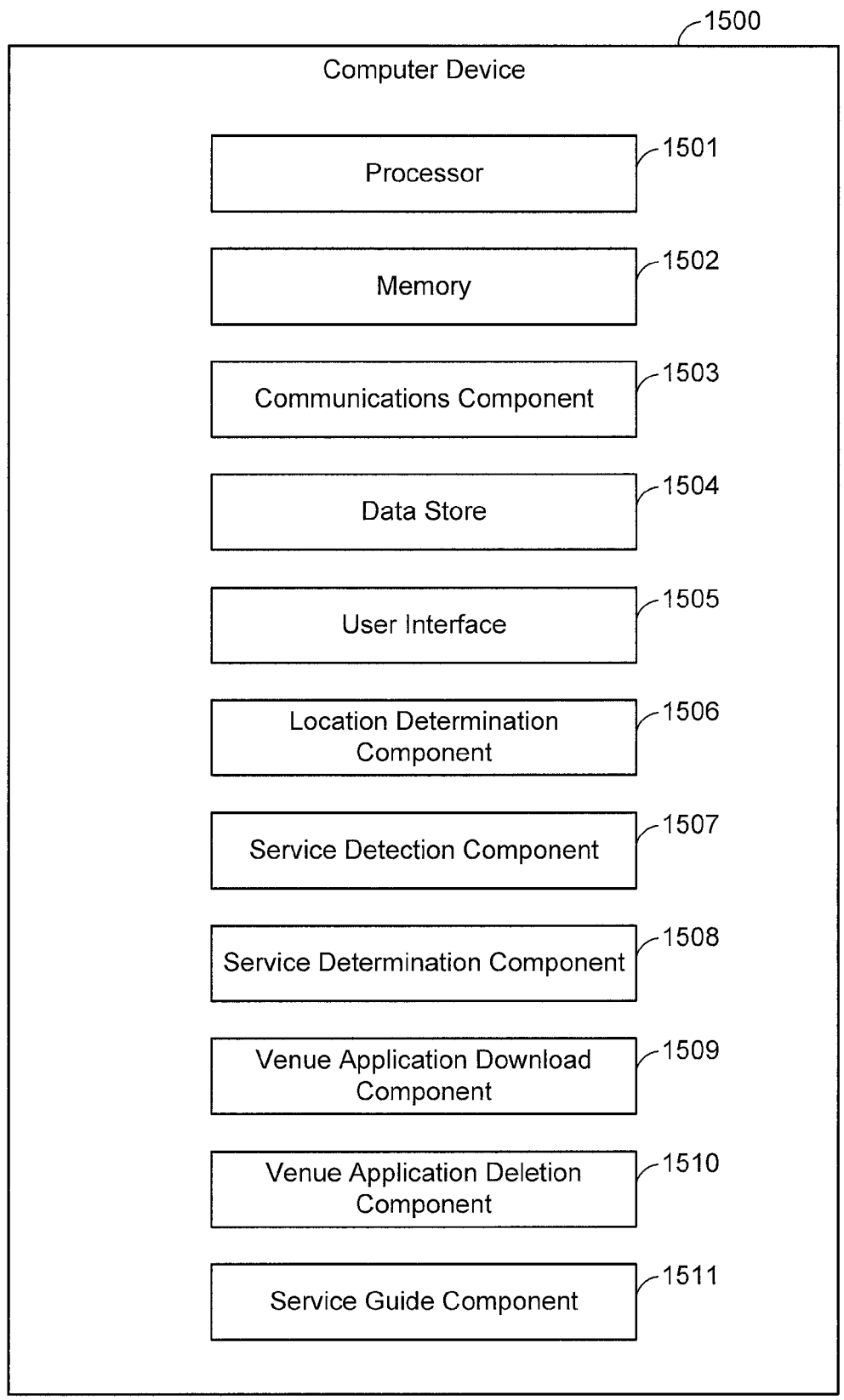
FIG. 15 depicts aspects of an access terminal for receiving a venue-cast transmission.

In order to receive and decode a superposed signal, an access terminal receiving the combined venue-cast may include a service determination component as illustrated in FIG. 15. This component may perform venue coverage determination in order to enable the access terminal to determine whether it is in sufficient coverage by determining whether the overall C/(I+N) is sufficient for decoding the venue-signal, where C is the carrier/signal energy, I is the interface energy, and N is the thermal noise energy due to receiver circuits. Coverage may also be determined to be sufficient if C/I is greater than a predetermined threshold or if C/N is greater than a predetermined threshold. The C/N analysis may be identical to a wide or local area link budget calculation.

In some aspects, a venue signal can be received if C/I>a certain threshold, such as 5 dB. Thus, the wide area or local area signal should be approximately 5 dB below the venue signal, on average.

The access terminal may further include an interference cancellation component for decoding a superposed transmission of more than one signal. The signals may include at least a stronger signal and a weaker signal. The local signal may be the stronger signal, and the venue signal the weaker signal. In performing interference cancellation, first, the mobile device determines the power levels for the signals. The mobile device then decodes the stronger signal. Then, the receiver cancels the stronger signal in order to decode the weaker signal. Thereby, a mobile device can decode a superposed venue signal. The device may use successive interference cancellation in order to decode the venue transmission.

The access terminal may further include a channel estimation component. As a venue-cast pilot is scrambled identical to the corresponding venue-cast data, the venue-cast pilot may appear as noise to the wide or local area pilot. Channel estimation of venue-cast data may take advantage of interference cancellation, as described above. First, a mobile device receiving a superposed venue transmission may estimate the wide or local area channel. The device applies a threshold to the estimated time domain wide/local area channel and converts the estimate to the frequency domain for interference cancellation. Then, the device may estimate the venue-cast channel by descrambling and performing an Inverse Fast Fourier Transform (IFFT) processing of the interference cancelled channel observations.

iii. Gray Coding

Another exemplary implementation for in-band venue-cast transmission is gray coding venue-cast content onto a local area signal. While superposition coding of venue-cast content onto a local area signal may be accomplished without an actual knowledge of the local broadcast content, gray coding requires a backhaul to provide the venue-cast network with at least a partial knowledge of the local signal. In order to perform gray coding, the venue-cast system will decode the local area signal and perform joint encoding for a combined signal including the venue-cast content. A venue transmission system having backhaul support may also implement gray coding with the superposition of the venue content onto the superframe from the wide or local area broadcast.

An access terminal that receives the gray coded venue-cast may perform venue coverage determination and may include an interference cancellation component and a channel estimation component, similar to an access terminal for receiving a superposed signal. However, when graycoding is used in superposing the venue waveform on the wide or local area waveform, the device may be able to decode the venue portion of the waveform and the wide or local area portion of the waveform independently of each other. Therefore, where an access terminal receiving a venue-cast signal superposed on a local area signal will separate the venue-cast signal and the local area signal, decode the local area (or a stronger) signal first, and then decode the venue-cast (or weaker) signal after decoding the local area signal, an access terminal receiving a venue-cast signal gray coded on a local area signal may decode the venue-cast signal without decoding the local area signal.

iv. MIMO Type

Figure 16:
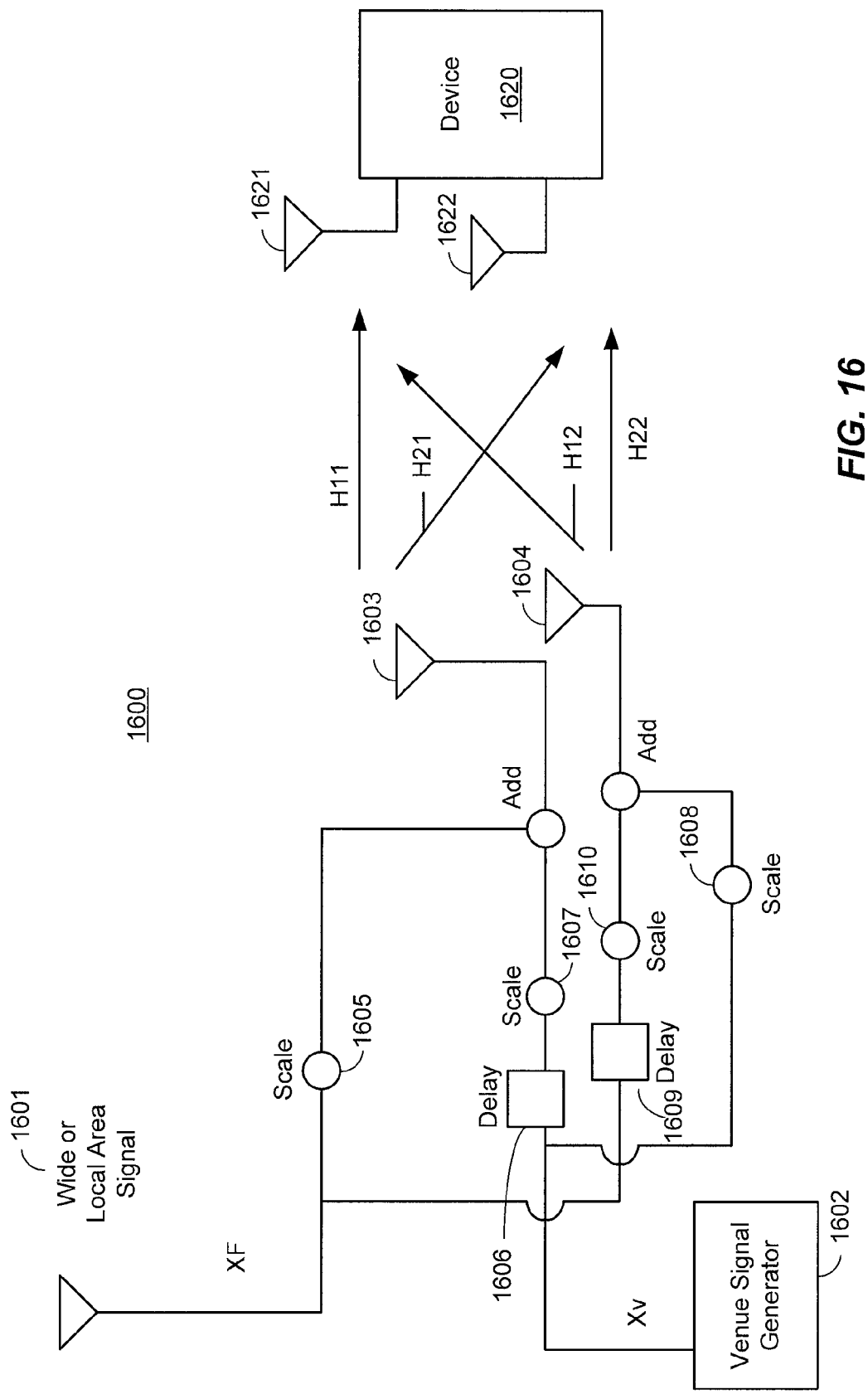
FIG. 16 depicts aspects of a multiple input multiple output type venue-cast system.

Additional antennas may be used at either the transmitters or the mobile device receiver, or both, in order to provide additional diversity for a combined signal. Additional transmitters in this Multiple Input, Multiple Output (MIMO) type system may provide increased dimensionality. FIG. 16 illustrates aspects of an exemplary dual antenna venue transmission system 1600. The additional transmitters provide a signal that can be received by access terminals having either one antenna or multiple antennas.

MIMO design for venue-cast may include the following aspects:

A. For a single antenna receiver, the additional transmitting antennas provide additional diversity to assist in receiving the venue-cast. In this situation, interference from a venue signal should be correlated with the corresponding wide or local area signal, such that when the signal fades, the interference also fades.

B. For a multiple antenna receiver, the receiver may use the multiple antennas to cancel portions of the combined signal spatially. For example, the receiver may cancel the wide or local area portion of the signal spatially. An access terminal including multiple receiving antennas may be a Minimum Mean Squared Error (MMSE) linear receiver, for example. An access terminal with multiple receiving antennas may also be a MMSE receiver with Successive Interference Cancellation (SIC). An MMSE type receiver having SIC may provide better capacity by first decoding a wide or local area signal, and then performing interference cancellation before decoding the venue signal.

C. Delay diversity at a transmitter may provide diversity improvement to the wide or local area signal. With multiple transmitting antennas, venue interference may be frequency selective with respect to the wide or local area signal. The system should be designed such that the interference power fades with the wide or local area signal power on average.

An example of a MIMO system for venue-cast is given by:

$$\begin{pmatrix} Y_1 \\ Y_2 \end{pmatrix} = \begin{pmatrix} H_{11} & H_{12} \\ H_{21} & H_{22} \end{pmatrix} \begin{pmatrix} aX_F + e^{-jw_k n_2} bX_V \\ e^{-jw_k n_1} aX_F + bX_V \end{pmatrix} + \begin{pmatrix} H_{13} \\ H_{23} \end{pmatrix} X_F + \begin{pmatrix} W_1 \\ W_2 \end{pmatrix}$$

Where, $Y_1$ and $Y_2$ are the receiver signals (at a given sub-carrier) on antenna 1 and antenna 2 of the receiver, $X_F$ and $X_V$ are the macro and venue signals (at a given sub-carrier), $H_{11}$, $H_{12}$, $H_{21}$ and $H_{22}$ refer to the channel gains between the MIMO transmitter (transmitting both wide/local and venue signal) and the receiver, $H_{13}$ and $H_{23}$ refer to the channel gains between a single antenna transmitter and the MIMO receiver, a and b control the power of the wide/local and venue signals, n1 and n2 are the delays of the venue and wide/local signal on antennas 1 and 2 respectively, and $W_1$ and $W_2$ are the noise at a given sub-carrier.

A system may include each of the aspects described in A, B, and C above.

Multiple antenna receivers may perform the following steps: (1) estimate both wide/local area and venue channels for each antenna, (2) decode wide/local area and venue signals by using either a MMSE or a MMSE-SIC receiver.

Single antenna receivers will operate in a normal manner. The received signal for a single antenna receiver is given by:

$$Y_1 = (H_{11} + e^{-jwkn1}H_{12})aX_F + (e^{-jwkn2}H_{11} + H_{12})bX_V + H_{13}X_F + W_1$$

The power of the venue interferer is determined by the parameter b. The total power of the venue signal across all sub-carriers is at a fixed level below the power of the wide/local signal from the MIMO transmitter.

Therefore, a single antenna receiver can operate as if there were no venue-cast signal present. Thus, a single antenna receiver will not take additional steps in order to receive the wide or local area signal.

A combined signal may be sent from a transmitter having multiple antennas, such as two transmitting antennas. The combined signal may be sent in a number of ways. First, the first transmitter may transmit a local area transmission and the second transmitter may transmit a venue transmission superposed on the local area transmission. Second, the two antenna transmitters may function as a repeater for the local area signal while simultaneously inserting the venue content. In this situation, both antennas would transmit a combined signal.

FIG. 16 illustrates a repeater type, dual antenna venue transmission system 1600 that is capable of transmitting a combined signal from both antennas. In FIG. 16, the venue transmission system 1600 includes an antenna 1601 for receiving the wide or local area transmission $X_F$ and a venue signal generator 1602 that generates venue specific content to be inserted with the local area waveform. The venue transmission system includes two transmission antennas, a first transmission antenna 1603 and a second transmission antenna 1604. Both antenna 1603 and antenna 1604 transmit a combination of local data and venue specific data. Antenna 1603 receives the local area signal $X_F$ after it has been scaled with a scaler 1605 and venue transmission signal $X_V$ after it has been delayed at a delay element 1606 by an amount $D_2$, scaled at a scaler 1607, and added to the local area signal $X_F$. Antenna 1604 receives the venue transmission signal $X_V$ after it has been scaled at scaler 1608, and the local area signal $X_F$ after it has been delayed by an amount $D_1$ at delay element 1609, scaled at a scaler 1610, and added to the venue transmission signal $X_V$.

The signals from the two antenna transmitters may be received by a mobile device 1620 having either one antenna receiver or two antenna receivers. Two antennas 1621, 1622 are illustrated in FIG. 16.

An access terminal having one antenna receiver is able to decode the transmission in order to receive the local area transmission, whereas a two antenna receiver may be configured to receive and decode both the local area transmission and the venue transmission.

Multiple antenna receivers decode the signals by first estimating both the local area and venue channels for each antenna. Then, the receiver decodes the local area signal by treating the venue signal as interference. Then, in order to decode the venue signal, the receiver treats the local signal as interference and cancels the local area signal spatially. Subsequently, the receiver alternately, successively performs interference cancellation.

By transmitting the mix of signals on multiple antennas using a predetermined power ratio, a and b, between the local area and venue signals, a receiver with multiple antennas can decode the two signals. In addition, delaying either the local area or venue signal by a predetermined amount assists the receiver in distinguishing the two channels.

This venue transmission system 1600 functions similar to a repeater while at the same time inserting venue specific content into the transmission.

A venue transmission system may be configured so as to transmit a signal that can be received by a single antenna receiver, a multiple antenna receiver, or both. Interference cancellation can be used to first decode a stronger signal and then to cancel the stronger signal and decode a weaker signal in order to decode one of the combined signals.

v. Single Antenna Repeater

As noted above, a venue transmission system may use a single antenna repeater type system. For a single antenna repeater system, additional processing may be provided at the venue transmission system 900 including channel estimation and superposition. In order to perform channel estimation, the venue transmission system will estimate a channel from the wide/local area transmitter to the repeater. Repeating transmitters send signals corresponding to the macro network, or the wide/local area network. The repeater combines the venue signal with the macro signal from the macro network transmitters and re-transmits the signal. Thus, the venue transmission system may be considered the repeater, because it re-transmits the wide/local area signal combined with the venue content.

The system may then use the estimated channel to scale venue data to be superposed on the wide/local area transmission. For example, if the wide/local area signal received at the venue transmission system is:

$$Y[k] = H_{TR}[k]X_F[k]$$

Then, the signal sent by the venue transmission transmitters may be described as:

$$T[k] = H_{TR}[k]X_F[k] + H_{est,TR}[k]X_V[k],$$

where $H_{TR}[k]$ represents the channel from the transmitter to the repeater and $H_{est,TR}$ is the venue transmission system's estimate of the channel received from the wide/local area transmitter at the venue transmission system. Thus, it is an estimated channel from the transmitter to the repeater. It is a value determined at the repeater, or the venue transmission system.

3. Broadcast Use Cases i. Location Targeted Transmission

A transmission system may broadcast multiple broadcast streams with information targeted to specific areas or venues. Although an exemplary aspect using a broadcast stream is described, multicasting and unicasting may be used in the alternative or in addition to broadcasting. A mobile device may include a feature for automatically tuning to receive one of the multiple broadcasts based on the location of the mobile device relative to one or more of the respective specific areas or venues.

A broadcast system may include one or more transmit stations. The transmit stations may provide coverage to a large area, such as a city, and/or to a smaller coverage area, such as a venue within a city. The broadcast system may broadcast a transmission including an existing or an additional overhead channel.

Currently, location-based filtering of transmissions is based on a local area identifier (LOI), which relates to a collection of one or more transmitters. In other words, in this scenario, the smallest level of granularity available is a one transmitter site, which has a relatively large cell size, e.g. 5-15 KMs, typical of broadcast transmitters. In contrast, the geographic region of a venue or a targeted area may be much smaller than the associated local area of a typical broadcast transmitter. As such, in order to perform venue level filtering, smaller cells would need to be created by creating new, smaller areas by installing new transmitters. Such a solution would be a costly undertaking.

Figure 17:
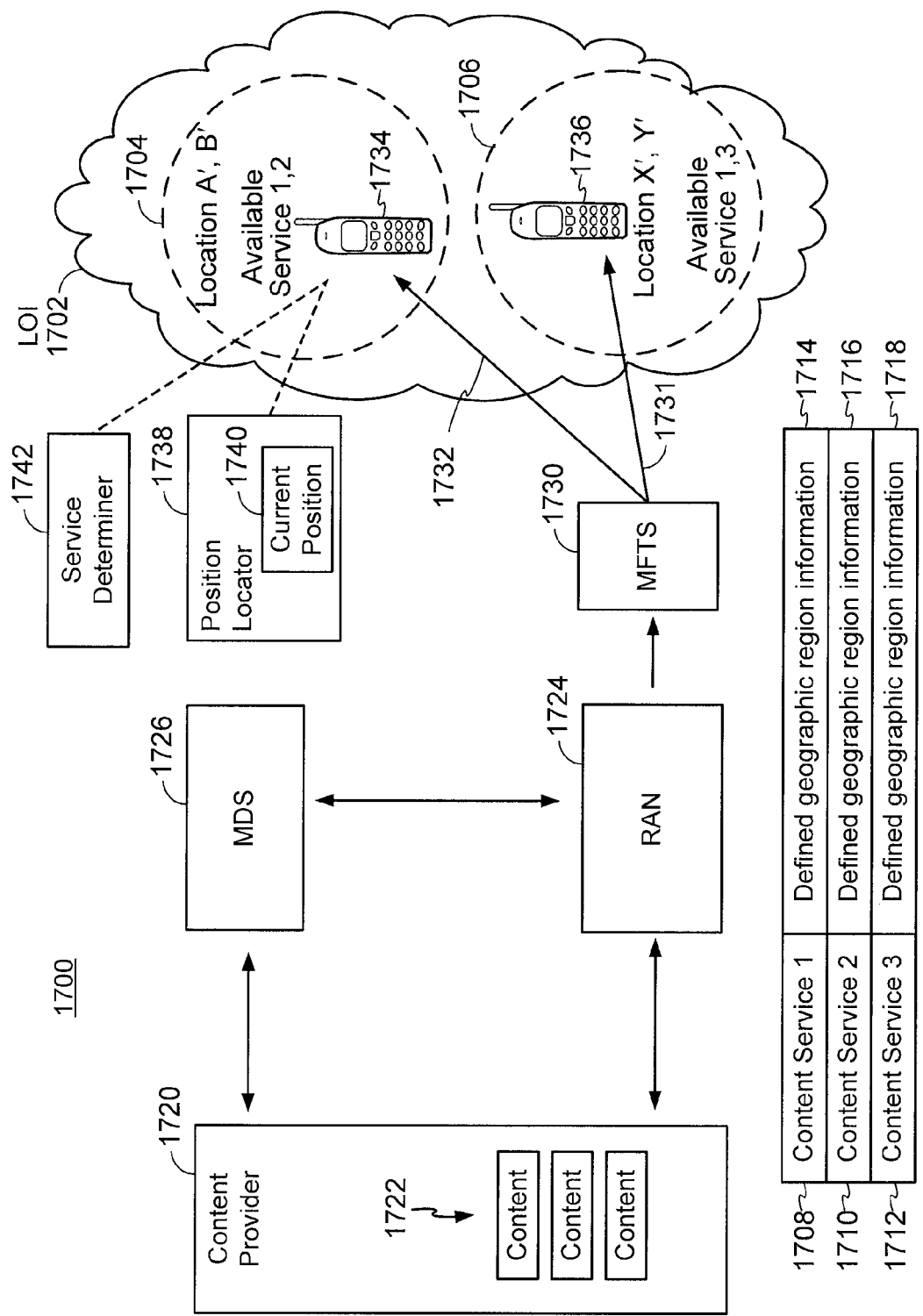
FIG. 17 depicts aspects of an exemplary venue-cast system including targeted content.

Alternatively, the described aspects provide targeted programming to a specific location, or venue or micro area, within a macro cell or Local Area, by applying dynamic location based filtering criteria. FIG. 17 illustrates an exemplary venue targeted system 1700.

In FIG. 17, one or more geographic areas, such as regions 1702, 1704 and 1706, are defined, and one or more content services, such as services 1708, 1710 and 1712, may be designated for each of the one or more regions in order to provide targeted programming. Each defined geographic area may be actively managed by an operator so that the area can be defined and re-defined as desired. For example, the geographic area may be defined based on a range or defined set of latitudes and longitudes, based on a range from a given geographic point, such as a radius from the location of the transmitter, etc. It should be understood, however, that other definitions of a defined geographic area may be utilized.

For example, first region 1702 may be targeted for information relating to service content 1708, where first region 1702 represents an entirety of an LOI. For example, service content 1708 may be referred to as local area content that applies to LOI. Second region 1704 may be targeted for information of service content 1710, where second region 1704 represents a second area within the LOI. In this case, service content 1710 may be referred to as targeted content or venue-specific content for a venue corresponding to second region 1704. Third region 1706 may be targeted for information of service content 1712, where third region 1706 represents a third area within LOI, where the third area is different from the second area. As such, service content 1712 may also be referred to as targeted content or venue-specific content, but for a venue corresponding to third region 1706.

Information regarding the defined geographic region for which a given service content is intended may be an additional transmission element transmitted with the content. For example, the defined geographic region information may be transmitted as a defined geographic region identifier, or specific defined geographic region coordinates. Further, for example, the defined geographic region information may be transmitted as overhead data. For instance, in an example for the MediaFLO™ system, the defined geographic region may be transmitted as service ID/FLOW ID mapping on overhead data. In the above example, defined geographic region information 1714, 1716 and 1718 respectively correspond to content services 1708, 1710 and 1712.

One or more content providers 1720 supplies one or more pieces of content 1722, which may form all or some portion of one or more content services, such as content services 1708, 1710 and 1712. A radio access network (RAN) 1724 and/or a media distribution system (MDS) 1726 may receive the content 1722 and generate service programming, e.g. content services 1708, 1710 and 1712. Subsequently, RAN 1724 and/or MDS 1726 provides a transmission system (TS) 1730, such as a MediaFLO™ Transmission System (MFTS), access to one or more of the content services 1708, 1710 and 1712. Accordingly, TS 1730 generates a transmission 1731, 1732, such as a broadcast transmission, for reception within a TS cell or service area, such LOI 1702.

A mobile device, such as devices 1734 and 1736, receiving transmission 1731, 1732 may include a position locator component 1738 configured to identify a current position 1740 of the device. For example, position locator component 1738 may include, but is not limited to, a position module having hardware, software, and/or executable instructions configured to receive and triangulate signals, such as from satellites or terrestrial stations, and to compute current position 1740 or to communicate with a position determination entity on a network to obtain the current position 1740. For instance, position locator component 1738 may include a global positioning system (GPS) component to determine current location 1740. In some aspects, the current location 1740 may be defined as a current latitude and longitude, although other location descriptors, such as geographic names or network-based identifiers or names, may also be utilized.

Additionally, each device 1734 and 1736 may further include a service determiner component 1742 configured to receive current location 1740 and utilize this information to filter the received transmission 1731, 1732 based on the location of the device 1734 or 1736 relative to one or more defined geographic areas 1702, 1704 and 1706 corresponding to one or more content services 1708, 1710 and 1712 carried by the transmission. For example, service determiner component 1742 may include, but is not limited to, hardware, software, and/or executable instructions configured to determine whether or not a given current location 1740 is within a given range of one or more defined geographic areas 1702, 1704 and 1706. For instance, the given range may be a distance, which can include a value of zero to thereby require the device to be within the given defined geographic area. In any case, service determination component 1742 of allows the device to receive and decode the corresponding portion of the transmission 1732 if the current location is within the given range, or allows the device to bypass receiving and decoding of the corresponding portion of the transmission 1706 if the current location is outside of the given range.

For example, in FIG. 17, mobile device 1736 has a determined location X', Y', within area X to Y corresponding to second region 1706, and mobile device 1734 has a determined location A', B', within area A to B corresponding to third region 1704, and both devices 1736 and 1734 are also located within the LOI 1702. Accordingly, service determiner component 1742 for each device 1708 and 1709 compares the respective current location of the respective device to one or more the defined geographic regions corresponding to the one or more content services. Thus, in this case, mobile device 1734 receives and decodes content services 1708 and 1710, otherwise referred to as the local area content and the targeted content for the second region, while mobile device 1736 receives and decodes content services 1708 and 1712, otherwise referred to as the local area content and the targeted content for the third region.

Therefore, each device 1734 and 1736 filters the transmission 1732 based on its current location and the one or more defined geographic region information 1714, 1716 and 1718 associated with the one or more content services 1708, 1710 and 1712 within the transmission 1732.

Figure 18:
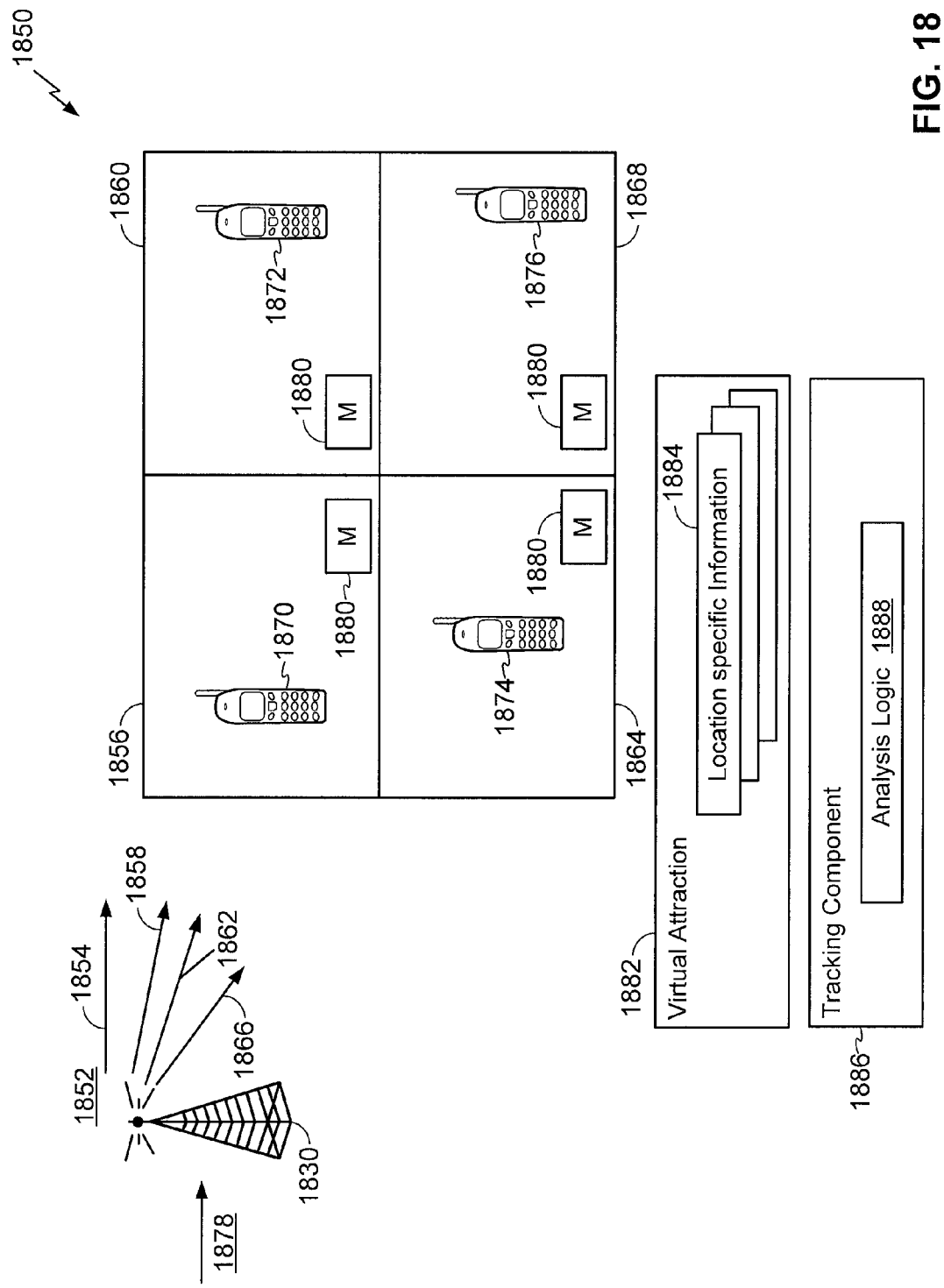
FIG. 18 depicts aspects of an exemplary venue-cast system.

Additionally, in another aspect, the content service may provide service information targeted to mobile device users within a particular broadcast area. For example, the content service may broadcast traffic information. FIG. 18 illustrates aspects of an exemplary broadcast system 1850. A TS 1830 may generate a transmission 1852 having a first content service or broadcast stream 1854 providing traffic information relating to a first targeted area 1856, a second content service or broadcast stream 1858 providing traffic information relating to a second target area 1860, a third content service or broadcast stream 1862 providing traffic information relating to a third target area 1864, and a fourth content service or broadcast stream 1866 providing traffic information relating to a fourth target area 1868. Although four broadcast streams and target areas are shown, any number of broadcast streams and/or target areas can be used. Similarly, although illustrated as rectangles, the target area may be defined as having any shape. Mobile device 1870, based on a determination of its location being within first target area 1856, automatically tunes, or filters the received transmission 1852, to receive the traffic information for first target area 1856, whereas mobile devices 1872, 1874 and 1876 automatically tune to receive the traffic information for respective target areas 1860, 1864 and 1868 based on similar functionality. Further, each mobile device may automatically adjust it filtering capabilities based on updated current location information. For example, if mobile device 1870 travels into second target area 1860, it would automatically tune to receive the second stream 1858 of traffic information for second target area 1860 and filter out or otherwise disregard first stream 1854, which device 1870 had previously been receiving.

In addition to service information, the content service may provide advertising information for any number of vendors or attractions within a target area. For example, the content service or broadcast stream 1854 for target area 1856 may include advertisements or information regarding shopping offers for stores, businesses, restaurants, performances, and other attractions within first target area 1856. The advertisements may also include offers, sale information, or coupons for any of these businesses and attractions.

Additionally, each respective content service or broadcast stream may provide service information such as flight information at an airport or travel information at a train or bus station associated with the respective target area.

In other aspects, each respective content service or broadcast stream may also provide information about events at theme parks, fairs, race tracks, shopping malls, casinos, trade shows, conventions, campuses, retail superstores, and other multiple attraction type areas.

Thus, system 1850 provides one or more content services or broadcast streams, e.g. streams 1854, 1858, 1862 and 1866, for one or more corresponding areas, e.g. 1856, 1860, 1864 and 1868, wherein such streams include information regarding pertinent information corresponding to the respective area, such as information relating to businesses or attractions within the respective areas. Mobile devices 1870, 1872, 1874, and 1876 located in or near these areas are configured to automatically tune to the respective broadcast stream corresponding to their physical location, e.g. by applying a filter to transmission 1852. Accordingly, system 1850 allows focused information and advertising to be targeted to end users in the vicinity of an attraction.

B. BCMCS

Figure 19:
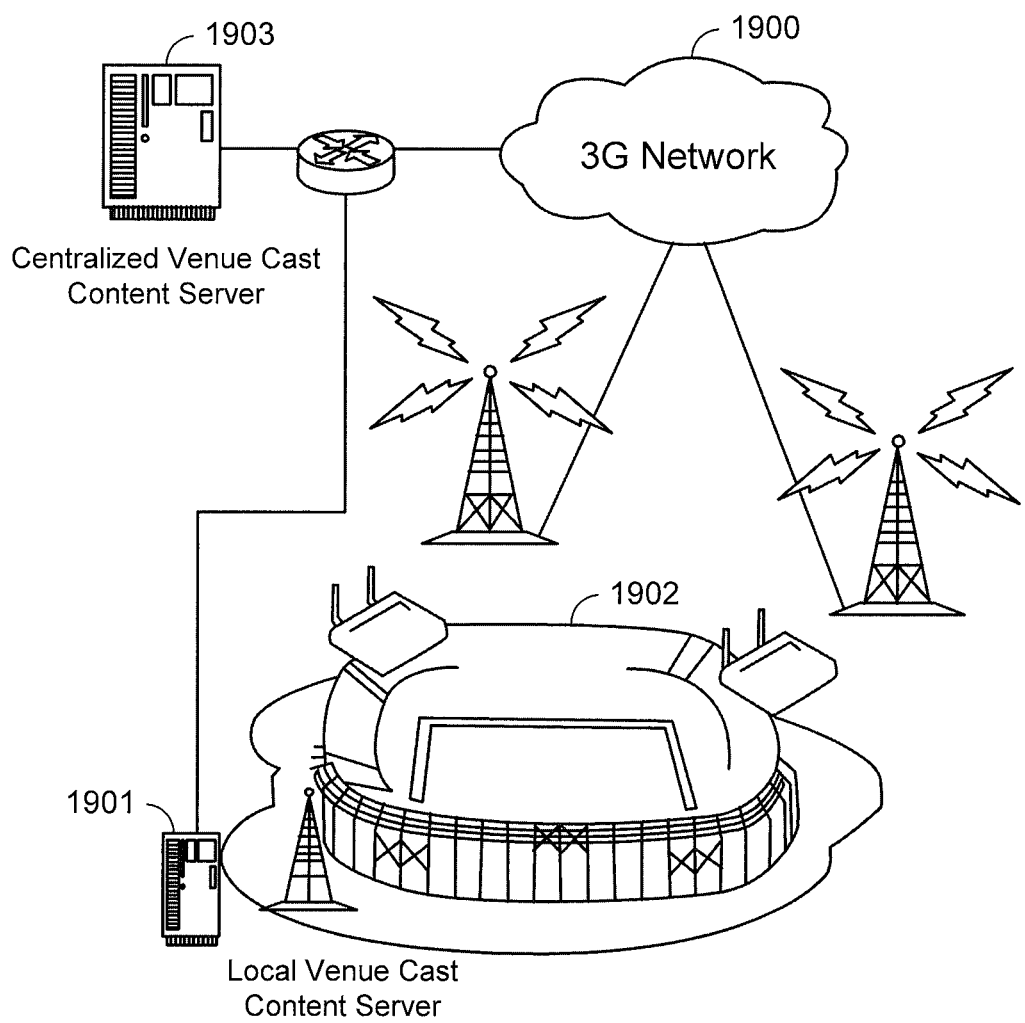
FIG. 19 depicts aspects of an exemplary venue-cast system employing a 3G network.

FIG. 19 illustrates a variation of a venue-cast system using a 3G network 1900. The venue-cast system may include a local venue cast content server 1901 that receives and stores real-time content from the venue 1902. The venue-cast system may also be connected to a centralized venue-cast content server 1903. The centralized server minimizes the equipment cost for venue content providers and provides adequate services for non-real-time services such as clip-cast or file-cast. A distributed server configuration also enables high performance real-time video/audio streaming applications because it lowers the backhaul delay and jitter for these real-time applications. A hybrid server configuration, using both a centralized and local server provides a flexible network architecture for the various venue applications.

Figure 20:
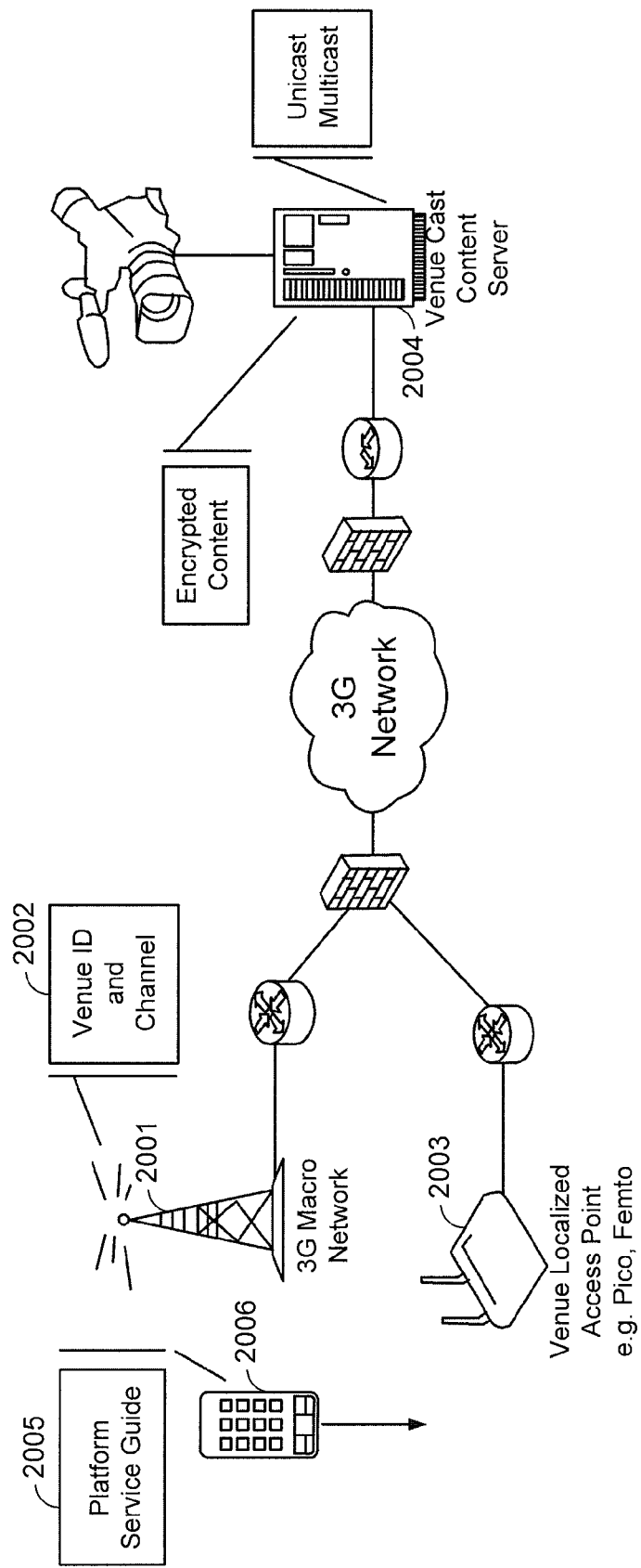
FIG. 20 depicts aspects of an exemplary venue-cast system including service discovery aspects.

FIG. 20 illustrates a 3G macro network providing information regarding service discovery for a venue-cast system. As described above, the macro network 2001 may transmit venue identifier information 2002 regarding the venue transmission, such as a venue identifier and a channel on which the venue-cast is being transmitted. An AT 2006 may receive the venue identifier during its wake up cycle. The venue identifier may be used by the AT to monitor venue specific channel information. The macro network 2001 may also provide information an accessing a service guide 2005 for the venue-cast. As discussed above, an AT 2006 may access the service guide via the macro network, via a website, etc. The service guide may be similar to a MediaFLO™ system type service guide. By providing a common service guide, venue specific service guides may be provided independent of the types of receiving ATs. The venue-cast transmitter may be a localized access point 2003 having a smaller scale, such as a picocell or femtocell. The venue-cast system also includes a content server 2004, which may be local, centralized, or a hybrid configuration using both a local and a centralized server.

Figure 21:
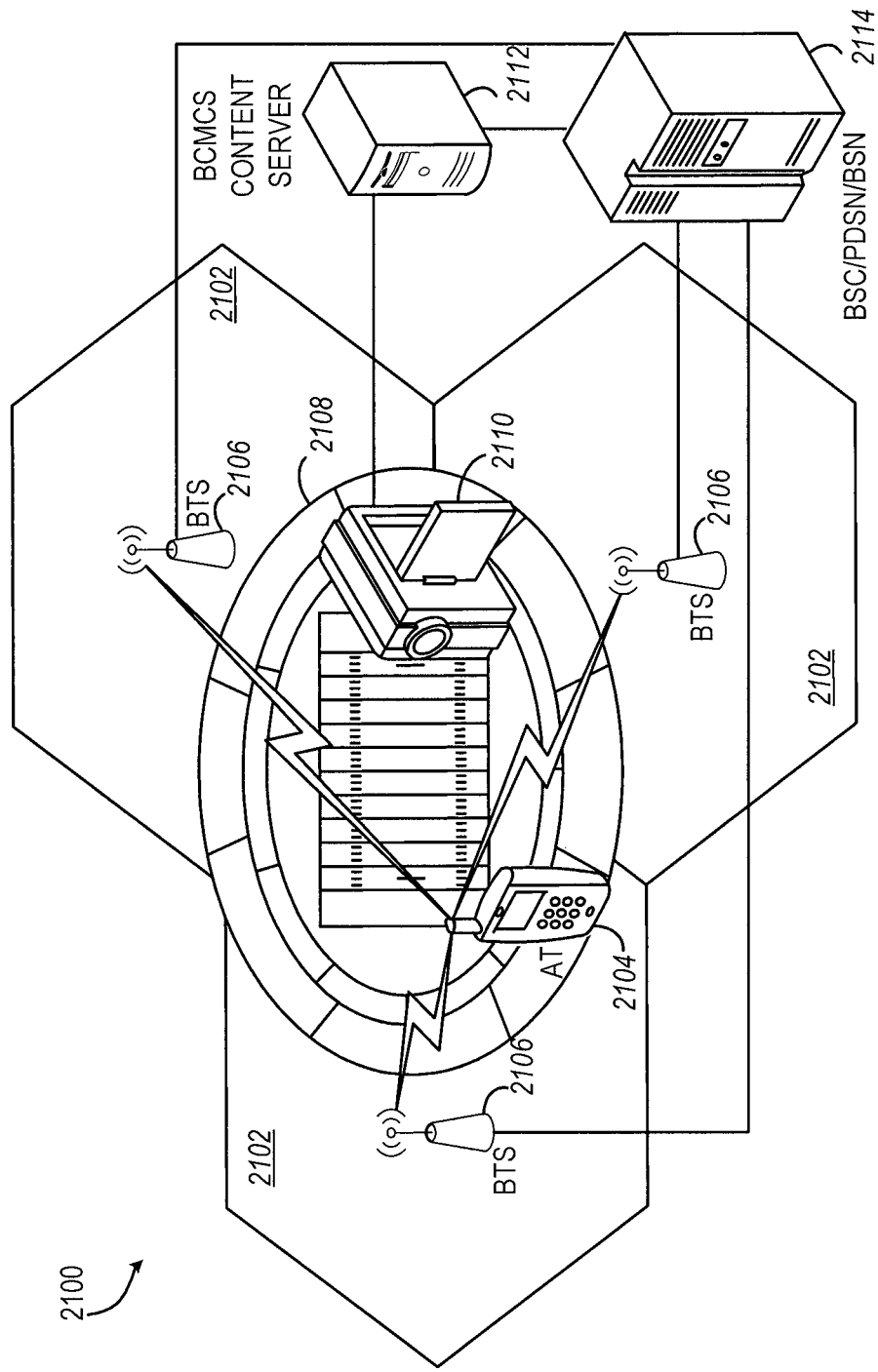
FIG. 21 depicts aspects of a network architecture for an exemplary venue-cast system.

In one aspect, venue-cast can be realized with one or more different network architecture designs. For example, depicted in FIG. 21 as an overlapping BTS-venue AP arrangement 2100 provides venue-cast delivery in respective coverage areas 2102 for mobile devices (or access terminals (AT)) 2104 directly from one or more macro EV-DO base transceiver systems (BTS) 2106 near venue, such as a large theme park or sports complex (venue) 2108. A second design provides plug-and-play venue-cast delivery using on-site BCMCS equipment, which can be particularly desirable for live, content streaming (discussed below). The mobile content channels that include venue-cast content can originate in the venue 2108, depicted as video captured by a video camera 2110 that are stored and relayed by a BCMCS server 2112 to a BSC/PDSN/BSN 2114 (e.g., base station controller, packet data serving node, broadband service node) and on to the BTS(s) 2106.

It should be appreciated that higher-layer design features are included to provide an end-to-end system specification. A Service Guide (SG) design can be based upon a broadcast service guide format, such as the MediaFLO™ Media Presentation Guide (MPG) standard, for example adapted to an EV-DO air interface. Real-time streaming experience optimization can be performed at the receiver (mobile device 2104). Non-real-time content delivery can be based upon file delivery protocol/file delivery control protocol (FDP/FDCP) adapted to IP. Security can enable subscription based on existing BCMCS key architecture and secure content delivery via Open Mobile Alliance (OMA) Digital Rights Management (DRM) format.

Figure 22:
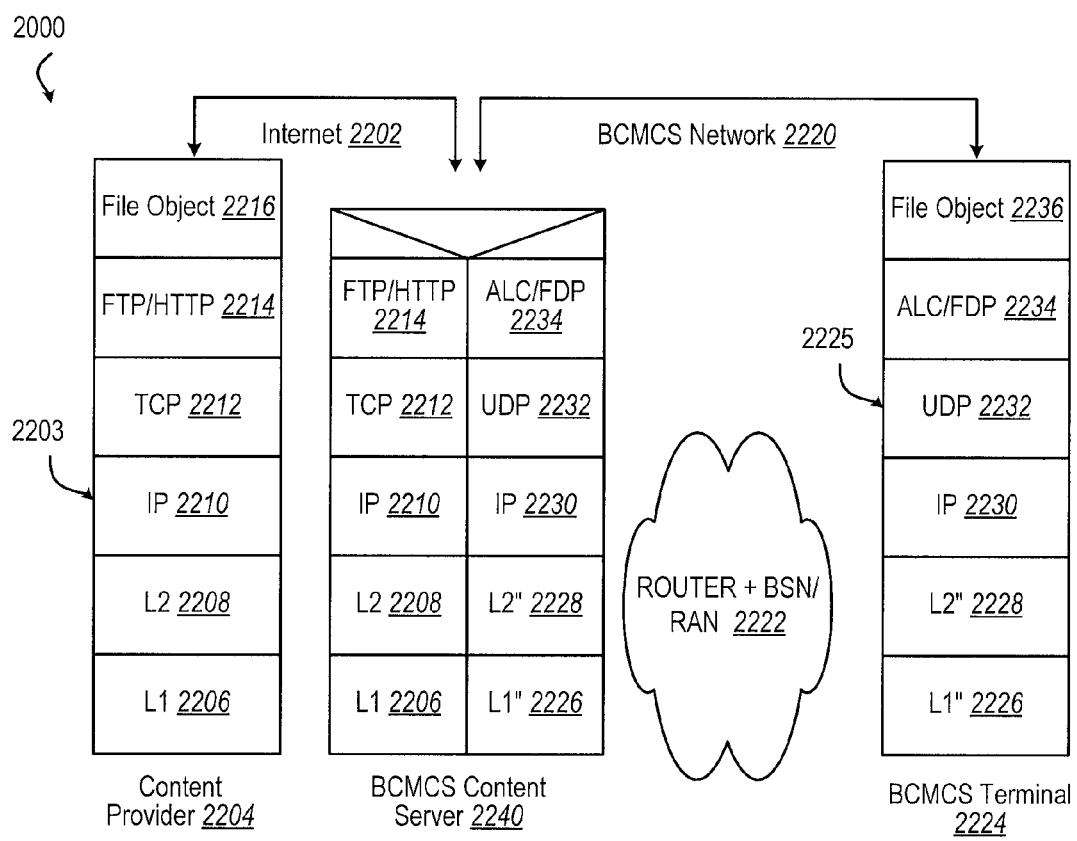
FIG. 22 depicts aspects of an exemplary protocol stack and encapsulation structure for file delivery over an exemplary venue-cast system.

Referring to FIG. 22, in one aspect, a file delivery over venue-cast protocol stack and encapsulation protocol structure 2200 is depicted. The Internet portion 2202 of venue-cast Service Guide (SG) uses a protocol stack 2203 from a content provider 2204 as L1 layer 2206, L2 layer 2208, IP layer 2210, TCP layer 2212, FTP/HTTP layer 2214 and File Object layer 2216. A BCMCS network portion 2220 originating from a router+BSN/RAN 2222 and broadcast by BCMCS terminal 2224 has a protocol stack 2225 of an L1* layer 2226, L2* layer 2228, IP layer 2230, UDP layer 2232, ALC/FDP layer 2234 and file object layer 2236. In order to merge at a highest layer the file object layer 2216, 2236, a BCMCS content server has to process the dissimilar underlying five layers as depicted at 2240.

Figure 23:
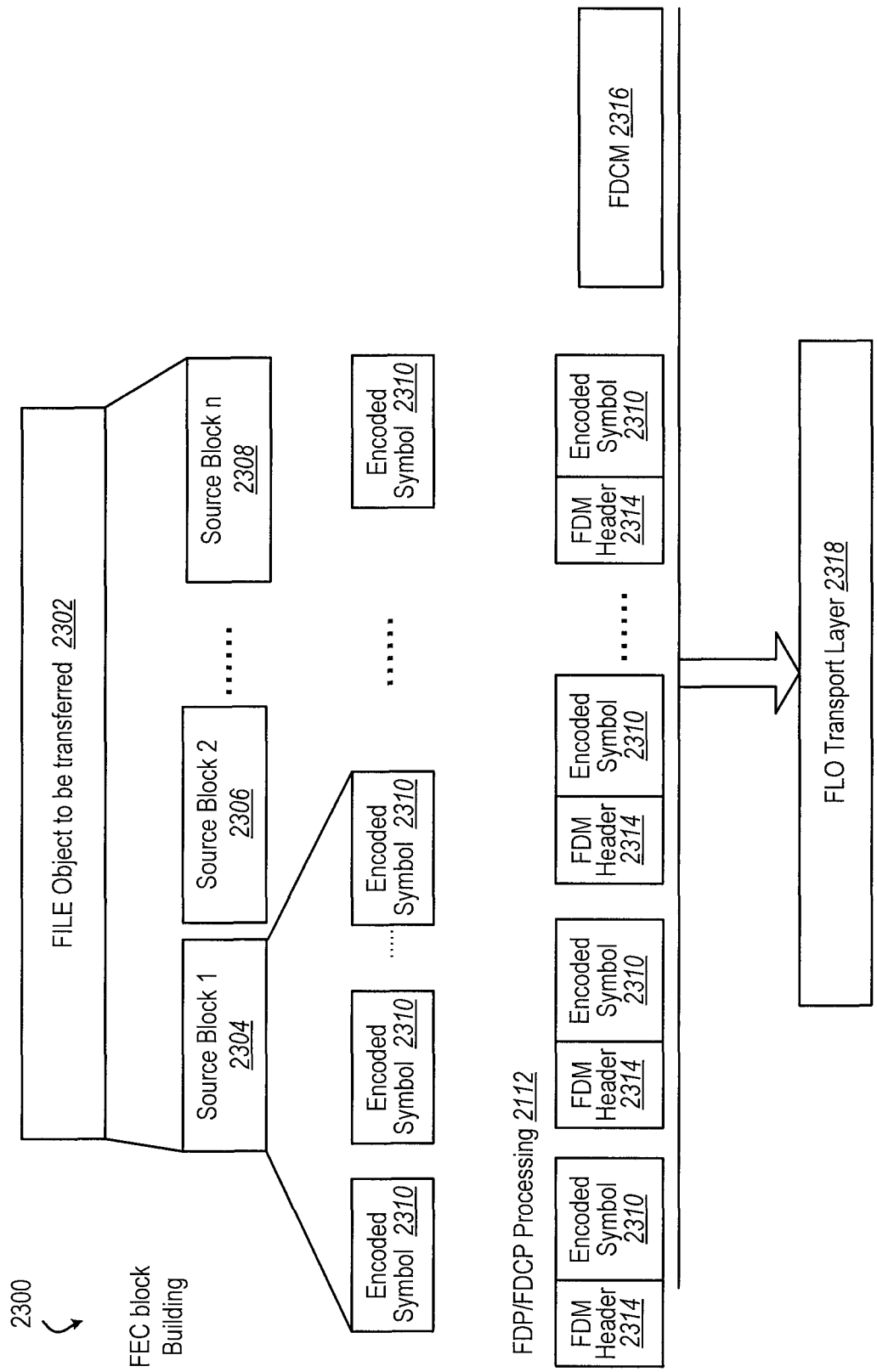
FIG. 23 depicts aspects of an exemplary data structure for file delivery over an exemplary venue-cast system.

Referring to FIG. 23, in an aspect, a data structure 2300 is depicted for file delivery over venue-cast FDP/FDCP procedure. A file object 2302 to be transferred undergoes a file error correction (FEC) block building to form source block 1 2304, source block 2 2306, to source block n 2308. Each block 2304, 2306, 2308 becomes a plurality of encoded symbols 2310. FDP/FDCP processing prepares each encoded symbol 2310 by adding an FDM header 2314, along with an FDCM block 2316, which is sent to a FLO transport layer 2318 for transmission.

Figure 24:
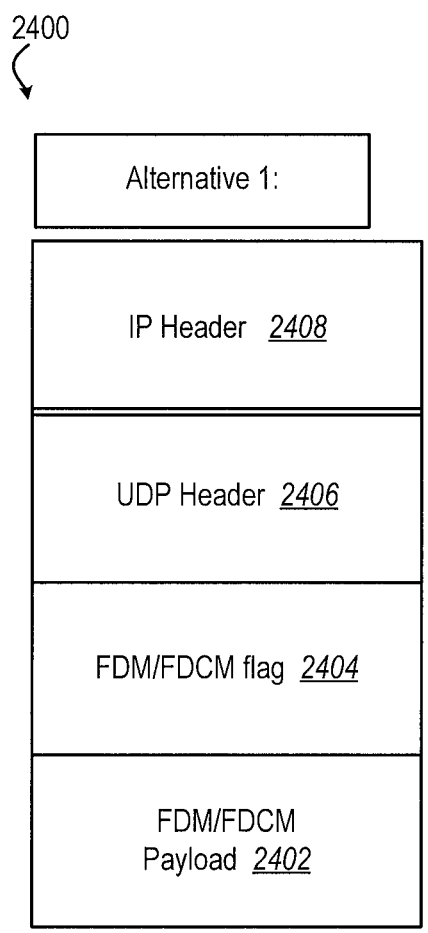
FIGS. 24-25 depict aspects of exemplary data structure stacks for file delivery over exemplary venue-cast systems.

Referring to FIG. 24, in an aspect, a data structure stack 2400 depicts one option wherein FDCP and FDP are sent on a separate IP/UDP port. This is depicted as being supported by the stack 2400 comprising an FDM/FDCM payload layer 2402, an FDM/FDCM flag 2404, a UDP header 2406, and an IP header 2408. FDP/FDCP traffic can be differentiated based on UDP port number. The FDM/FDCM format can be encapsulated into the individual UDP payload directly with no merge/modification. Similar treatment is given for FDM and FDCM as in existing MediaFLO™ system.

Figure 25:
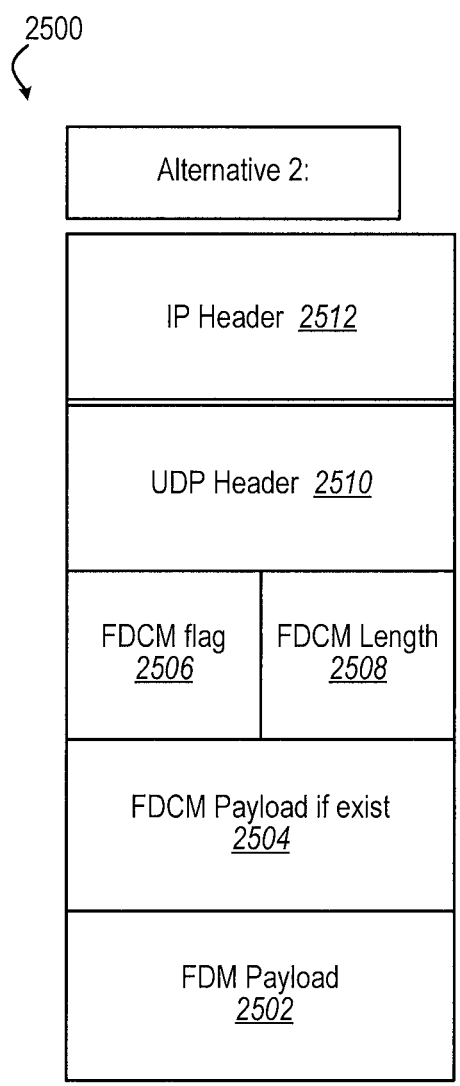

Referring to FIG. 25, in an aspect, another data structure stack 2500 depicts another option wherein FDCP and FDP share the same IP/UDP port. To that end, the stack 2500 comprises an FDM payload layer 2502, an FDCM payload layer (if exists) 2504, a next layer has an FDCM flag 2506 and FDCM length block 2508. The stack 2500 further comprises UDP header layer 2510 then an IP header layer 2512. Additional header thus could be employed to differentiate FDP/FDCP traffic. The FDM/FDCM format can be encapsulated into UDP payload after the new header.

Figure 26:
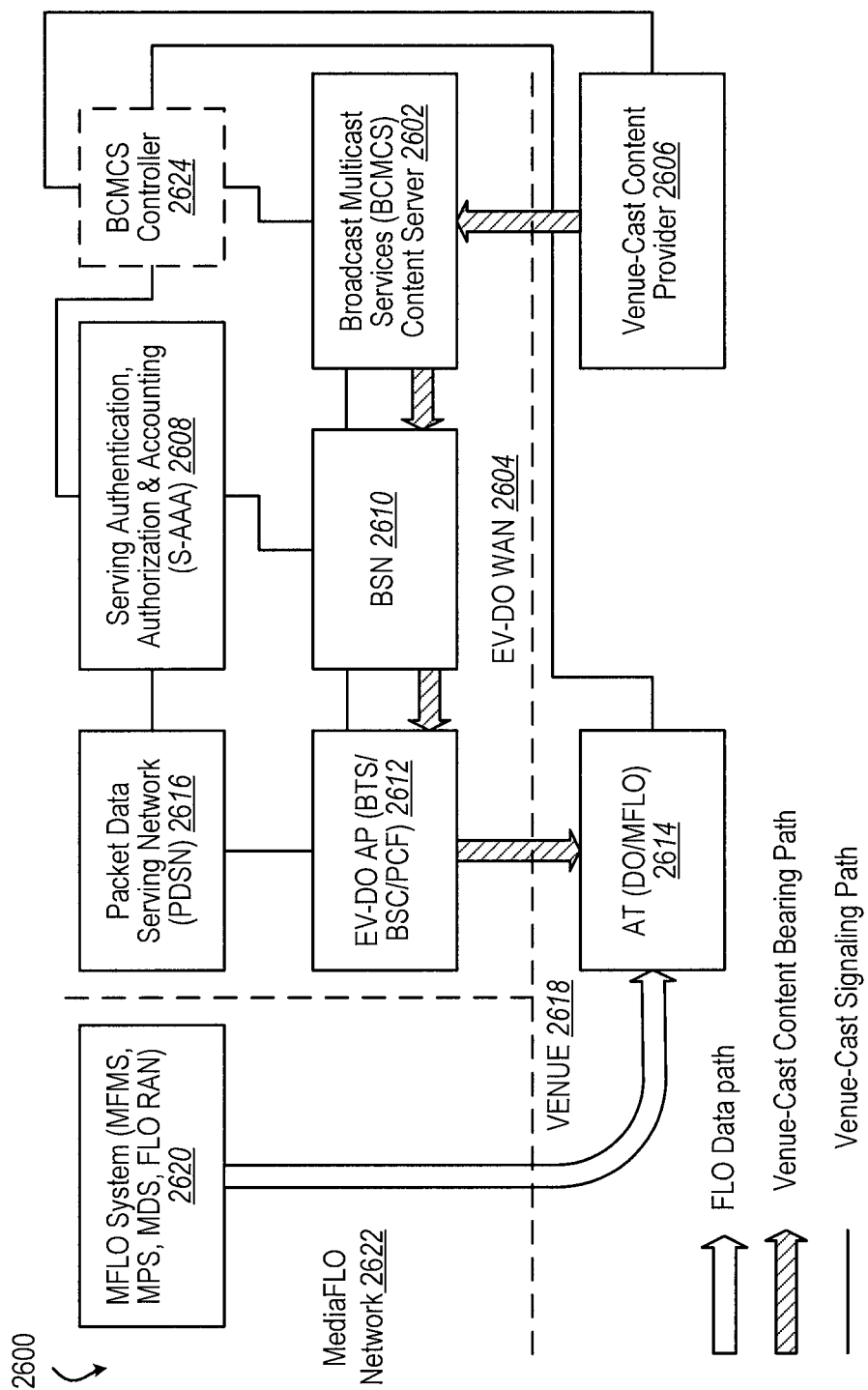
FIG. 26 depicts aspects of a block diagram of an exemplary venue-cast system that leverages use of a static BCMCS system.

In FIG. 26, in another aspect, a venue-cast system 2600 leverages use of a static BCMCS system, depicted as a BCMCS content server 2602 of an EV-DO WAN 2604 that receives venue-cast content from a provider 2606 at venue 2618. The BCMCS content server 2602 provides venue-cast signaling and content to a broadband service node (BSN) 2610, which in turn provides the venue-cast signaling and content to an EV-DO AP (BTS/BSC/PCF) 2612 that wirelessly transmits the venue-cast content as packetized data to an AT (e.g. a multi-mode DO/MediaFLO™ device) 2614 and sends venue-cast signaling to a PDSN 2616 for coordinating with a serving authentication, authorization and accounting (S-AAA) component 2608. An MediaFLO™ system 2620 of a MediaFLO™ network 2622, which may include one or more of a MediaFLO™ Management System (MFMS), a MediaFLO™ Provisioning System (MPS), a media distribution system (MDS), and a FLO radio access network (FLO RAN), provides broadcast FLO content to the AT 2614. In some implementations, a BCMCS controller 2624 handles authentication and other functions and has interfaces with the S-AAA 2608, AT 2614, BCMCS content server 2602, and venue-cast content provider 2606.

Characteristics of a static BCMCS system include programs that are broadcasted at pre-determined time and data rate. Network resources (e.g., air-link bandwidth, IP address, bearer path, etc.) are statically allocated to the BCMCS transmission independent of user presence. In some aspects, the existing BCMCS security key exchange mechanism is not used. In some aspects, as service provider receives revenue from venue-cast package subscriptions and/or from an advertiser/sponsor of various content. This architecture can advantageously provide low implementation cost and rapid deployment due to reuse of existing network elements. In some aspects, all BCMCS network entities except the content provider may reside in the operator network. Also, a venue content originator provides service content and a service guide to the BCMCS content server. Further, aspects provide for placement of network entities to ensure full operator control and minimize equipment cost for venue-cast owner.

Static venue-cast service allows significant simplification to network architecture, such as static mapping between multi-cast IP address, port number and BCMCS flow. Static content bearer path setup can be made from content server to BSN to access network(s) (AN(s)) serving the venue area. A venue-cast service guide (SG) can be advertised in a BCMCS information flow, which is detectable by the AT via a BCMCS Overhead Message (BOM) in a synchronous control channel (SCC). Thus, in this aspect, no need exists for BCMCS controller 2624 and the associated interfaces.

With regard to providing venue-cast service over EV-DO WAN network, aspects support the reservation of a multicast IP address and port number. For example, aspects allow a reservation of N bits multicast IP address and M bits of port ID on operator network for venue-cast service, where N and M are positive numbers (e.g., N=9 and M=3 for a MediaFLO™ system over BCMCS). In some aspects, for example, the IP address may be selected from an organization local scope address assigned by IANA, e.g. 239.192.0.0-239.251.255.255 for IPv4 and from FF18:0-FF18:FFFF:FFFF for IPv6. In some aspects, for example, the port number may be selected from private ports 49152-65535. Additionally, for example, a unique pair of multi-cast IP address and port ID may be assigned to every venue-cast content channel, also referred to as an information flow, provided to the operator. Additionally, in some aspects, a multicast content delivery bearer-path set up is supported. Further, in some aspects, a bearer path may be pre-established for content delivery from a content server to BSN to RAN. In some aspects, BSN provides sector ID information in A11-BC service initiate request to route the multicast packets to the appropriate sector(s). With regard to air link resource reservation, some aspects provide for pre-allocation of air link resources to broadcast all BCMCS flows from RAN. In some aspects, one of the flows is for periodic SG transmission. At a given venue area, the flow IDs for all available venue-cast content channels, as well as the SG channel, is contained in the BCMCS Overhead Message (BOM).

As for access terminal (AT) provisions for static venue-cast service over EV-DO WAN, the multicast IP address and port number for the SG channel is provided to the AT. The SG IP address and port number can be hard-coded in the mobile device or downloaded via a venue-cast application. The AT may periodically perform service discovery and SG updates. Also, the AT can find and update the SG channel at a venue periodically and/or upon a location change. A SG channel search/update can be triggered by a venue-cast application on the AT via a timer expiration and/or via a location change. Further, the AT may find the SG channel availability by decoding information in the BOM.

II. Receiving Access Terminal

Various aspects are described herein in connection with a terminal, which can be a wired terminal or a wireless terminal, herein referred to interchangeably as a mobile device. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal or mobile device may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. As used herein, a mobile device may be a dedicated, purpose-built mobile device such as a handset or may be a multi-purpose mobile device that can be used beyond a particular venue. A dedicated device or a multi-purpose mobile device may include core hardware to receive transmitted data such as data broadcast/unicast over an air interface.

In order to receive a venue-cast transmission an access terminal may include components, such as computer code stored in a computer readable medium that enables the access terminal to detect the presence of a venue or of a venue-cast transmission and to obtain the venue-cast overhead information. Such computer code may also enhance the PHY performance for venue-cast reception.

Referring to FIG. 15, in one representative aspect, wireless communications device 1500, herein referred to interchangeably as a mobile device, includes a mobile communication device operable on a wireless communication system. As can be appreciated, there are a variety of wireless communication systems, which often employ different spectrum bandwidths and/or different air interface technologies. Exemplary systems include CDMA (CDMA 2000, EV DO, WCDMA), OFDM, or OFDMA (Flash-OFDM, 802.20, WiMAX), FDMA/TDMA (GSM) systems using FDD or TDD licensed spectrums, peer-to-peer (e.g., mobile-to-mobile) ad hoc network systems often using unpaired unlicensed spectrums, and 802.xx wireless LAN or BLUETOOTH techniques.

Wireless communications device 1500 includes processor component 1501 for carrying out processing functions associated with one or more of components and functions described herein. Processor component 1501 can include a single or multiple set of processors or multi-core processors. Moreover, processing component 1501 can be implemented as an integrated processing system and/or a distributed processing system.

Wireless communications device 1500 further includes a memory 1502, such as for storing local versions of applications being executed by processor component 1501. Memory 1502 can include random access memory (RAM), read only memory (ROM), and a combination thereof.

Further, wireless communications device 1500 includes a communications component 1503 that provides for establishing and maintaining communications with one or more parties utilizing hardware, software, and services as described herein. Communications component 1503 may carry communications between components on wireless communications device 1500, as well as between wireless communications device 1500 and external devices, such as devices located across a communications network and/or devices serially or locally connected to wireless communications device 1500.

Additionally, wireless communications device 1500 may further include a data store 1504, which can be any suitable combination of hardware and/or software, that provides for mass storage of information, databases, and programs employed in connection with aspects described herein. For example, data store 1504 may be a data repository for applications not currently executing.

Wireless communications device 1500 may additionally include a user interface component 1505 operable to receive inputs from a user of wireless communications device 1500, and to generate outputs for presentation to the user. User interface component 1505 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 1505 may include one or more output devices, including but not limited to a display, a speaker, a haptic feedback mechanism, a printer, any other mechanism capable of presenting an output to a user, or any combination thereof.

Additionally, wireless communications device 1500 may further include one or more service components for performing the actions described herein. For example, device 1500 may include service components that provide smooth receipt of venue content. Among other components, these service components may include service detection, service determination, venue application downloading, venue application deletion, user interface features, venue coverage determination, and interference cancellation.

Wireless communications device may further include a location determination component 1506. The location determination component may include various features to determine the location of a mobile device. For example, the location determination feature may include a satellite-based and/or terrestrial-based position determination component, which may operate to determine the device position or location based on local calculations and/or based on communications with a network-based position determination entity. The location determination component may, for example, provide a location of the mobile device in terms of latitude and longitude, optionally altitude, and/or in terms of network identifiers, such as an access point identifier. Further, in some aspects, for example, a location in a venue may be determined based on the strength of a signal received by the device within the location.

Wireless communications device may further include a service detection component 1507. The service detection component may include a discovery mechanism that enables the device to automatically detect, in some aspects without active intervention by a mobile device user, the presence of a venue specific transmission on a particular air interface. Such detection may occur as the mobile device user enters a boundary of the area covered by a venue transmission. The boundary may be delimited by a coverage area of a venue transmitter. In some aspects, boundary data may be included in a venue transmission, which may trigger the mobile device to only decode the venue transmission if the device is within the defined boundary.

A venue transmission signal may include PHY and MAC layers. A mobile device for receiving a venue transmission may include an enhanced PHY layer receiving component that includes a feature for programmable Fast Fourier Transform (FFT) scale factors. This ensures that the signal transmission of the venue portion of the frame is well within a multipath field of reception and enables a device to receive the transmission without operating in two different modes. It may also include a programmable time filter coefficient for the venue portion of the frame. This parameter adjusts to assist with efficient receipt of the signal.

A mobile device may also include an enhanced MAC layer receiving component. As part of a superframe transmission, Overhead Information Symbols (OIS) and control channel information may be transmitted together as a single overhead Multicast Logical Channel (MLC) with a known mode and start location. The OIS information may be included in a first frame, and control channel information may be included in subsequent frames of the superframe.

The start of the venue service portion of the superframe may be determined from information in a wide and local OIS. The mobile device may attempt to decode a venue overhead MLC. If the decoding is successful, this indicates the availability of venue service.

Additional latency may be added in order to allow venue MLC parameters to be programmed to hardware after an OIS reception.

Wireless communications device may further include a service determination component 1508. A service determination component may include a determination mechanism that allows the mobile device to determine the services being offered at a particular venue, after a device detects the presence of a venue transmission. Service determination may also include any associated applications and/or widgets that are required in order to present such services to the mobile device user.

Wireless communications device may further include a venue application downloading component 1509. Once the mobile device determines that a particular venue application is available, a venue application downloading component enables the mobile device to download the application to the mobile device wirelessly. Such downloading may be based on a determination that the application is not already present on the mobile device, and/or based on user preferences. For example, such user preferences may be set to automatically download venue applications upon the detection of a particular venue application that is not present on the mobile device. In contrast, a user preference may require a user selection to allow the application to be downloaded to the mobile device.

The mobile device may include a feature that begins to record and store a venue channel to which it is tuned. This channel may include data, audio, and/or video information. The mobile device may automatically store information that is broadcast, or may record only portions selected by a user.

Upon detection of a venue specific application, the device may acquire a directory flow, or an Initial Acquisition Flow (IAF). Then, using the IAF, the device may determine the flow carrying Application Directory information. This directory information may include available applications and services or related metadata such as a URL for an application or user interface itself. Based on the metadata, the device determines the applications and user interfaces of interest to the device user. The device downloads the application or user interface of interest over the venue transmission channel and presents it to the user. The transmission may include a broadcast or unicast. Any number of applications or user interfaces may be provided at a venue and downloaded.

Wireless communications device may further include a venue application deletion component 1510. The venue application deletion component allows the selective deletion of previously downloaded applications. The feature may provide for the automatic deletion of a previously downloaded venue application once the device moves out of the venue coverage area. The deletion may occur once the location determination feature determines that the mobile device is outside of the venue. The feature may also prompt the user to enter a selection that will delete the application, the prompt being provided when the mobile device determines that the mobile device is outside of the boundary of the venue. The automatic deletion and the prompt may also include a timer feature that requires the mobile device to be outside the boundary of the venue for a predetermined amount of time before the deletion or prompt occurs. The predetermined time may be a matter of seconds, minutes, hours, or days. The predetermined time may differ based on the type of venue, and the frequency with which most visitors revisit the venue. The predetermined amount of time may be preset or may be set by the mobile device user. For example, a user may choose a predetermined time that is longer for a venue that the user revisits often.

Wireless device 1500 may also include a Service Guide Component 1511 that processes service guide information received by the wireless device 1500. The Service Guide Component may generate a combined service guide including information regarding a local area broadcast and a venue-cast by integrating venue-cast service guide content into a standard service guide format. This component may also format the service guide information for display at the access terminal.

The mobile device may display user interfaces that are configured to integrate real time and non-real time venue content. Dedicated devices may contain user interfaces, and may store non-real time content and receive real time content over the venue broadcast network and then combine the real time data with the stored, non-real time data in presenting a user interface. Multiple use devices may receive over-the-air downloads of user interfaces and applications as necessary at a venue.

Figure 27:
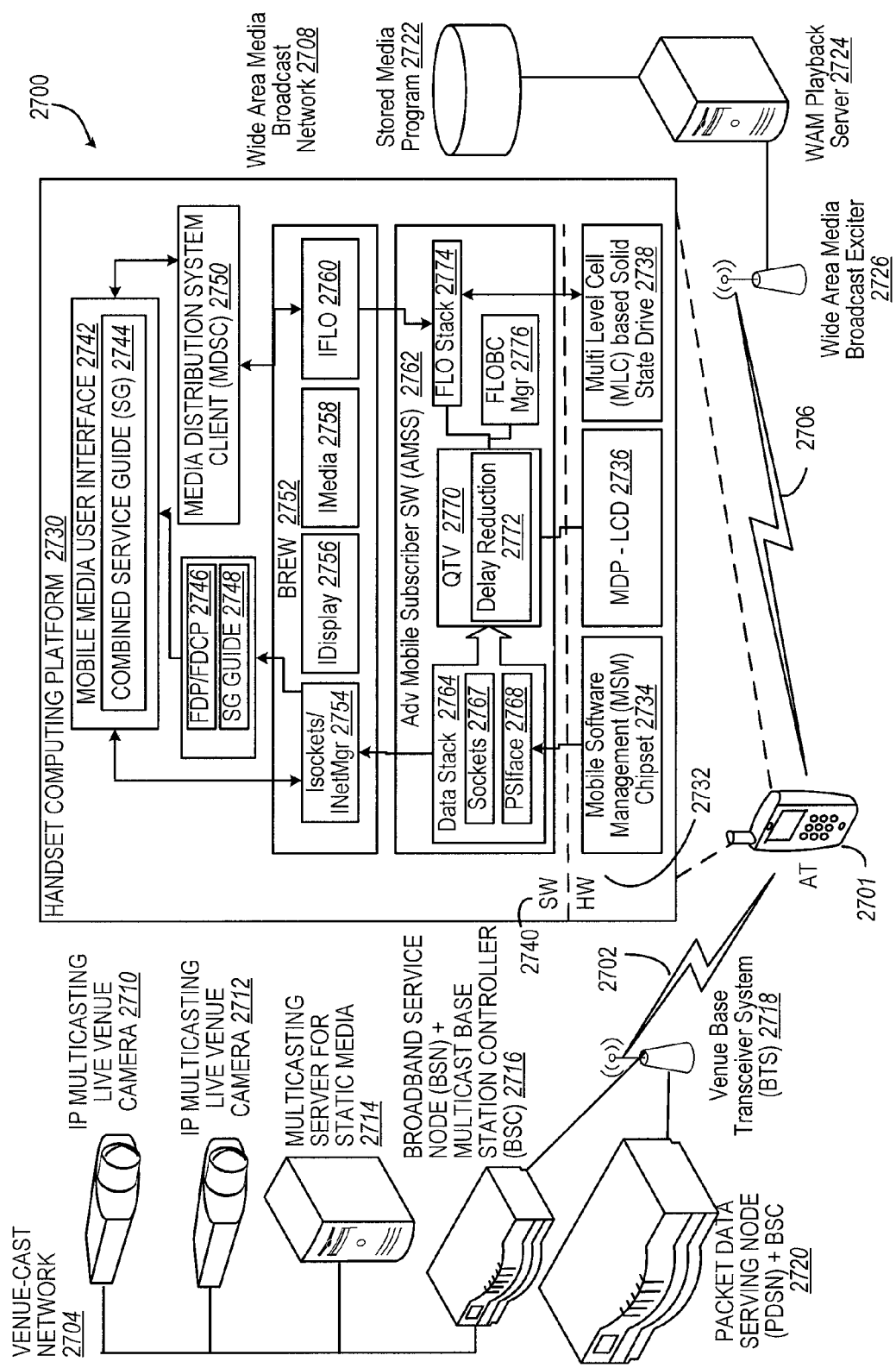
FIG. 27 depicts aspects of a mobile communication system wherein a dual-mode mobile device can receive a venue-cast data by an air link from a venue-cast network and wide area content via a broadcast coverage area from a wide area broadcast network.

In FIG. 27, in another aspect, in a mobile communication system 2700, a dual-mode mobile device 2701 can receive a venue-cast data 2702 by an air link from a venue-cast network 2704 and wide area content 2706 in a broadcast coverage area from a wide area broadcast network 2708. The venue-cast network 2704 may include multiple IP multicasting live venue cameras 2710, 2712 as well as static media stored on a multicasting server 2714 (e.g., Apple Darwin multicasting server for MPEG4, H264 and audio content). This venue content 2702 is routed by a broadband service node (BSN) 2716 that also serves as a multicast base station controller (BSC) for a venue base transceiver system (BTS) 2718, which also may be in communication with a PDSN+ BSC router 2720. The wide area broadcast network 2708 has media programs stored in a repository 2722 accessed by a wide area media playback server 2724 and disseminated by a broadcast exciter 2726 (e.g., Rhode & Schwartz Broadcast Tester for generating FLO signals). Aspects of the mobile device 2701 will be discussed in more detail below.

Mobile device 2701 may include a computing platform 2730 for supporting these dual communication channels, integration of media usage, etc. Further, mobile device 2701 may include a hardware platform 2732 having a mobile software management (MSM) chipset 2734 that serves as processor and controller. A Mobile Display Projector (MDP) or Liquid Crystal Diode (LCD) display 2736 supports presentation of mobile content. A Multi-Level Cell (MLC) based Solid State Drive 2738 provides storage for programs and data for the computing platform 2730.

With regard to software components 2740 of the computing platform 2730, a mobile media user interface 2742 enables a user to interact with a combined service guide (SG) 2744 on the MDP-LCD display 2736. This SG 2744 is merged by application level processing from data received from different sources and protocols. In particular, a file delivery protocol and/or file delivery control protocol (FDP/FDCP) component 2746 adapted for IP serves as a transport mechanism for one portion of a service guide 2748. A media distribution system client (MDSC) component 2750 routes content. These applications 2746, 2748, 2750 are supported by a BREW™ operating environment (QUALCOMM, San Diego, Calif.) 2752, including an ISockets/INetMgr component 2754, an IDisplay component 2756, an IMedia component 2758, and an IFLO component 2760.

The BREW™ environment 2752 is supported by an Advanced Mobile Subscriber Software (AMSS) component 2762 including a data stack 2764 with sockets 2767 and PSIface 2768, including a QTV component 2770 that serves as a CODEC for preparing the media for presentation and advantageously includes a delay reduction component 2772 that dynamically adjusts buffering to mitigate display disruptions. The AMSS component 2762 has a FLO stack 2774 and FLOBC Manager 2776 for supporting the receipt of FLO content.

In an exemplary implementation, integrated viewing experience for venue-cast over BCMCS and FLO TV over MediaFLO™ system playback solution is provided. The computing platform 2730 supports fast switching (e.g., 2-3 seconds or less) between venue-cast and FLO channels, providing a seamless user experience. In some aspects, the optimized UI design offers compelling venue user experience by providing the user with an option to select from multiple venue and TV networks, by providing a dynamic combination of SG displays depending on user choice of networks, and by providing active prompts to alert the user of venue-cast availability upon entering a venue. Additionally, in some aspects, service terminates smoothly upon departing from venue. In one aspect, the computing platform 2730 can comprise a MediaFLO™ CALLISTO™ FFA (form factor accurate) handset based on MFLO SW version 3.5 and EV-DO MSM 6801 commercial build, EV-DO CSM 6800 SW Rel. 1.4.

Figure 28:
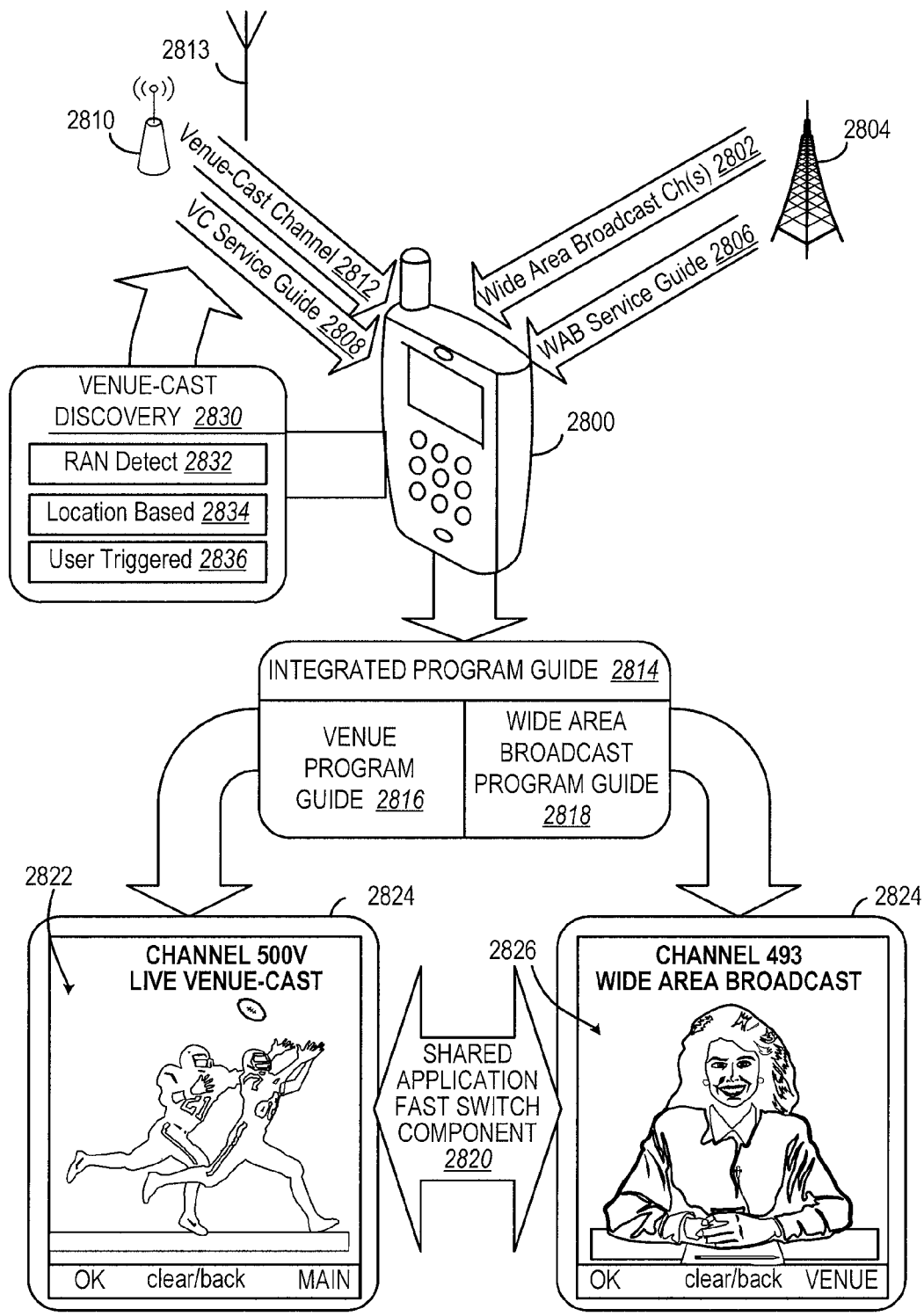
FIG. 28 depicts aspects of a dual-mode mobile device that can simultaneously or seamlessly alternate between receiving a wide-area broadcast channels from a broadcast tower along with a wide-area service guide as well as receiving a venue-cast service guide from a venue-cast access point (AP)

Referring to FIG. 28, in one non-limiting example, a dual-mode mobile device 2800 can simultaneously or seamlessly alternate between receiving a wide-area broadcast channels 2802 from a broadcast tower 2804 along with a wide-area service guide 2806 as well as receiving a venue-cast service guide 2808 from a venue-cast access point (AP) 2810. For example, device 2800 may include a switching component 2820 that enables fast switching between the two services from the two different technologies, thereby providing a seamless user experience. In another aspect, the venue-cast AP 2810, depicted as being co-located with a low-power broadcast antenna 2813, can further provide a venue-cast channel 2812 via a unicast, multicast, or broadcast using unlicensed spectrum. Efficient delivery the venue-cast content to wide area broadcast (e.g., MediaFLO™ system) customers can thus benefit from the large geographic footprint of the broadcast tower 2804 used for forward link only, which is significantly larger than that of a cellular site. If a venue is significantly smaller than this footprint or if multiple venues reside within the footprint of one tower 2804, then the broadcast tower may deploy FLO (forward link only) stations, as represented by antenna 2813, of smaller coverage areas, such as having areas in the size covered by a pico- or femto-cell.

The mobile device 2800 may include an integrated program guide 2814 that is built from a received venue program guide 2816 and a received wide area broadcast program guide 2818. The shared application fast switch component 2820 maintains signal waveform characteristics of the venue-cast channel 2812, whether from the AP 2810, as well as for the wide area broadcast channels 2802, in order to enable rapid switching. Thus, a venue-cast can be viewed, as depicted at 2822, on a mobile video user interface (MVUI) 2824 interchangeably with a selected wide-area channel, depicted at 2826, on the MVUI 2824.

A venue-cast service discovery component 2830 may discover the presence of venue-cast network so that the further discovery of the service content of the venue-cast network can be facilitated by the integrated program guide 2814. In one aspect, a radio access network (RAN) detection component 2832 can leverage unique characteristics of an underlying air-interface that delivers the venue-cast. For example, if the air interface is EV-DO BCMCS, the service can be discovered by looking for the BCMCS flow ID of the venue-cast service guide sent in broadcast overhead message (BOM) on the DO control channel. In another aspect, a location-based mechanism 2834 is utilized to aid in discovering venue-specific services. For example, the venue-cast availability by location (e.g., longitude/latitude coordinates, or cellular BTS ID) can be preprogrammed in the mobile device 2800. Upon entering the designated location, the mobile device 2800 looks for the service guide and notifies the user if the service guide is found. In yet another aspect, a user-triggered mechanism 2836 can perform service discovery. Further, in some aspects, these discovery techniques can be autonomously triggered. Alternatively or in addition, if the user is aware of the service due to outside information, the user could activate the user triggered mechanism 2836 to start the application, which then triggers the terminal to search for venue-cast service guide.

Figure 29:
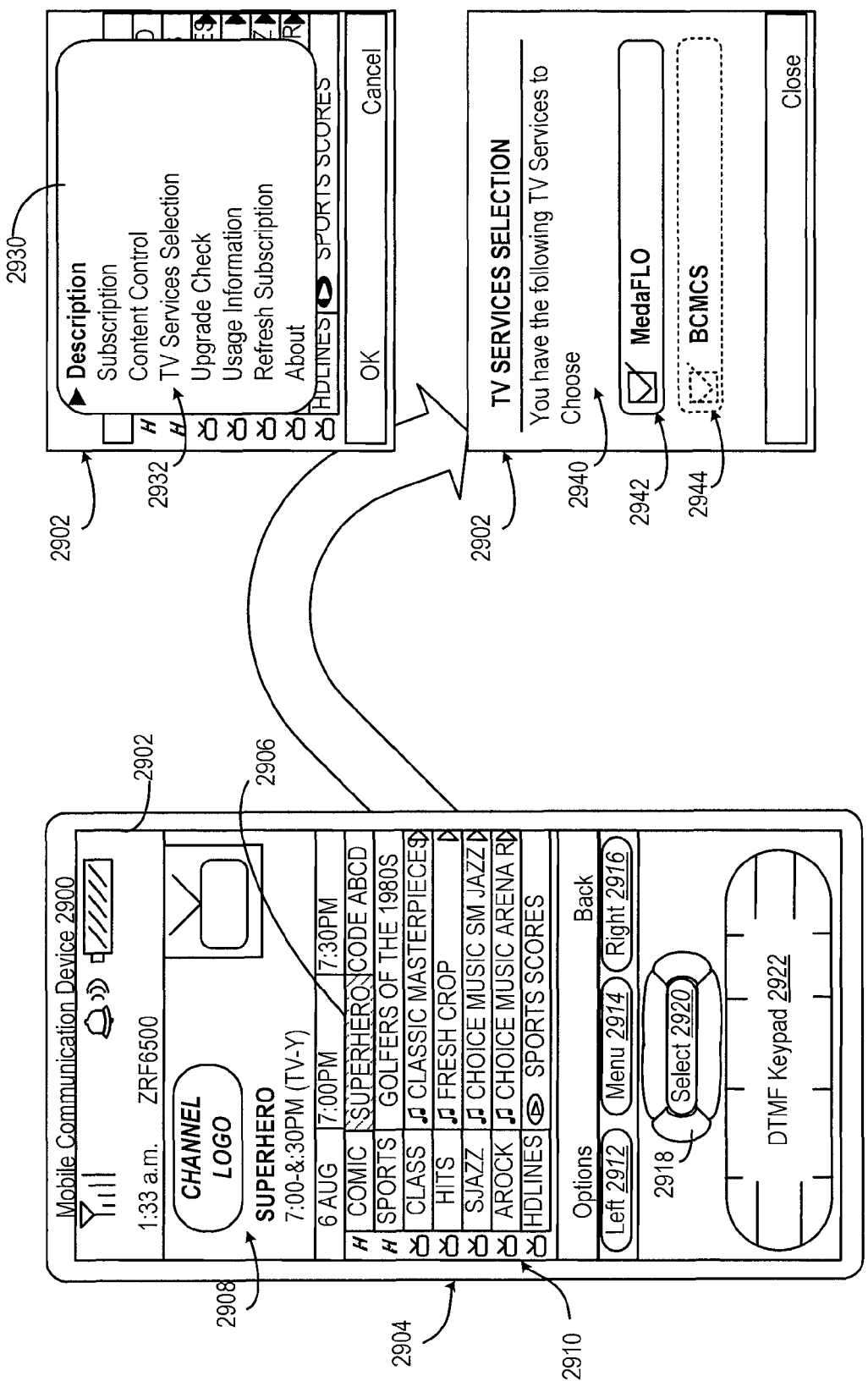
FIG. 29 depicts aspects of an exemplary user interface of a mobile communication device that provides a seamless user experience between the wide area and venue-cast content while advantageously annotating the types of content.

In another aspect, referring to FIG. 29, a mobile communication device 2900 provides a seamless user experience between the wide area and venue-cast content while advantageously annotating the types of content. In particular, a user interface (UI) 2902 displays a scrollable/searchable portion of a service guide 2904. A selected (highlighted) offering 2906 is presented in detail in an upper portion 2908 with each listed program provided with an enunciator icon 2910 that identifies the channel type (e.g., local venue or wide area) as well as indications as to a media type. The UI 2902 can be a touch screen or can be accessed by controls depicted as left button 2912, center button 2914, right button 2916, cursor arrows 2918, select button 2920, and dial tone multi-function (DTMF) keypad 2922.

The UI 2902 provides access to a Description window 2930 that includes a TV Services Selection option 2932. Upon selection, the UI 2902 presents a TV Services Selection window 2940 that allows a user to select whether to enable a wide area broadcast service ("MediaFLO™") by selecting a radio button 2942 and/or to enable a venue-cast service option ("BCMCS") by selecting a radio button 2944. In some aspects, the availability of any option may be indicated, such as an available option being solidly depicted, whereas an unavailable option may be depicted in phantom lines.

Device 2900 may further include components for decoding a combined superframe signal. A portion of the superframe signal may be used for a wide area signal, a portion for a local area signal, and a portion for a venue signal. The signals may also be received as more than one signal, and decoded by the mobile device.

Figure 30:
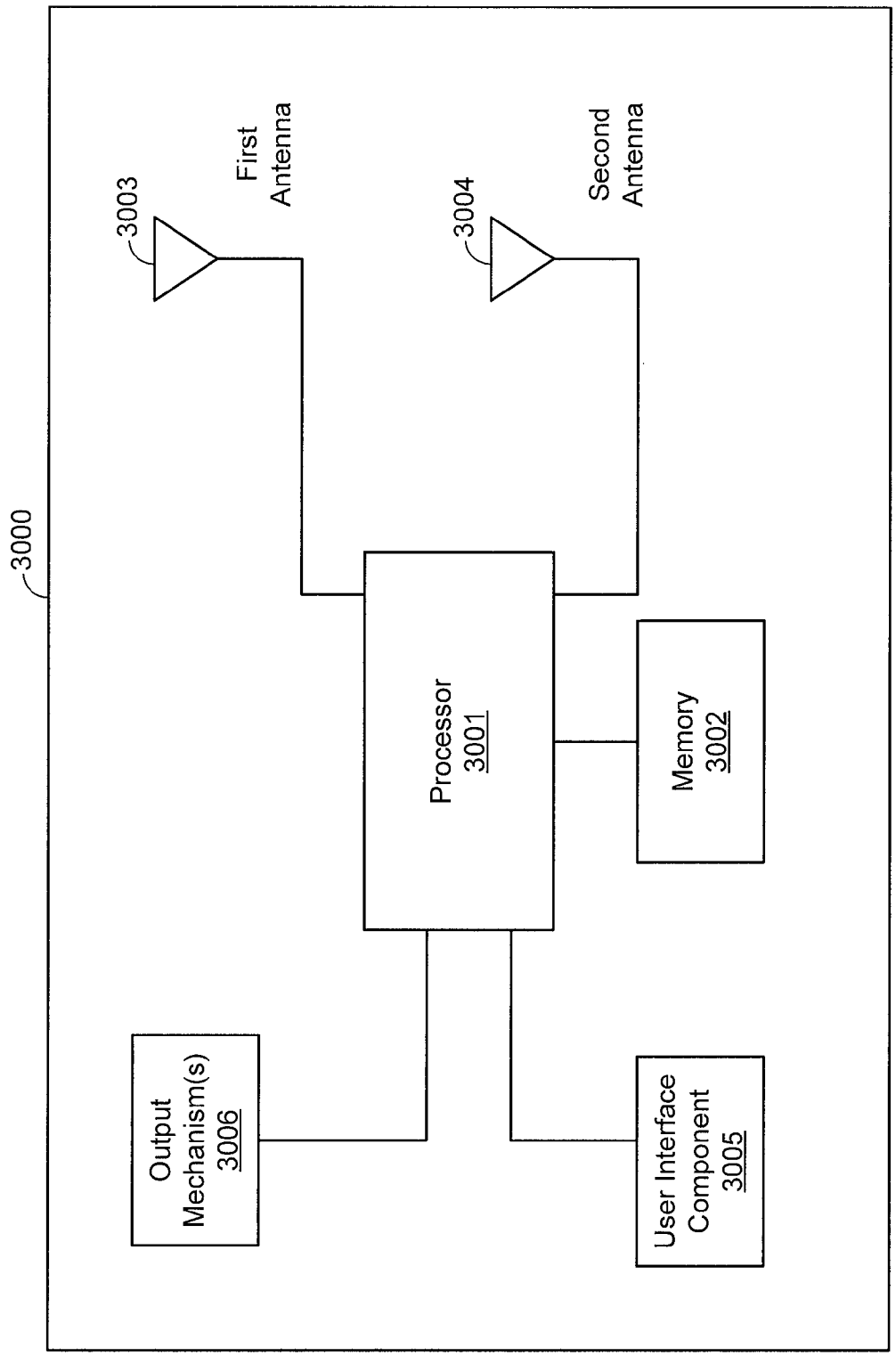
FIG. 30 depicts a block diagram of an exemplary access terminal for receiving a venue-cast transmission.

FIG. 30 illustrates aspects of another exemplary access terminal or wireless communications device 3000. Wireless communications device 3000 includes processor component 3001 for carrying out processing functions associated with one or more of components and functions described herein. Processor component 3001 can include a single or multiple set of processors or multi-core processors. Moreover, processing component 3001 can be implemented as an integrated processing system and/or a distributed processing system.

Wireless communications device 3000 further includes a memory and/or data store 3002, such as for storing local versions of applications being executed by processor component 3001. Memory 3002 can include random access memory (RAM), read only memory (ROM), and a combination thereof.

Wireless communications device 3000 further includes a user interface component 3005, similar to that described in connection with FIG. 15 and an output mechanism 3006 for outputting audio or video content.

Wireless communications device 3000 includes two antennas 3003 and 3004. A first antenna 3003 may be configured to receiving broadcast communication, and a second antenna 3004 may be configured to receive a different type of transmission, such as cellular transmissions, unicast transmissions, or venue-cast transmissions. Alternatively, the first antenna may be configured to receive transmissions from a macro-network, and a second antenna may be configured to receive transmissions from a venue-cast system.

The wireless communications device 3000 may further include components similar to those described for wireless communications device 1500 in FIG. 15, such as a communications component, a data store, a location determination component, a service detection component, a service determination component, an application downloading component, and an application deletion component.

Wireless communications device 3000 may further include a component for processing content received on the first antenna 3003, a component for processing content received on the second antenna 3004, and/or a component for combining content received from each of the antennas 3003 and 3004.

III. Service Discovery

In order to receive venue-cast content, an access terminal must receive information regarding the venue-cast. Venue-cast content can be received based on mechanisms suitable for the underlying air interface. For example, for EV-DO BCMCS venue-cast for MediaFLO™ service users, the real-time content can be received via Real-time Transport Protocol (RTP) transported by a DO BCMCS air interface, whereas the non-real time traffic (clip cast, etc.) can be received by a standard protocol such as FLUTE, or via adaptation of MediaFLO™ file delivery protocol (FDP) to the IP domain. Access terminals AT, or mobile devices, for receiving the venue-cast may be provisioned with an application to discover venue-cast service and to receive the venue-cast.

An access terminal configured to receive a venue-cast may include a venue-cast service discovery component that discovers the presence of venue-cast network. Service discovery may further include discovery of a venue-cast Service Guide (SG) or an SG with information regarding the venue-cast.

In one aspect, a radio access network (RAN) detection component can leverage unique characteristics of an underlying air-interface that delivers the venue-cast. For example, if the air interface is EV-DO BCMCS, the service can be discovered by looking for the BCMCS flow ID of the venue-cast service guide sent in broadcast overhead message (BOM) on the DO control channel.

In another aspect, a macro network may transmit venue identifier information regarding the venue transmission, such as a venue identifier and a channel on which the venue-cast is being transmitted. The venue identifier may be used by the AT to monitor venue specific channel information.

In another aspect, a location-based mechanism is utilized to aid in discovering venue-specific services. For example, the venue-cast availability by location (e.g., longitude/latitude coordinates, or cellular BTS ID) can be preprogrammed in the mobile device. Upon entering the designated location, the mobile device looks for the service guide and notifies the user if the service guide is found.

In yet another aspect, a user-triggered mechanism can perform service discovery. Further, in some aspects, these discovery techniques can be autonomously triggered. Alternatively or in addition, if the user is aware of the service due to outside information, the user could activate the user triggered mechanism to start the application, which then triggers the terminal to search for venue-cast service guide.

Figure 31:
FIG. 31 depicts aspects of an exemplary implementation for discovery of a venue-cast transmission service.

FIG. 31 illustrates an exemplary embodiment of service discovery for a venue-cast system via a macro-cell. Upon entering the venue, the AT 3101 receives a transmission from the macro BS 3102 with service information for accessing the venue-cast. The venue-cast system may include a transmitter for (A) broadcasting, (B) unicasting, or (C) multicasting the venue content to a venue coverage area or venue cell 3103. The transmitter may be, for example, a picocell or femtocell scale transmitter located within a larger macrocell area 3102. The transmitter may be selected to provide coverage corresponding to the size of the venue. More than one transmitter may be provided at the venue in order to provide coverage throughout the venue The service information may include a dedicated control channel message with an identifier for the venue-cast. For example, if the venue-cast is a multicast transmission, the identifier may be a multicast group ID such as a Multicast Access Terminal Identifier MATI.

This signal from the macrocell BS includes information regarding the frequency of the venue-cast transmission and the type of service for the venue-cast transmission. For example, the transmission from the macrocell BS may include a frequency for the venue-cast transmission and information on obtaining a program guide/service guide for the venue-cast transmission. The program guide may be provided via the venue-cast system or via a website. If the program guide is provided via the venue-cast system, the transmission from the macrocell BS instructs the AT on obtaining the program guide from the venue-cast system. If the program guide is accessed via a website, the AT may access the website via the macrocell BS.

If the AT is not already, it may be provisioned with an application for the venue network through the transmission from the macro BS.

As noted above, the transmission from the venue-cast system may be made via broadcast, multicast, or unicast. If the venue-cast system transmits via broadcast or unicast, the venue-cast system only needs to provide a forward link channel for transmitting to an AT. If the system uses unicast, the venue-cast system must also include a reverse link channel for receiving communication from the AT.

The AT may be provisioned to look for the macrocell signal providing the information for the venue-cast system. The AT may be provisioned to look for such a signal based on information received from the macrocell, or based on a location change into a new network. For example, a database may store the locations of a number of venue-cast systems. When an AT enters an area covered by a venue-cast system, the AT may look for control channel information.

Referring back, FIG. 20 illustrates a 3G macro network providing information regarding service discovery for a venue-cast system. As described above, the macro network 2001 may transmit venue identifier information 2002 regarding the venue transmission, such as a venue identifier and a channel on which the venue-cast is being transmitted. An AT may receive the venue identifier during its wake up cycle.

The venue identifier may be used by the AT to monitor venue specific channel information. The macro network 2001 may also provide information for accessing a service guide 2005 for the venue-cast. As discussed above, an AT 2006 may access the service guide via the macro network, via a website, etc. The venue-cast transmitter may be a localized access point 2003 having a smaller scale, such as a picocell or femtocell. The venue-cast system also includes a content server 2004, which may be local, centralized, or a hybrid configuration using both a local and a centralized server.

Figure 32:
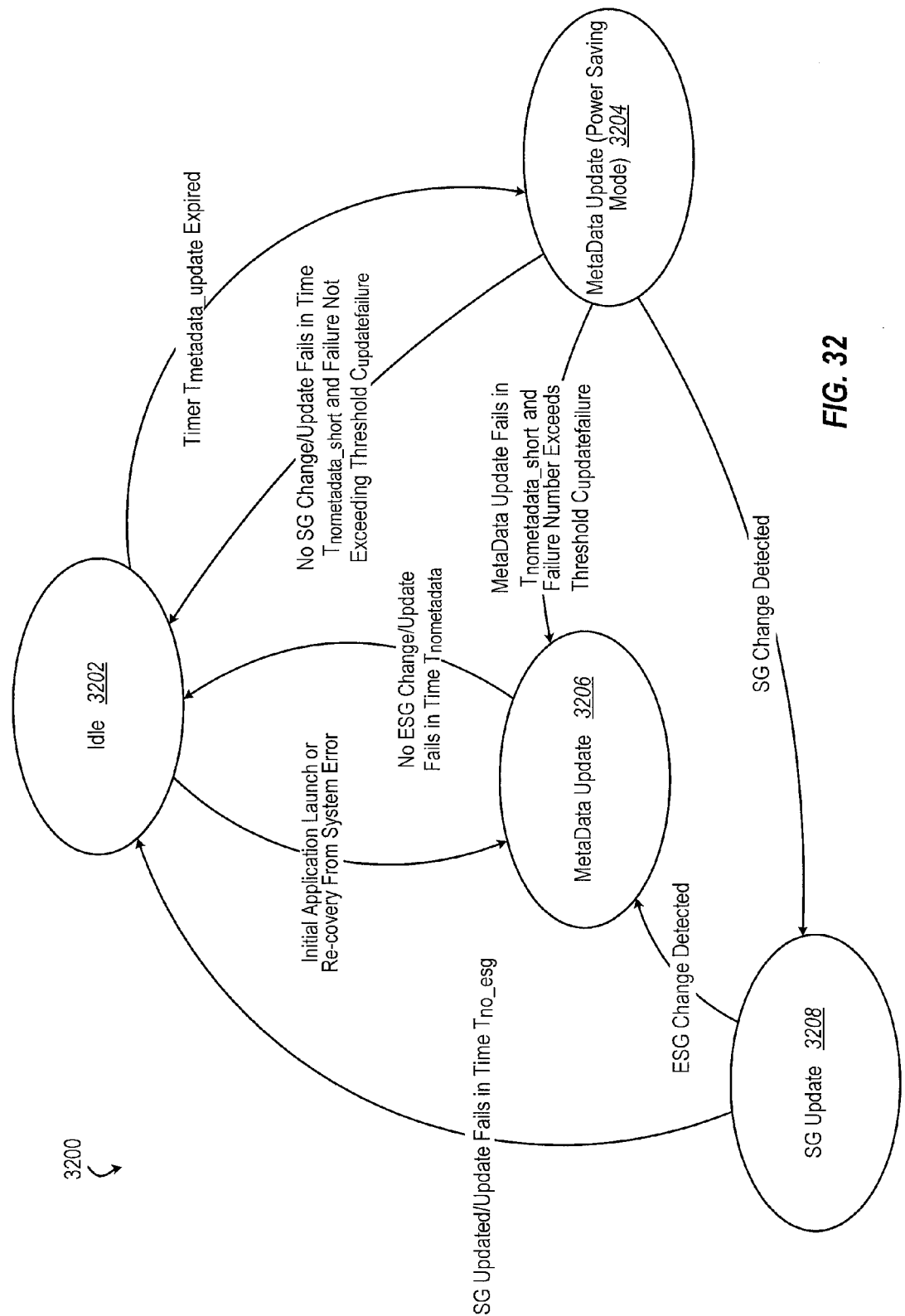
FIG. 32 depicts aspects of a state diagram for a mobile device participating in venue-casting.

Referring to FIG. 32, in one aspect, a state diagram 3200 represents states for a mobile device participating in venue-casting. Idle state 3202 represents a state in which the mobile device is idle. A first MetaData Update (Power Saving Mode) State 3204 represents a state in which the mobile device performs a search for SG metadata, for example, until metadata is decoded or until a timer with a first expiration expires. A second MetaData Update State 3206 is for searching for SG metadata, for example, until metadata decoded or until a timer with a second expiration longer than the first expiration expires. An SG Update State 3208 is for searching for a complete SG until it is completely downloaded or until a timer expires.

With regard to real-time traffic, such as streaming of live or programmed media content such as video, audio and timed text, receiver optimization may be based on RTP packet information. Some aspects may include reuse of a subset of Voodoo processing techniques, including packet synchronization and adaptive de-jitter. Further optimizations provide a channel switching design with minimal power consumption, a video decoder configuration, and air interface parameters.

With regard to non real-time service, e.g. clip-cast/file-cast or clips of multi-media content delivered to the device in file format, these delivered files can be stored on the device to be viewed by the user at a later time. A protocol stack can advantageously be based on adaptation of FDP/FDCP to IP.

In some aspects, in order to maintain and enhance the user experience, real-time traffic delivery over venue-cast may include dejitter buffer optimization. Jitter happens when RTP packets arrive at the AT out of time order. If a delayed out-of-order packet arrives after the current frame is rendered, then frames can be dropped, causing video distortion. Current method implemented in MSM (QTV) to address jitter is to use an N-second "pre-roll" buffer, where N is a positive number. For example, if an out-of-order packet does not arrive within the N-second buffer, then the player on the device may pause or may accept video distortion. This solution adds an N-second latency. In many live venue-cast applications, e.g. sportscast in a stadium, even a 2 second total latency is excessive. Further, for example, the default pre-roll size of typical internet media players is typically between about 5 and about 10 seconds.

Accordingly, in some aspects, the present devices include optimization of the adaptive pre-roll buffer size. For example, the pre-roll buffer size may be initially set to a value of 250 msec. As out-of-order RTPs are detected by the AT, the AT may slowly increase the pre-roll buffer size to a maximum setting. Further, the AT may slowly decrease the pre-roll buffer size when there are no detected out-of-order RTP packets for a set time period. Additionally, the AT may apply RTP fragment reassembly logic to improve performance.

In another aspect, the user experience is maintained and enhanced, by providing a venue-cast channel switching design that keeps real-time traffic delivery as short as practical. A current estimated time based on air interface elements are as follows: a FLO Air Interface channel switch is bound by super frame duration (1 sec); and a DO air interface channel switch is bound by BOM period (default=2.9 sec).

With regard to delays due to media codec elements, it is desirable to start play new channel with at least one I frame (buffering is needed). A MediaFLO™ modified H.264 encoder ensures an I frame in every second. An EV-DO BCMCS I frame is every 1-2 seconds depending on video encoder used. The described aspects improve the channel switching time for EV-DO BCMCS with an air-interface parameter change and/or encoder modifications. In one aspect, an air-interface parameter change is to reduce BOM period (current default BOM period is 1 CC=426.66. ms), for example, to a value feasible for real-time streaming in plug-and-play deployment in a dedicated carrier in terms of CC capacity. In one aspect, a media encoder change may include inserting low-quality I frames every second to allow MSM to reduce the amount of required pre-roll buffer storage.

Current expected channel switch time is listed below in TABLE 3:

TABLE 3

| From/To | FLO (Worst/average) | DO (Worst/average) |
|---|---|---|
| FLO | 3/2.5 s | 4.9/3.5 s |
| DO | 3/2.5 s | 4.9/3.5 s |

An expected improved channel switch time, based on the aspects described herein, is listed below in TABLE 4:

TABLE 4

| From/To | FLO (Worst/average) | DO (Worst/average) |
|---|---|---|
| FLO | 3/2.5 s | 1.5/1.22 s |
| DO | 3/2.5 s | 1.5/1.22 s |

IV. Service Guide

The format, design and delivery of a venue-cast service guide (SG) may facilitate service discovery and integration of the venue SG into a macro-network SG. An AT may access the service guide via the macro network, via a website, etc. The service guide may be similar to a MediaFLO™ system type service guide. By providing a common service guide, venue specific service guides may be provided independent of the types of receiving ATs. To simplify the handset implementation, the service guide format could be similar to that used for terrestrial mobile TV, with further adaptation to the underlying air interface. An example of one aspect of a service guide format design for venue-cast over EV-DO for MediaFLO™ users is represented in Table 1.

TABLE 1

| Subscription Method | Provisional/Operational part | Presentation part | Access part |
|---|---|---|---|
| Share with MediaFLO ™ (e.g. venue-cast is a part of the MediaFLO ™ package) | Not required. Venue channel subscription will be bundled with FLO channels based on FLO SG. | Reuse. Similar information is needed for venue-cast content delivery. | Reuse with BCMCS-specific access information (flow ID, SDP, subnet and sector ID info, access technology, channel correlation) |

TABLE 1-continued

| Subscription Method | Provisional/ Operational part | Presentation part | Access part |
|---|---|---|---|
| Independent of MediaFLO ™ packages | Not required if MediaFLO ™ service is available. Venue channel subscription will be bundled with FLO package through unicast subscription | | Reuse with BCMCS specific access information |

The service guide may be delivered to the AT in any manner. For example, the following are two illustrative options, which should not be construed as limiting.

Option 1: Multicast of service guide delivery. In this case the service guide is sent as one of the broadcast flows in the venue-cast network. The transmission duration should be often enough for new users to be able to quickly detect the service guide. For terminal power efficiency, the transmission of the service guide could be separated into full guide and guide metadata, where the full guide is sent over longer intervals (e.g., every minute), while the guide metadata that contains the service guide version number can be sent more frequently (on the order of 100 ms). As such, an AT may be configured to compare that last version number obtained by the AT with the transmitted version number, and if there is a difference, then the AT is triggered to obtain either the whole service guide or service guide updates representing the changes between the version number of the service guide on the AT and the version number of the latest service guide being transmitted.

Option 2: Unicast service guide delivery. The SG may also be delivered via unicast. For example, in one implementation, once the venue-cast service is discovered the user could be directed by the application to a local website to download the service guide.

Figure 33:
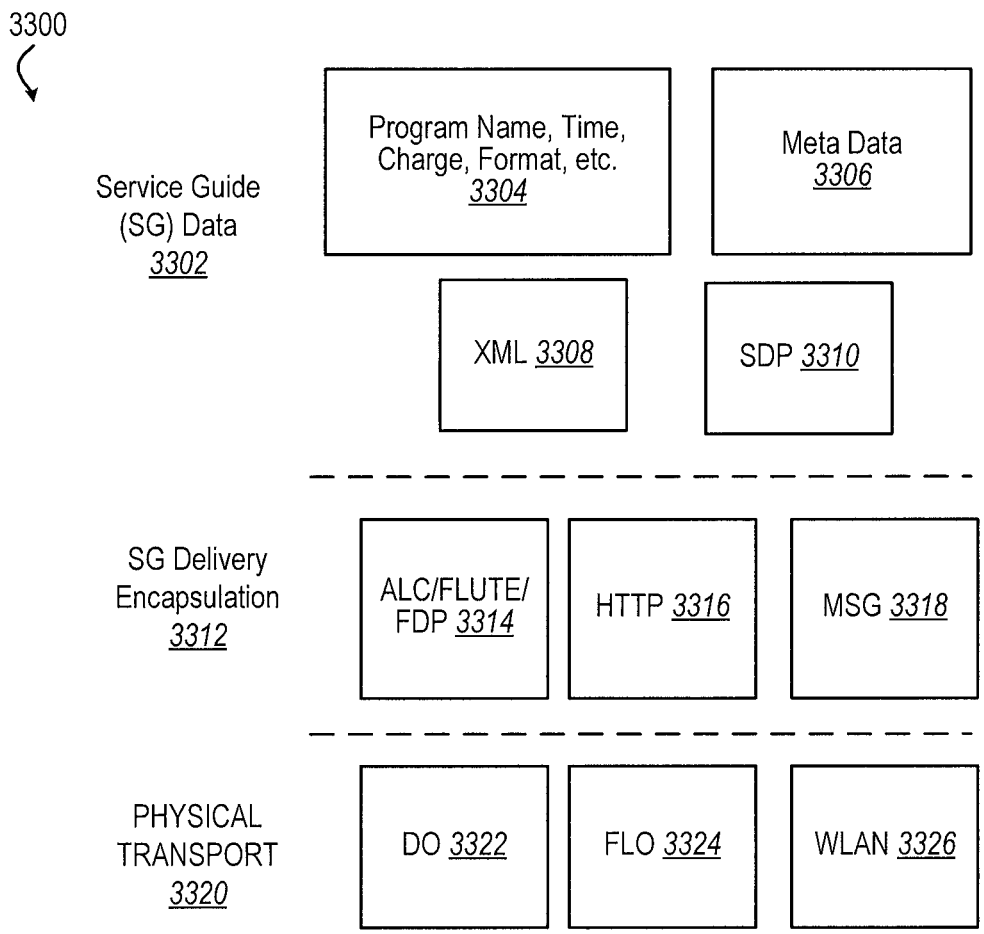
FIG. 33 depicts aspects of an exemplary data structure for a service guide (SG) structure.

In FIG. 33, in one aspect, a venue-cast service guide (SG) structure 3300 is depicted wherein SG data 3302 comprises a program name, time, charge, format, etc. block 3304, a meta data block 3306, an XML block 3308 and an SDP block 3310. SG Delivery Encapsulation 3312 comprises one or more of an ALC/FLUTE/FDP block 3314, an HTTP block 3316, and a MSG block 3318. Physical transport 3320 is provided by one or more networks, such as DO 3322, FLO 3324, and WLAN 3326.

In one aspect, the FLO-DO-WAN venue-cast SG structure is designed based on that of a MediaFLO™ MPG. Alternatively, an OMA-based SG structure design for BCMCS is also available based on OMA standards. For example, a venue-specific addition to the service guide structure may include venue location information. The physical transport technology is provided with the venue-cast and associated parameters. Further, in an aspect, an association between venue channels and MediaFLO™ channels can be complimentary content. With regard to delivery, in an aspect, the SG for venue-cast is delivered via a DO air link. In other aspects, SGs of venue-cast and FLO channels can be integrated on the AT at a presentation level via a unified user interface (UI) application.

In one aspect, venue-cast SG/SG metadata are delivered via two file-cast sessions to the ATs. In an aspect, for example, a file delivery format that is the same as is used for a clip-cast can be used for the SG data. Further, for example, candidate transmit protocols include ALC, FLUTE, and modified FDP/FDCP. In some aspects, the SG/SG metadata file is delivered on separate BCMCS flows. In some aspects, SG and/or SG metadata properties include a data volume that is relatively small (e.g., in units of tens of bytes) and can be transmitted within one channel cycle (CC). Another property of SG or SG metadata, such as versioning, allows the AT to monitor for a change in the SG to avoid unnecessarily receiving duplicate SG. Allowing less frequent SG file transmission can reduce the air link bandwidth consumption.

Additionally, in other aspects, SG file properties include a data volume that can be relatively large (e.g., up to tens of kilobytes). In such aspects, a complete SG file transmission can take multiple Broadcast Overhead Period channel cycles (CC's). With regard to delivery timing considerations, in some aspects, SG metadata is delivered more frequently than a full SG. For example, in some aspects, a content server initiates the SG metadata file delivery session every Broadcast Overhead Period CC. Further, the content server can initiate the SG file delivery session periodically, and for each delivery session, the SG file can be repeated multiple times.

V. Exemplary Venue Types
  A. Single Attraction Venues
    i. Sports Venue

A sports venue is one example of a single attraction venue. Others may include performances such as concerts, plays, competitions, and so forth. Exemplary features will be described for a sports venue. However, these features may be applied to other types of venues.

The sports venue broadcast system may broadcast information including banner advertisements; views from in-stadium cameras, bench cameras, crowd cameras, and a camera from the broadcast booth; an audio and/or visual commentary, such as a play-by-play commentary, alternate language announcers; and highlight reels for the teams. In addition, the sports venue broadcast system may broadcast data such as a sports ticker from alternate games, a congestion status for the bathrooms, Closed Captioning, locations for mobile vendors, a map of the field showing the players on the field, including additional information for the players/teams such as formations, statistics, strategies, etc, a venue map showing services, a menu of food available at the venue, venue rules, a searchable index of sports teams, a searchable index of sports facts and/or rules, a merchandise catalog, a team schedule, a venue event schedule, etc.

Similar information can be broadcast for other single event venues. For example, multiple camera views may be transmitted for a concert, lecture, performance, play, and so forth. In addition, venue information regarding vendors, venue services, venue facilities can be applied to other venues. Rather than team and player information, information may be provided regarding the production and performers. Alternate language translations and closed captioning may also be provided.

For a multipurpose mobile device, information from these transmissions may be downloaded and stored at the mobile device. For example, the mobile device may store a venue map of services, menus of available food, etc. Dedicated devices may include preloaded data and applications to be used in connection with the data transmissions.

A multipurpose mobile device may download such venue specific applications and information upon entering the venue. The information may be downloaded automatically or upon a user selection. As with downloading applications, receiving and storing the venue specific information may occur automatically or may occur based on a user entry. In addition, a user may set preferences within the mobile device to cause the mobile device to automatically receive and store, upon entry into any venue-cast system, selected types of information that is preferred by the mobile device user.

Figure 34:
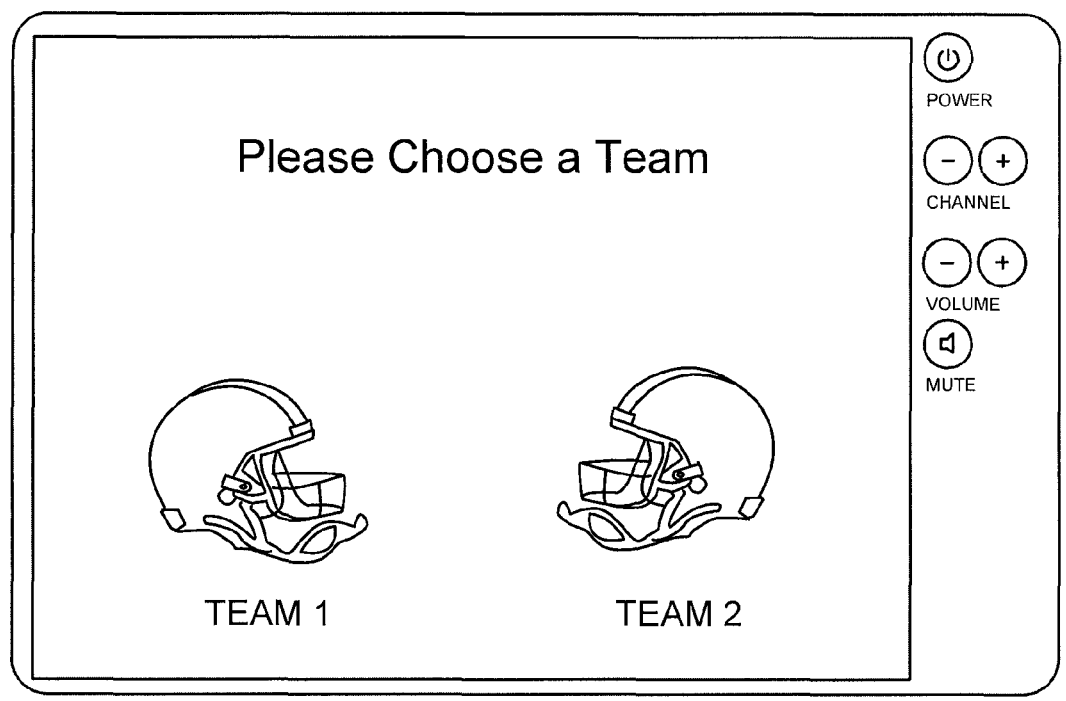
FIGS. 34-50 depict exemplary aspects of user interfaces for a venue-cast transmission system.

For sporting events involving multiple opposing teams the display on the mobile device may be themed to fans of the different teams. For example, a welcome screen on the mobile device may prompt a user to select a team. The welcome screen may be received by a multipurpose device upon entering the venue or preloaded on a dedicated device. FIG. 34 illustrates an exemplary welcome screen for a mobile device at a sporting event. This initial choice may allow the user interface and information displayed by the device to be customized for a particular team. Once a selection is made, the mobile device may receive and display audio, video, and data information that is targeted to fans for the selected team. For example, customization may include the use of team colors, team logos, and team focused information.

Figure 35:
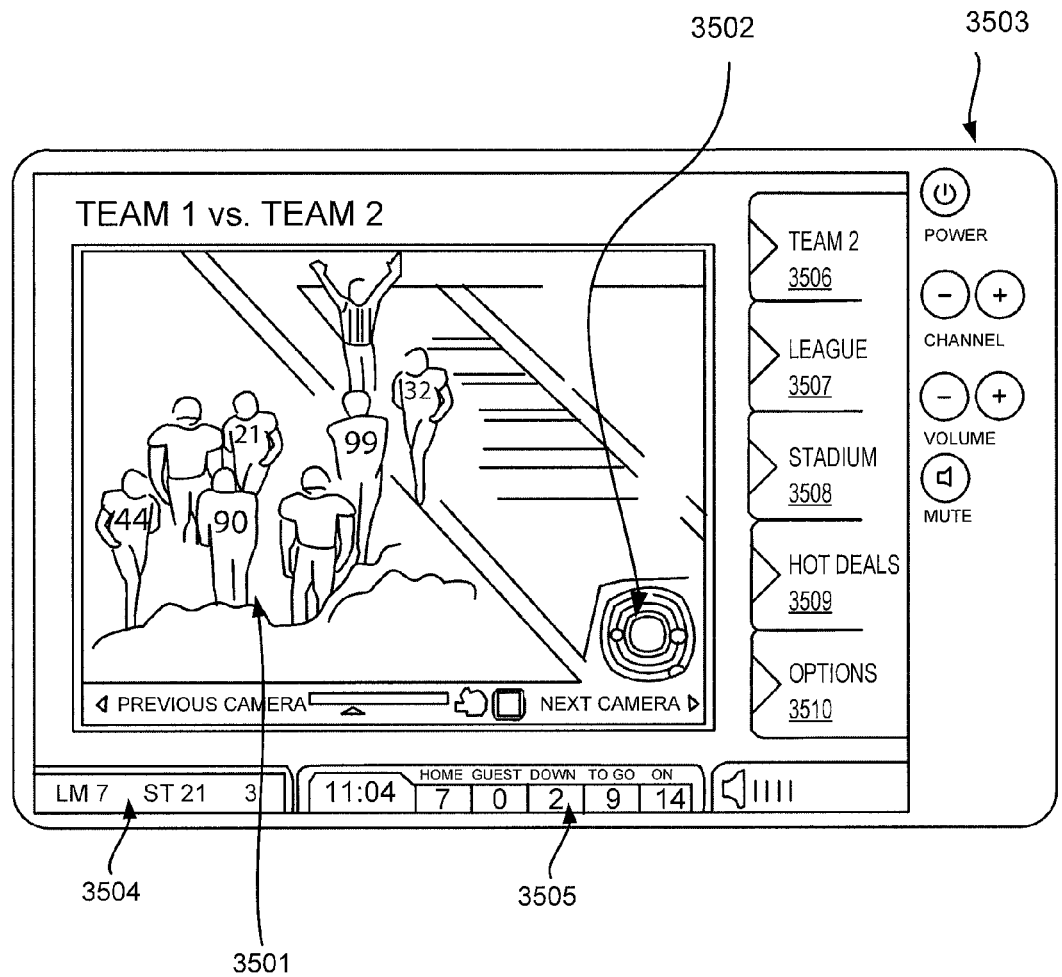

FIG. 35 illustrates exemplary aspects of a user interface that may be used on the device. FIG. 35 shows a live video feed 3501 from at least one camera at the event. The live feed 3501 may be provided from multiple cameras at the event. The user interface may include a choice of camera feature 3502, which displays the current location, within the venue, of cameras providing live video feeds. The choice of camera feature 3502 may allows a user to select a video feed from a particular camera. The camera that is currently selected by the user may be identified on the display. The device may also include features 3503 for manipulating the video feed such as pause, rewind, and playback features. The device may further include the ability to e-mail snapshots, video and/or audio clips, and other information. The video feed from these cameras may be used to provide highlights, replays, and live fan reactions. In a racing event such as a NASCAR event, multiple cameras may provide live broadcast from different corners of the race track to mobile users in a NASCAR stadium.

The user interface may include information relevant to the sporting event, such as game statistics 3505 from the current game. The user interface may further include a feature that allows a user to select game statistics 3504 from another game, and to display those game statistics as well. The user interface may include a number of options, such as information regarding the teams 3506, information regarding the sport or league 3507, information regarding the venue 3508, information regarding merchandising deals 3509, and other options 3510. Trivia regarding the sporting event, teams, league, and players can also be provided.

Figure 36:
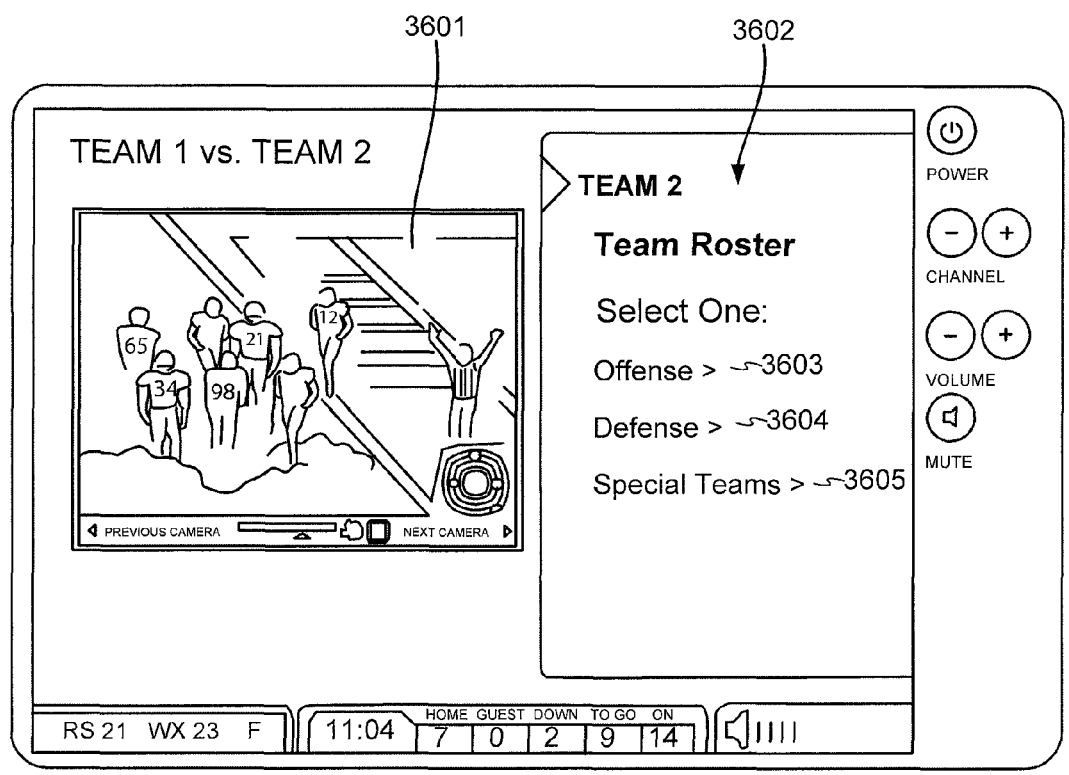

FIG. 36 illustrates an exemplary variation of team information that may be displayed. This user interface may continue to provide live video feed 3601 of the event in a smaller area, while providing access to additional information 3602 regarding the team. Among other things, a team roster with options for various positions on the team may be provided. Such positions may include, for example, offense 3603, defense 3604, and special teams 3605. However, any team information may be included in this section.

Figure 37:
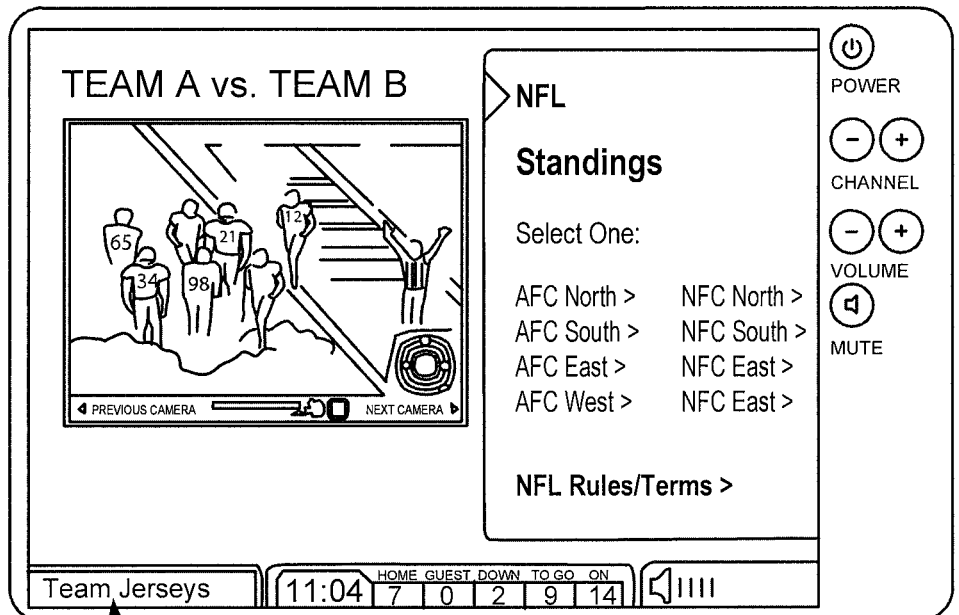

FIG. 37 illustrates an exemplary variation of sport or league information that may be provided. As shown in this figure, advertisements and merchandising displays 3701 may periodically be provided to device.

Figure 38:
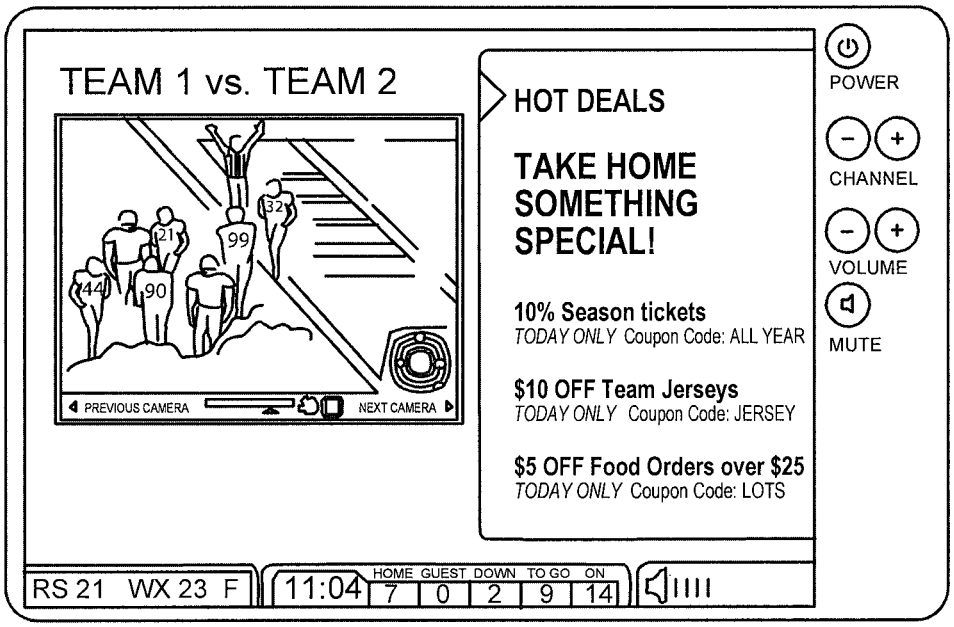

FIG. 38 illustrates an exemplary variation of a user interface for a merchandising information option.

Figure 39:
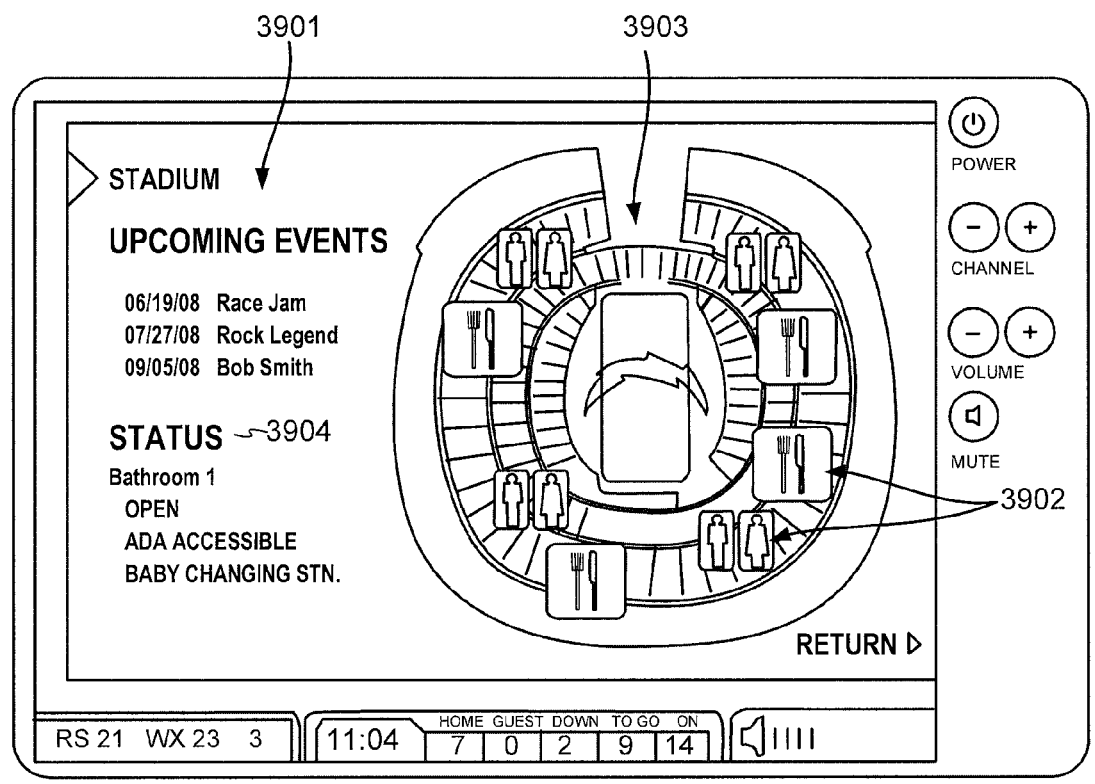

FIG. 39 illustrates an exemplary variation of a user interface providing venue information. This user interface may display information regarding upcoming events at the venue 3901, historical information regarding the venue, and location information regarding venue facilities and services 3902. As illustrated, a map 3903 may be shown of the venue with location information for restrooms, food vendors, merchandise vendors, security, medical facilities, or any other venue services. As illustrated, the device may provide status information 3904 regarding each of the venue facilities or services. For example, the user interface may display whether a bathroom is ADA accessible, whether the bathroom includes a baby changing station, and whether the bathroom is open. For food vendors, the user interface may display menus, prices, and possible coupons or deals.

Figure 40:
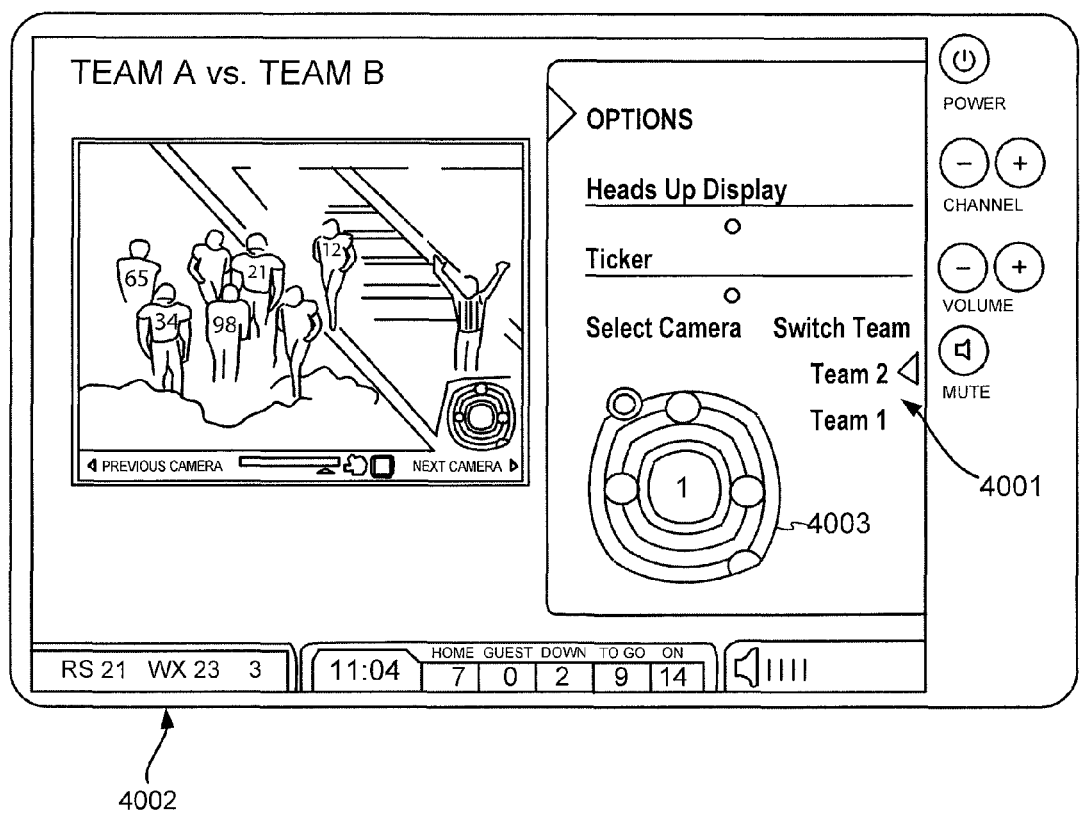

FIG. 40 illustrates that the user interface may provide additional options such as the ability to change team selection 4001, to display a ticker 4002, alternate camera views 4003, and alternate language presentations.

As discussed above, these aspects of the venue-cast system and mobile device may be applied to other performances and events beyond sporting events, in addition to multiple attraction venues.

ii. Performance Venue

Another example of a single event venue is a performance venue. Currently, a concert attendee's experience is limited to their line of site and content displayed on large screens. Furthermore, attendees are limited in ways to capture a memory of their concert experience. Attendees can purchase souvenir items and may hold up a camera phone hoping to record a performance. The venue-cast system may enhance the experience of spectators by transmitting additional content related to the performance. For example, if the performance is a concert, the transmitted content may include either pre-recorded content, content recorded at the venue, or a combination of both types of content.

Content recorded at the venue may include behind the scenes content, behind the scenes gatherings and/or parties, behind the scenes preparation for the performance, interviews with the artist, live camera views of preparation behind the scenes, multiple camera views of the performance, closer camera views of the performance, and live audio/video. This content may be captured, recorded at the network and transmitted to a receiving device. Alternatively, content may be captured and transmitted to a receiving device without being stored at the venue-cast network.

Prerecorded content may include interviews with an artist, prerecorded practices, recordings of other performances, and commentary on the performance.

B. Multiple Attraction Venues

Examples of multiple attraction venues include theme parks, fairs, race tracks, shopping malls, casinos, trade shows, conventions, campuses, resorts, cruise ships, zoos, entertainment districts, and retail superstores. Although features of the venue-cast system will be described in connection with a theme park, shopping venue, and campus, one of ordinary skill in the art will recognize that these features may be customized and applied to any multiple attraction venue.

The venue-cast system may transmit information and applications relating to the venue, such as movies, television, performances, parades, and demonstrations relating to the venue. For example, a theme park may transmit entertainment content relating to the theme park. A trade show may transmit a live or prerecorded feed of demonstrations, speakers, or meetings. The venue-cast system may also transmit audio content such as commentary, music, and alternative language narration. The venue transmission system may broadcast data streams including a real-time map of the venue including the present location of mobile attractions, information regarding congestion, wait times, and merchandise at attractions within the venue. Such mobile attractions may include characters at a theme park, parades, and performers. The venue transmission system may transmit data such as a video channel guide, information regarding the venue services and facilities, historical information about the venue or attractions, attraction previews, attraction specific music, a list of services available and/or open for each attraction in the venue, and a billing service. The billing service may be connected to a user's credit card hotel room, or other registration for the venue.

As with the other aspects described in this application, the venue-cast system may be configured to transmit to dedicated device and/or multi-purpose devices. Applications that might be preloaded on dedicated devices may be downloaded to multipurpose devices. The applications may use stored information in combination with real time data. The user interfaces may be displayed in the same manner or in a different manner dedicated devices and multi-purpose devices.

i. Theme Park

Figure 41:
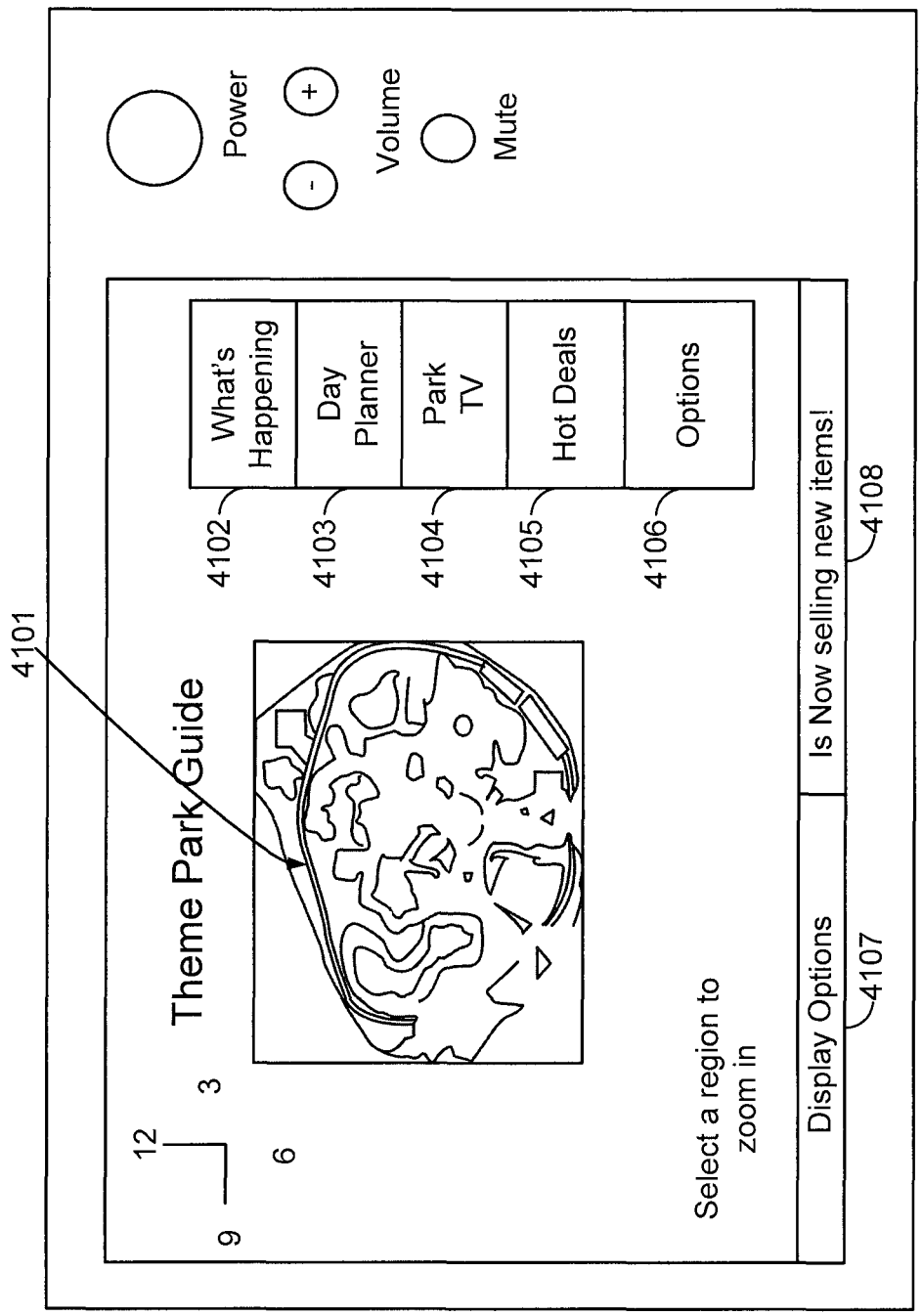

FIGS. 41-50 illustrate exemplary features of a venue-cast system for a theme park. FIG. 41 illustrates an exemplary user interface for a mobile device used with the venue-cast system. The device may have venue-oriented user interfaces to provide an enhanced user experience at the venue. As illustrated in FIG. 41, a user interface may include an interactive map 4101 of the venue showing the various attractions available at the theme park. This user interactive map may include wait times, performance times, or other information regarding each of the attractions. The wait time may be periodically updated with information received from the venue-cast system.

Figure 42:
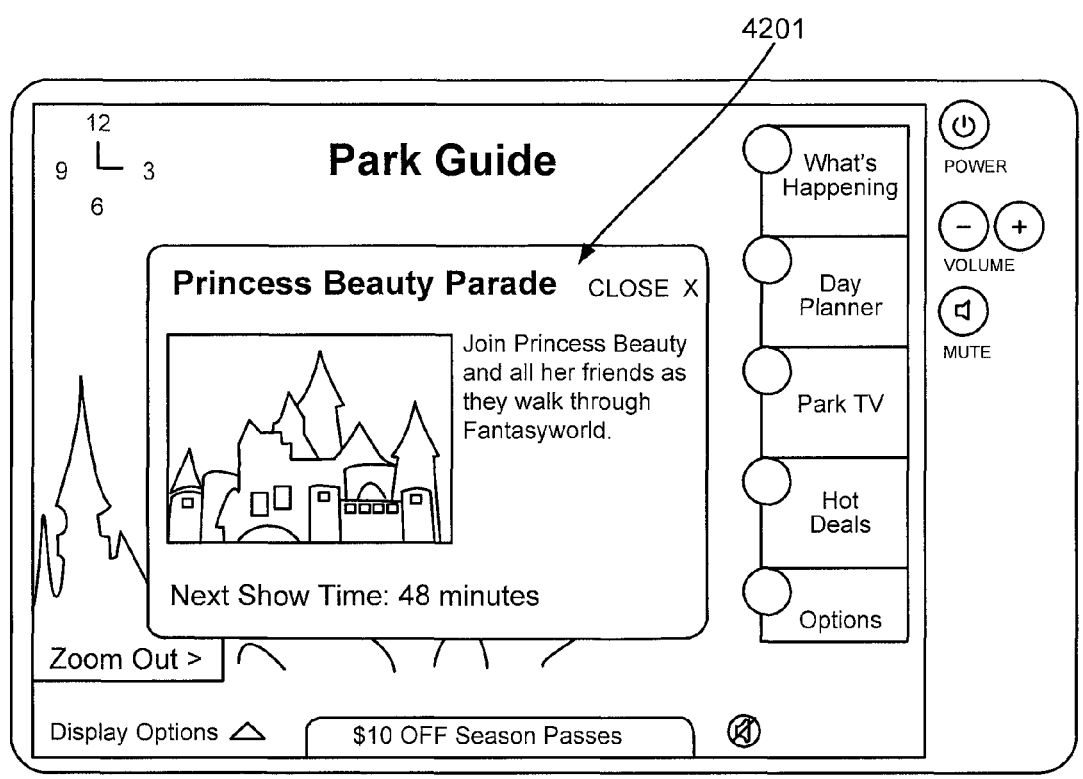

The interactive map may include icons that, when selected, display a pop-up 4201 with detailed attraction information, as shown in FIG. 42. In this example, the attraction selected was a parade. The parade pop-up 4201 shows a time until the next showing, a brief description of the parade, and an image from the parade. The attraction information may include age information, audio and/or video clips, retail information, or any other information that might be helpful to a theme park visitor.

Figure 43:
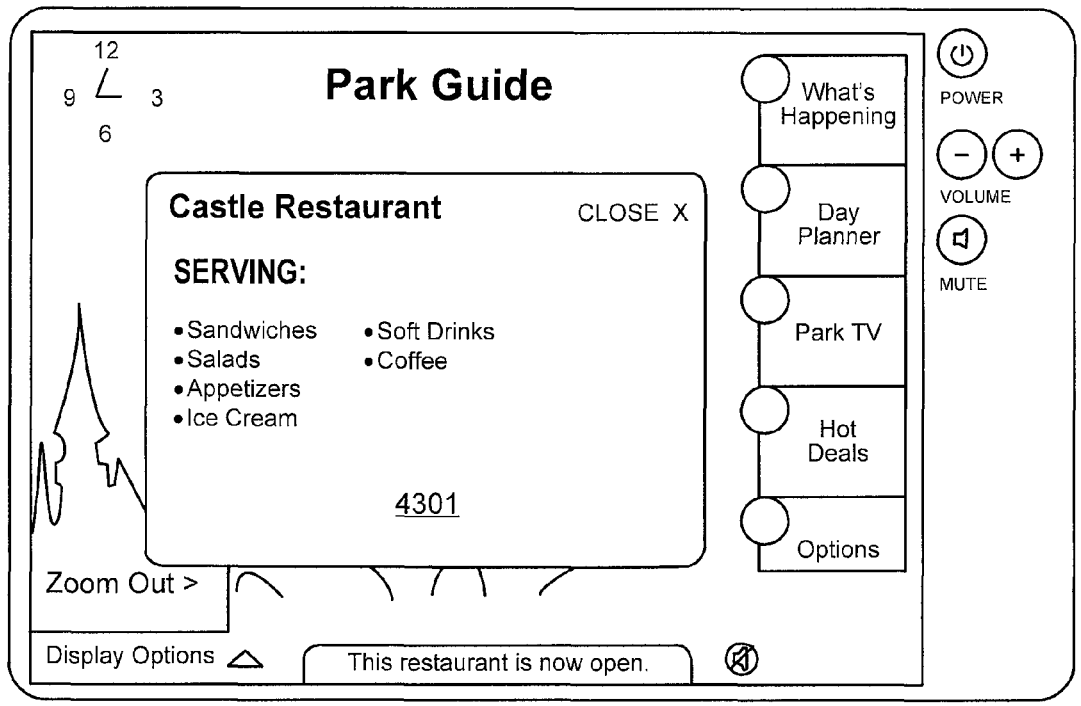
Figure 44:
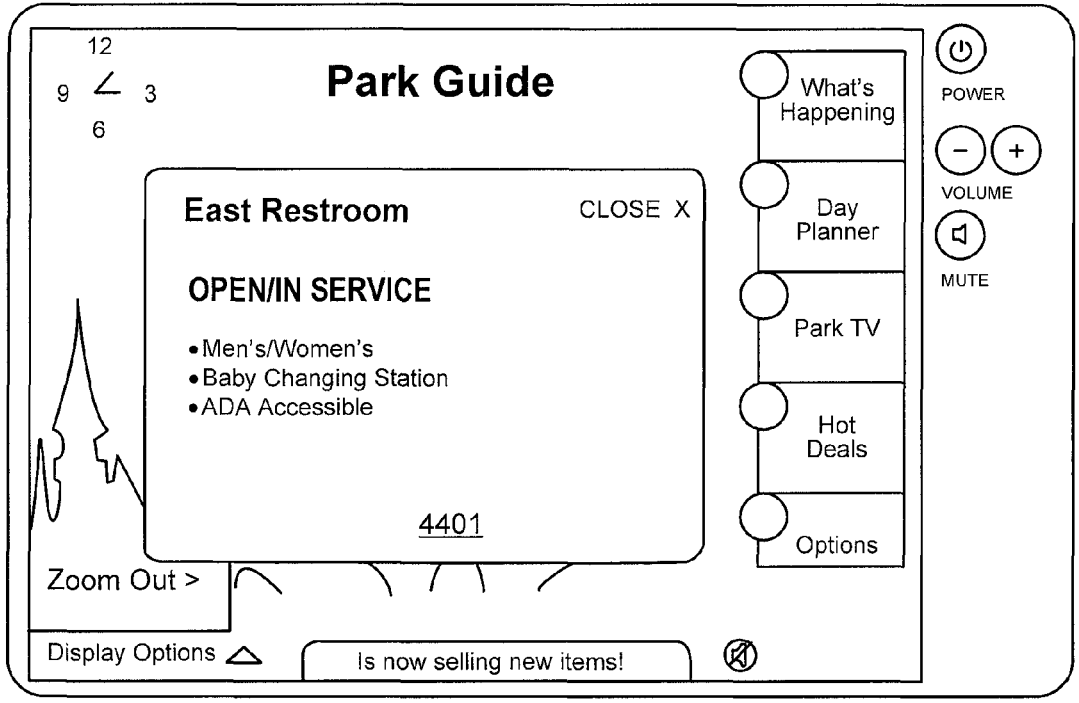

FIG. 43 shows exemplary aspects of a pop-up 4301 for a restaurant. Among other information, a restaurant pop-up 4301 might show food options, menus, a current wait time, a description of the type of food, and an age recommendation. FIG. 44 shows an exemplary pop-up 4401 for venue services. Although this Figure shows a bathroom and related information, such pop-ups might also be provided for telephones, ATMs, information desks, and emergency service facilities.

The user interface may further include selections that provide access to additional features or information. FIG. 41 shows a first selection titled "What's Happening" 4102, a second selection titled "Day Planner" 4103, a third selection titled "Park TV" 4104, a fourth selection titled "Hot Deals" 4105, a fifth selection titled "Options" 4106, and a sixth selection titled "Display Options" 4107. Although six selections are illustrated, any number of selections may be provided in the user interface. An area may be reserved at a portion of the screen for displaying merchandising information, advertising, etc. as shown at 4108.

Figure 45:
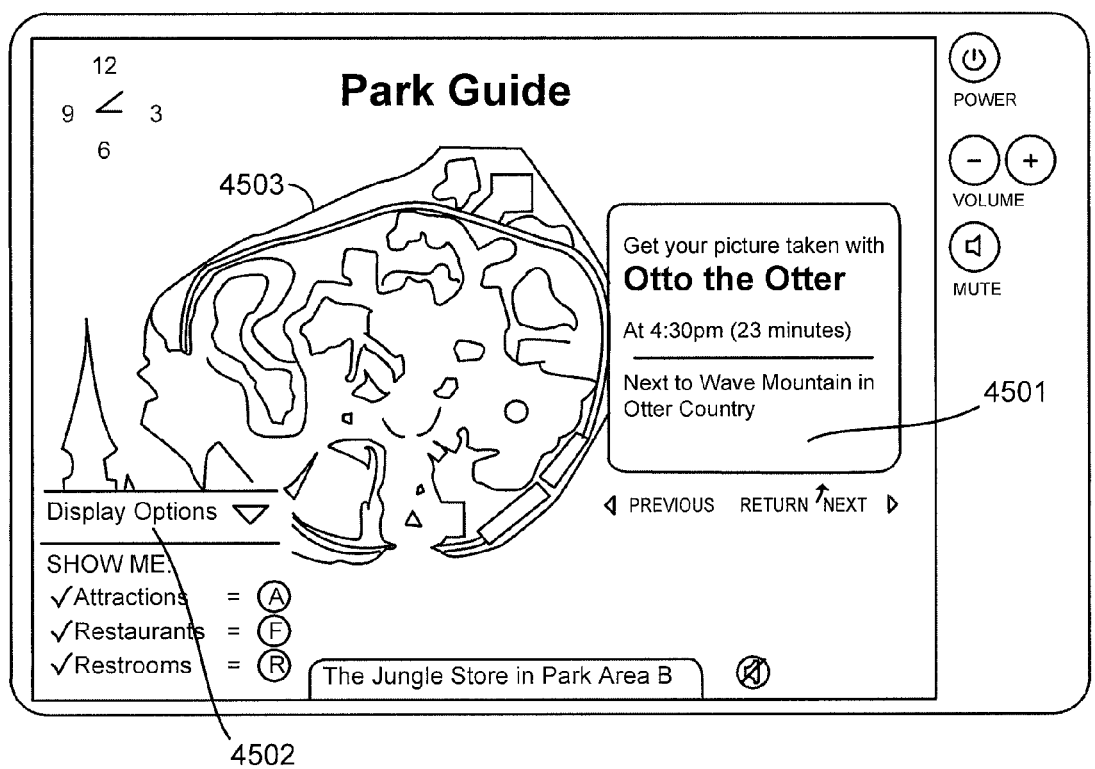

As shown in connection with the "What's Happening" element, an option may provide additional information about temporary or mobile events and attractions. FIG. 45 illustrates an example, where information is provided for a mobile event. In this figure, directions 4501 are given to have a picture taken with a costumed character. A time and location may be given, as well as an amount of time until the event. The interactive map may be configured to highlight the location of the event such as by using a marker.

FIG. 45 also shows some possible display options 4502. The display options selection may provide any number of display options. For example, the options may highlight attractions, rides, retail shops, restaurants, and/or restrooms, as shown in FIG. 39. If one of these options is selected, such items will be shown via a marker on the interactive map 4503. Among others, additional options 4501 such as stores, rides, performances, events, parades, tours, and alternate languages may also be provided as options.

Figure 46:
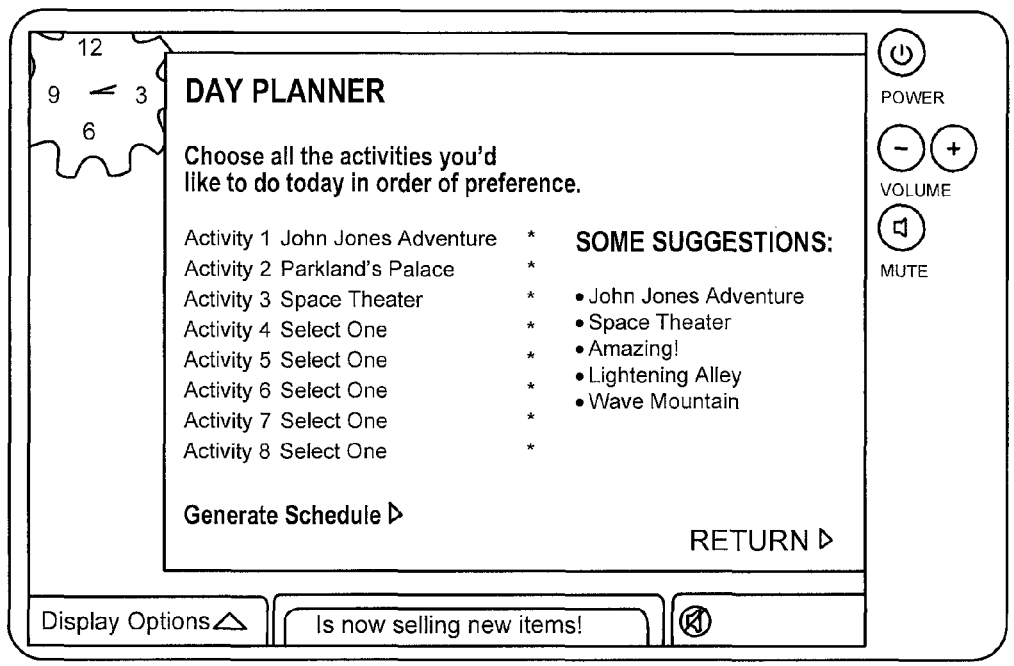
Figure 47:
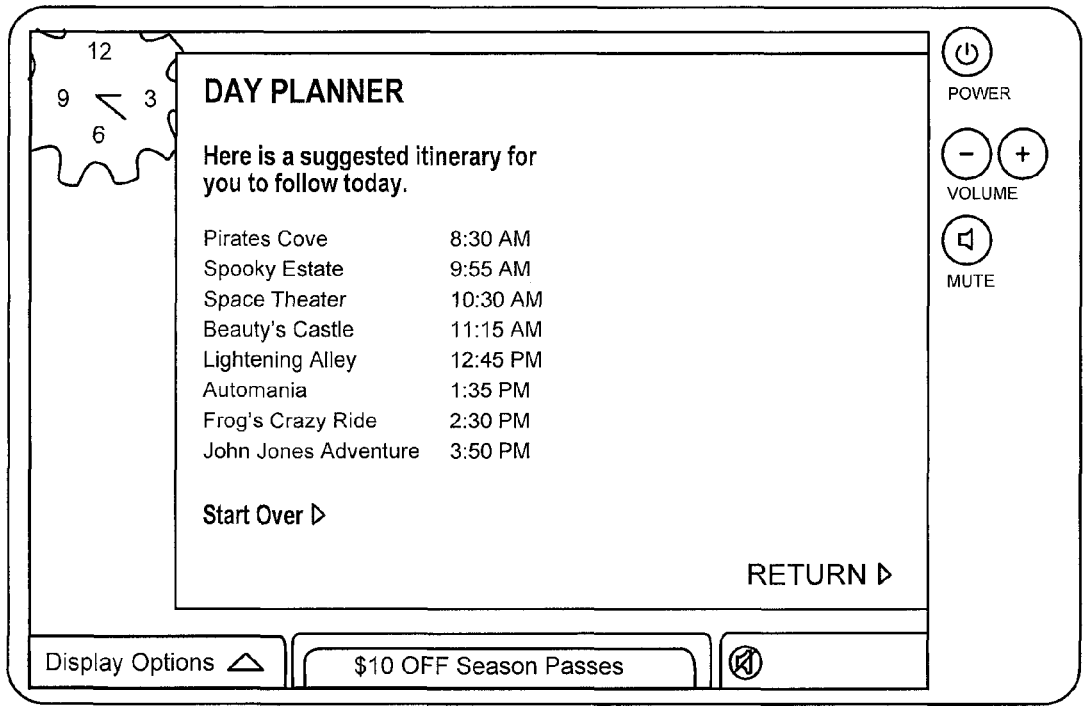

As shown in FIGS. 46 and 47, the "Day Planner" element may assist the user in generating an itinerary based on input from the user regarding which attractions they would like to visit. The trip planner may generate the itinerary by taking into account a combination of information such as the location of each attraction, broadcasted or stored wait times for each attraction, and current position information regarding the current position of the device. This option may include aspects of the visit planning application discussed below in connection with FIG. 52. FIG. 46 illustrates an exemplary user interface requesting from a user a selection of desired activities and attractions to visit. FIG. 47 illustrates aspects of an exemplary user interface displaying a suggested itinerary after a visit planning application has been used.

Figure 48:
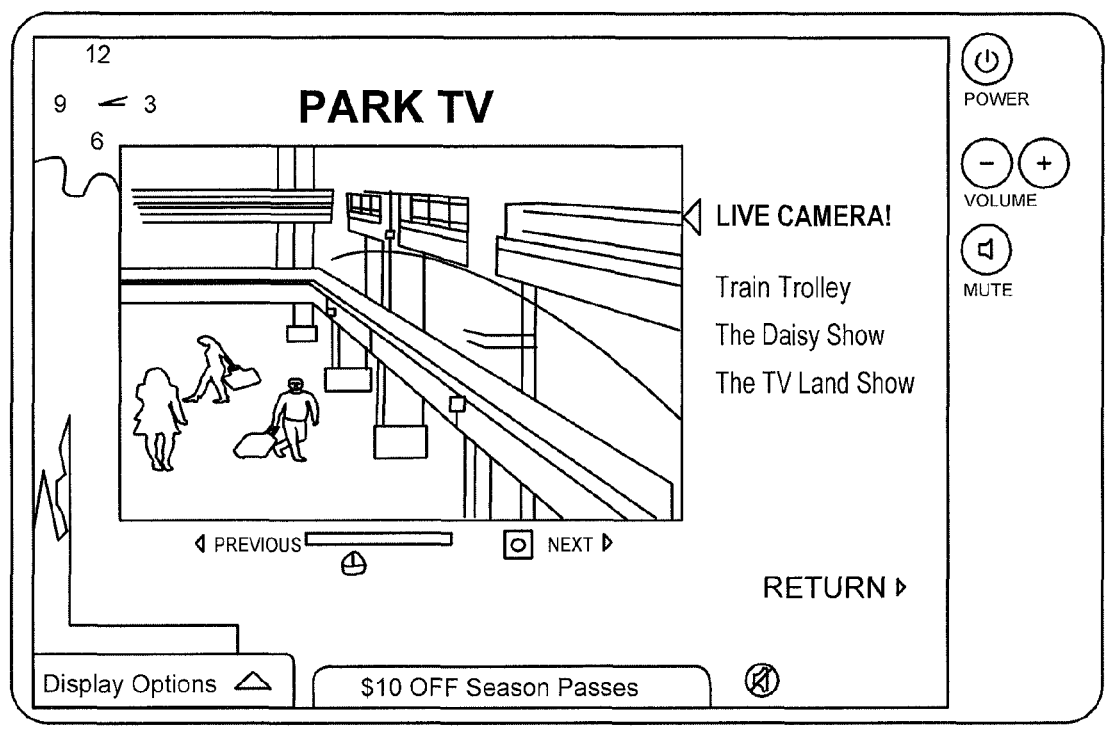

FIG. 48 illustrates exemplary features of the "Park TV" element. An option may provide functionality to view live events occurring within the venue or allow the user to access preloaded content on the device, such as video clips, music, etc. This option may also include the ability to pause, rewind, replay, and further manipulate the content.

Figure 49:
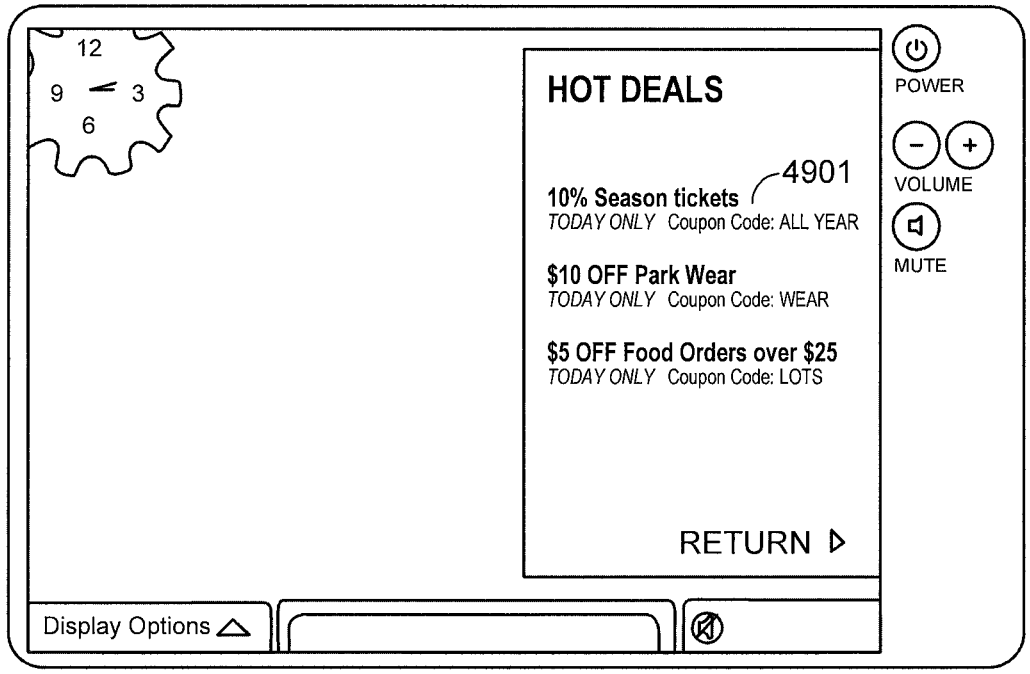

As illustrated in FIG. 49, the "Hot Deals" element, may display merchandising deals to the user. FIG. 49 illustrates a few examples of reduced price merchandise. FIG. 49 also shows a coupon code 4901. Other means of providing the discount to the device user may be provided, such as a bar code, etc. The coupon code may be used to track use of the offer by mobile device users, as discussed above. The Hot Deals section may describe location information for the merchandise deal, and may show the location using a marker on the interactive map.

These merchandise deals may be received via the venue transmission system. Thus, they may be updated at any time. They may also be received based on the geographic location of the device, and may be designed by the broadcast system to manage a crowd, placate customers, and encourage visitors to visit less frequented attractions or areas.

Figure 50:
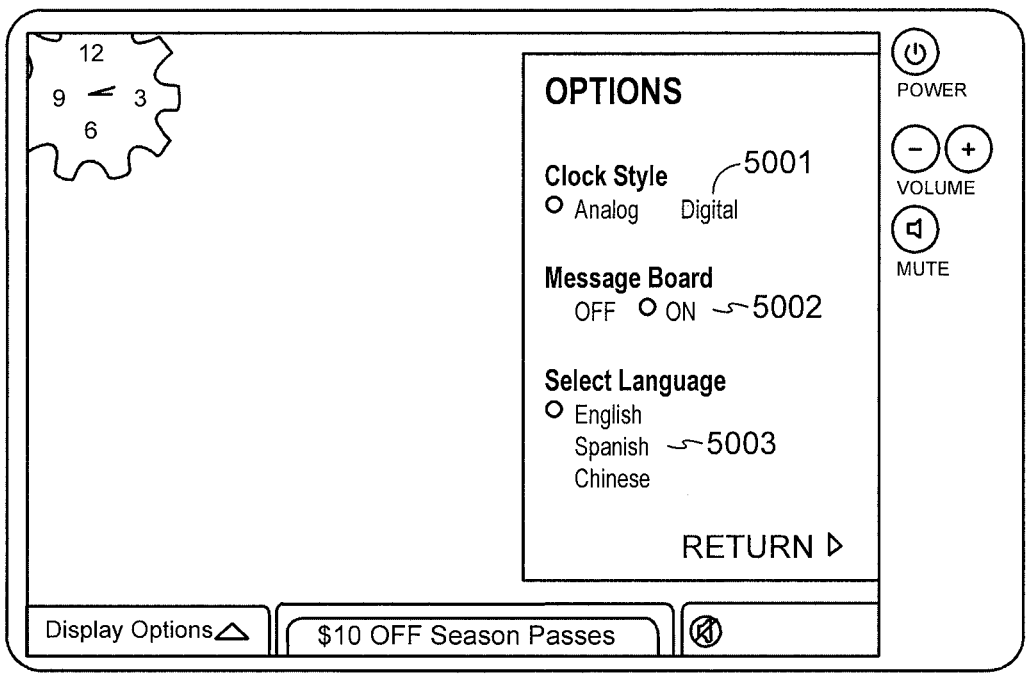

As illustrated in FIG. 50 the "Options" element may provide additional display options. FIG. 50 illustrates a few exemplary options that allow the user to select whether to display an analog or digital clock 5001, whether to display a message board 5002, and what language format to use in the display 5003.

ii. Shopping Venue

Shopping venues are another example of a multiple attraction venue. A venue-cast system in a venue including shopping attractions may broadcast content regarding special sale items tracked in real time, movie trailers, long-form puff ads, product documentaries, coupons, an interactive map, and other video, audio, and data.

A device may store or receive transmissions of location based content. The location based content may be associated with a defined location. The device may automatically access or display the location specific content upon the device entering the defined location.

The location may be defined using latitude and longitude coordinates or in terms of venue signal strength, as described above. The mobile device may periodically or continuously determine its location. When the location of the mobile device is determined to be within the defined location, the device accesses the location based content.

For example, the device may store content relating to a food court or to a specific store. Once the device enters the food court or the specific store, the device displays the content. The device may also include a processor that automatically switches to a channel targeted to the food court or store. The device may also receive information regarding transportation routes and schedules, such as bus or trolley stops and schedules relating to the venue. The device may also receive information regarding special events or hours for the shops or other attractions within the venue.

A dedicated device may be preloaded with applications and data regarding the shopping venue. This preloaded information may be used in connection with real time venue data transmissions. A multi-purpose device may download and store any of the applications and data that can be pre-loaded on a dedicated device.

The device may further include any of the features described above in connection with other multi-attraction venues or other single event venues.

iii. Campus

A campus includes multiple events and attractions such as classes, shops, food vendors, campus services, performances, dances, speakers, club meetings, athletics, sporting events, housing, dining options, museums, libraries, exhibits, transportation options, recreation options, and other events. The features discussed above may be applied to a venue-cast system for a campus. An interactive map may be provided for the campus. Information may be transmitted via the venue-cast system regarding upcoming events. The venue-cast system may also provide information regarding offers and specials at dining options and for merchandise or supplies. Additional information specific to campuses may be included in the venue-cast system, such as class information, transmission of lectures and meetings, library information, and student services information.

VI. Exemplary Use Cases

A. Location Based Merchandising

Aspects of the venue-cast system may also include a broadcast offer system, which broadcasts advertisements or offers to encourage mobile device users to visit a particular location within a venue. Although this aspect is described using an exemplary broadcast system, unicast and multicast transmission may also be used. The system may target the broadcast to the entire venue, or in contrast, may target at least one broadcast stream to a particular area within the venue. The system may include multiple broadcast streams, each targeted to a particular area within the venue. In that manner, the system could function similarly to that described in connection with FIG. 18, wherein the areas 1856, 1860, 1864 and 1868 are each within the venue. Each of these inter-venue broadcasts may be continuous, periodic, or one-time.

In some aspects, a location-based merchandising system may additionally include feedback information 1878 corresponding to one or more of the areas 1856, 1860, 1864 and 1868 within the venue, wherein the feedback information 1878 is configured for use to formulating subsequent content for broadcast. Feedback information 1878 may include, but is not limited to, data such as a state or status of merchandise or an attraction in a given area. For example, one or more monitoring devices 1880 may be located in each of the areas 1856, 1860, 1864 and 1868 within the venue, or in association with an attraction or with merchandise, such that each monitoring device 1880 provides the state or status information to a TS 1830 in the form of feedback information 1878. TS 1830 may additionally include logic for subsequently adjusting the broadcast of content based on the received feedback information 1878.

For example, in some aspects, the system may be configured to broadcast an automatic coupon delivery at areas with customer service difficulties. For example, a coupon or other reward may be automatically delivered at an area that is crowded or shut down, as identified via feedback information 1878, either to compensate the customers within the area, placate or otherwise occupy the customer, or to encourage movement of the customers to a different area. For example, the coupon or reward may be for an attraction or merchandise in the current area, in order to compensate the customer for remaining in the area, or for an attraction or merchandise in a different area to encourage customer movement. In addition to a coupon or reward, entertainment content (graphics, video, audio/music, etc.) may be broadcast for consumption by the customer. Thus, when a customer having a mobile device arrives at an area where a vendor or attraction has been shut down or has service difficulties, a coupon, reward, or entertainment content is delivered via the broadcast system to the mobile device as a way to distract or placate the mobile device user.

In another aspect, a broadcast stream may be targeted to include a reward for a mobile device for entering a less-trafficked area within the venue. For example, feedback information 1878 may include results of local monitoring of customer traffic in an area, or the system may determine this type of feedback information based on other methods of tracking the location of mobile devices. In any case, a broadcast stream may also be sent with an advertisement or incentive to visit a less-trafficked area of the venue. For example, a broadcast stream may include an offer from a vendor located at a distance from a popular attraction or a congested area to encourage movement to the vendor.

In other aspects, offers may be broadcast based on a time and/or location basis. For example, a transmission may include a broadcast stream including an offer, at a given time of day corresponding to a less-trafficked time for a first food vendor, where the broadcast stream is targeted to an area corresponding to a location of a second popular food vendor in order to divert business to the first food vendor.

In another aspect, offers may have a variable value component based on time and/or location. For example, a food vendor may target offers having an increasing value to areas having an increasing distance from a location of the vendor. For instance, offers targeted for area adjacent to the vendor may include a first smaller incentive, such as a 10% cost reduction for a purchase, whereas offers targeted to areas beyond the adjacent areas may include a second relatively larger incentive, such as a coupon with greater than 10% off a purchase.

In addition, the offers may be targeted based purely on time. For example, at 10:00 AM, a coupon may be delivered for 10% off a purchase of a breakfast item at a food vendor, at 11:00 AM, a coupon may be delivered for 20% off a purchase of a breakfast item at the same food vendor, and at 11:30, a coupon may be delivered for 25% off a purchase of a breakfast item at the same food vendor.

Any combination of the time and location basis may be used for targeting an offer. Thus, the broadcast system can encourage the direction of traffic and reduce crowding in an indirect and non-intrusive manner.

In further aspects, messages can be created and broadcast at any time. This allows a venue to monitor congestion, wait times at attractions, and less-trafficked areas, and to create and send offers and advertisements accordingly.

The broadcast system also may facilitate or provide an additional virtual attraction 1882, such as a scavenger hunt within the venue. The scavenger hunt may include broadcasts of clues, e.g. location-specific information 1884, to encourage the mobile device user to visit and engage with various locations within the venue. As the mobile device enters a location, the mobile device may automatically tune to a broadcast stream based on a determination of its location corresponding to the defined geographic area associated with the broadcast stream. For example, such a broadcast stream may include information regarding the scavenger hunt, such as clues corresponding to the respective location. In addition to entering a location to which a broadcast stream is targeted, the broadcast stream may also provide information to encourage or require the mobile device user to interact with an item at the location in order to receive additional information for the scavenger hunt.

The system may also include a tracking component 1886 in order to determine the effectiveness of the broadcast advertisement or offer. For example, coupon-type information may be broadcast, including a coupon code. Information regarding the time that the coupon code was broadcast, the time at which the coupon code was received and viewed on a mobile device, and the time at which a customer redeems the coupon code can be tracked, for example, by a client application on the respective mobile device. The coupon code may include, but is not limited to, an identifier such as a written code, a barcode to be displayed on the screen of the mobile device, etc. In some aspects, for example, such a bar code may be scanned at a time of redemption or verification, such as by a point of sale (POS) device when purchasing an item or by an entry device upon entering an event. Such a POS or entry device may be represented by monitoring device 1880, such is in communication with system, for example, such that once the code is received, the associated data regarding the time at which the mobile device user viewed the coupon and the time of redemption, e.g. the feedback information 1878, are received and stored by tracking component 1886 for use in further analysis. For example, tracking component 1886 may include analysis logic 1888, such as but not limited to algorithms, neural networks, fuzzy logic, etc., to determine or predict information based on feedback information 1878. Such determinations or predictions may include, for example, marketing analysis to determine an effectiveness of each coupon in each area.

As noted above, such coupon information may be targeted to specific locations within the venue, similar to the description in connection with FIG. 18. Each mobile device 1870, 1872, 1874 and 1876 may be configured to determine and log its location, and then to check and see if there is a coupon available for the location. Alternatively, or in addition, each mobile device may be configured to continuously monitor for broadcasting of offers, and to receive a broadcast offer upon entering a given area. Thus, through operation tracking component 1886, a venue can determine the persuasiveness of an offer and can monitor the ability of such offers to encourage visitors to attend various areas within the venue.

B. Attraction Identifier

A number of attractions within a venue may be mobile attractions. For example, such attractions may include but are not limited to parades, mobile performers or costumed characters, mobile retail kiosks, and mobile food vendors. As these attractions or elements of a venue are mobile, they can be difficult for visitors to find. In the described aspects, the location of mobile attractions can be tracked, and such information can be transmitted to a mobile device via a venue transmission system.

Figure 51:
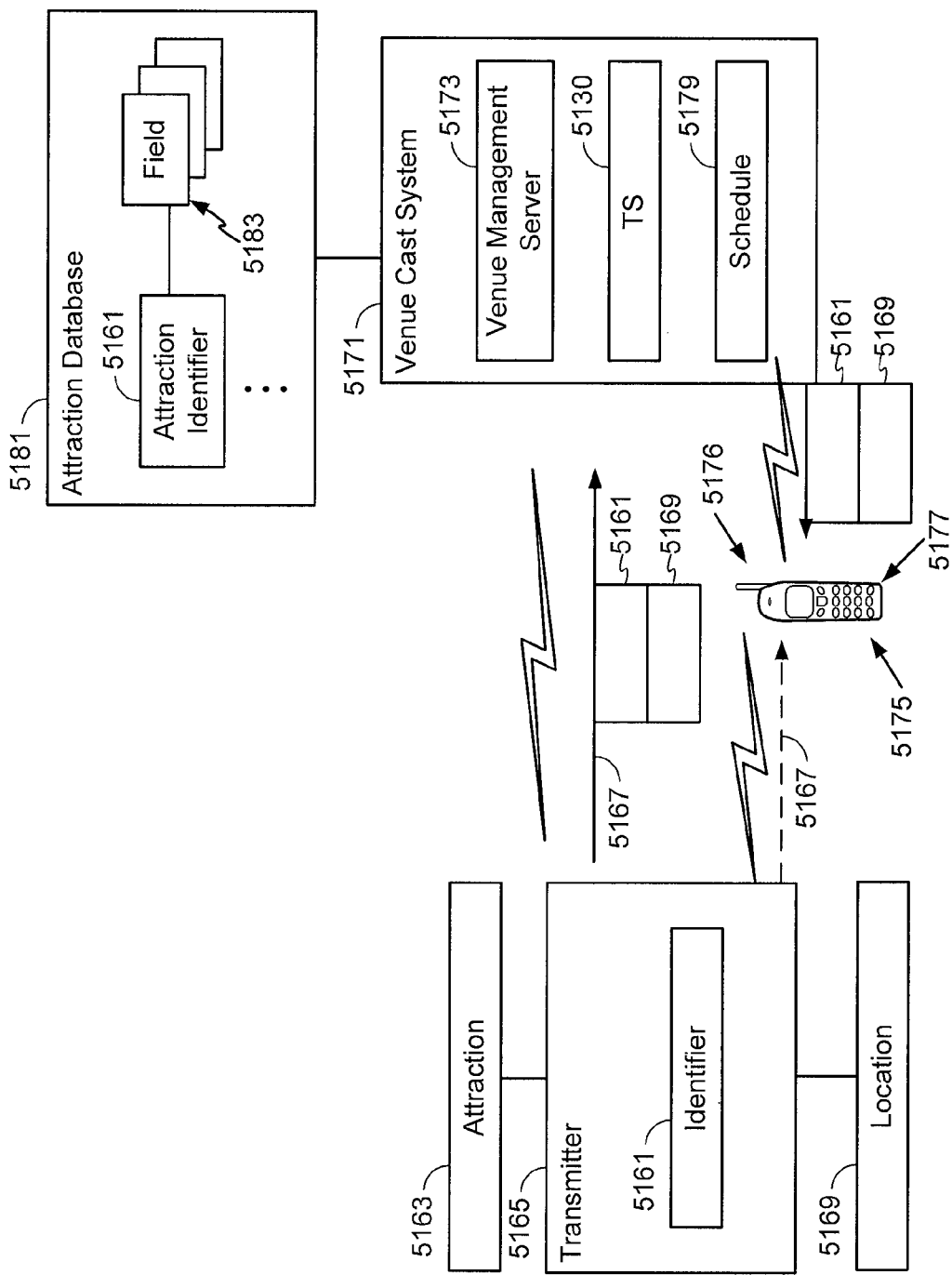
FIG. 51 depicts aspects of an exemplary venue-cast system including a feature for identifying attraction locations.

For example, referring to FIG. 51, in one aspect, a unique identifier 5161 is associated with a mobile attraction 5163. For example, the unique identifier 5161 may be an identifier of a transmitter 5165. Among others, the identifier may be a Radio Frequency Identification (RFID) tag or a WiFi transmitter. If the mobile attraction is a costumed character, the RFID tag may be attached to the costume. The transmitter 5165 transmits a signal 5167 including the unique identifier 5161 and further indicating a location 5169 of mobile attraction 5163.

In some aspects, a venue system 5171 receives the signal 5167 from the transmitter 5165. For example, a venue management server 5173 may obtain and store the information from signal 5167 in association with mobile attraction 5163, for example, in an attraction database 5181. Attraction database 5181 may include one or more fields 5183 for each attraction identifier 5161 corresponding to a mobile attraction. The fields 5183 may include, but are not limited to, a daily schedule field, a management field, and a current location field. The information received via signal 5167, e.g. current location 5169, may be used to update the current location field for the mobile attraction. This updated information may then be transmitted over the venue transmission system.

For example, via TS 5130, the venue transmission system 5171 may transmit a venue transmission 5173 including the location information 5168 to identify the location of the mobile attraction 5163. Accordingly, a mobile device 5175 receiving the venue transmission 5173 thereby receives the location 5169 of the mobile attraction 5163. For example, a mobile device 5175 may include a client application 5177 configured to generate, e.g. visually display or audibly announce, the location 5169 to a user. For example, the location 5169 of the mobile attraction 5163 may be displayed on a map of the venue.

In another aspect, the venue system 5171 and/or the mobile device 5175 may store a general schedule 5179 for the mobile attraction 5163. The current location 5169 of the mobile attraction 5163, received from signal 5167, may be used to update the general schedule 5179. Also, the mobile device 5175 may receive alerts updating the general schedule 5177 based on newly received location information for an attraction.

In another variation, the mobile device 5175 may include a receiver 5176 for receiving the signal 5167 from the transmitter 5165 as mobile attraction 5163 moves into range of the transmitter 5165. Upon receiving the signal 5167, the mobile device 5175 may provide location information 5169 for the mobile attraction 5163 to a user. For example, the mobile device 5175 may display the location of the mobile attraction or update a general schedule for the mobile attraction, as discussed above. In addition, the mobile device may provide an alert to a user regarding the mobile attraction. For example, if the mobile attraction is a costumed character, the mobile device 5175 may provide an alert that the costumed character is nearby and provide detailed information regarding the costumed character's location.

In this variation, receiving the signal 5167 may also trigger the mobile device 5175 to obtain information from the venue-cast system 5171.

In another variation, the attraction 5163 may not be mobile. For example, a restaurant or other attraction may have an identifier 5161 associated with its location 5169. As the mobile device 5175 approaches the vicinity of the restaurant and receives the signal 5167, the mobile device 5175 may provide an alert to the user. For example, the alert may be a coupon or advertisement for the restaurant.

Thus, this aspect may be used to encourage consumers to move around the venue and to respond to congestion. The alerts may be provided for less visited or less obvious attractions. Congestion levels may be monitored, and mobile attractions such as costumed characters may be directed to move away from crowded areas in order to encourage crowds to disperse.

Information from the signal 5167 associated with the identifier 5161 and/or attraction 5163 that is received by a venue-cast system may also be used to locate key employees or to study work flow at large venues or venues having a large number of employees.

In addition to tracking mobile attractions 5163, an attraction identifier 5161 may be used to generate interest in merchandise items. For example, an identifier 5161 may be attached to rare merchandise items such as limited quantity items or collectibles. The location 5169 of these items may be transmitted via signal 5167 in association with their respective identifier 5161. As such, the location 5169 of the items, e.g. the attraction 5163, may be provided to a consumer at the mobile device. In addition, an alert may be provided to the user to inform them about the item and its location. If a limited number of the items are available for purchase, an alert may be provided to the mobile device user each time one of the items is purchased. By providing alerts about the number of items that have sold or the remaining number of items, the system may create a sense of urgency in a customer to encourage the customer to purchase the item.

As an example, a theme park venue may have one-of-a-kind items, such as original cell paintings used in making cartoons or films related to the theme park. A cell painting may have an identifier such as an RFID tag that transmits a signal. The signal can be received by the venue system and the location of the item may be transmitted to a mobile device along with information regarding the importance of the item. The RFID signal may also be received directly by the mobile device, and the device may alert the user that an item of interest is nearby. This can encourage venue visitors to visit the store to view the original cell painting. The importance of the item may be described at its display location. As such, a customer that was not originally interested in purchasing the cell painting may become interested based on the alert or after viewing the item.

C. Visit Planning

Often, venues include multiple attractions. Among others, a multiple attraction venue may be, for example, a theme park having a number of rides, performances, retail shops, restaurants, and costumed characters; a fair having rides, performances, events, and competitions; a shopping center with stores, performances, and restaurants; a campus with classes, meetings, and other events; or a trade show with multiple vendors, performances, speakers, meetings. Each ride, event, performance, or attraction may have a certain popularity, age limit, waiting time, etc. It can be very difficult for a visitor to decide on a sequence of attractions that they wish to visit in a limited amount of time. For venues including a plurality of attractions, a venue visit planning application may be provided that includes an algorithm for assisting a mobile device user in determining which attractions to visit and at what time.

The visit planning application may be provided for download to a multipurpose mobile device that enters the venue area and may be pre-loaded on dedicated devices. The visit planning application may use a combination of pre-stored and real time venue information received over a venue broadcasting system to assist a user in planning which venue attractions to visit. The visit planning application may also use information input by the mobile device user in combination with the venue information.

Among others, such user input information may include a designation of desired attractions, a rating for types of attractions, an user age and an amount of time to be spent in the venue.

For example, the visit planning application may consider any combination of the following variables before providing an attraction sequence list: a current or average wait time for the attraction, a general or user specific rating of the attraction, the age of the mobile device user, general or user specified interest in types of attractions, distance from the current location of the mobile device to the attraction, areas previously covered by the mobile device, and the current availability of an attraction.

Figure 52:
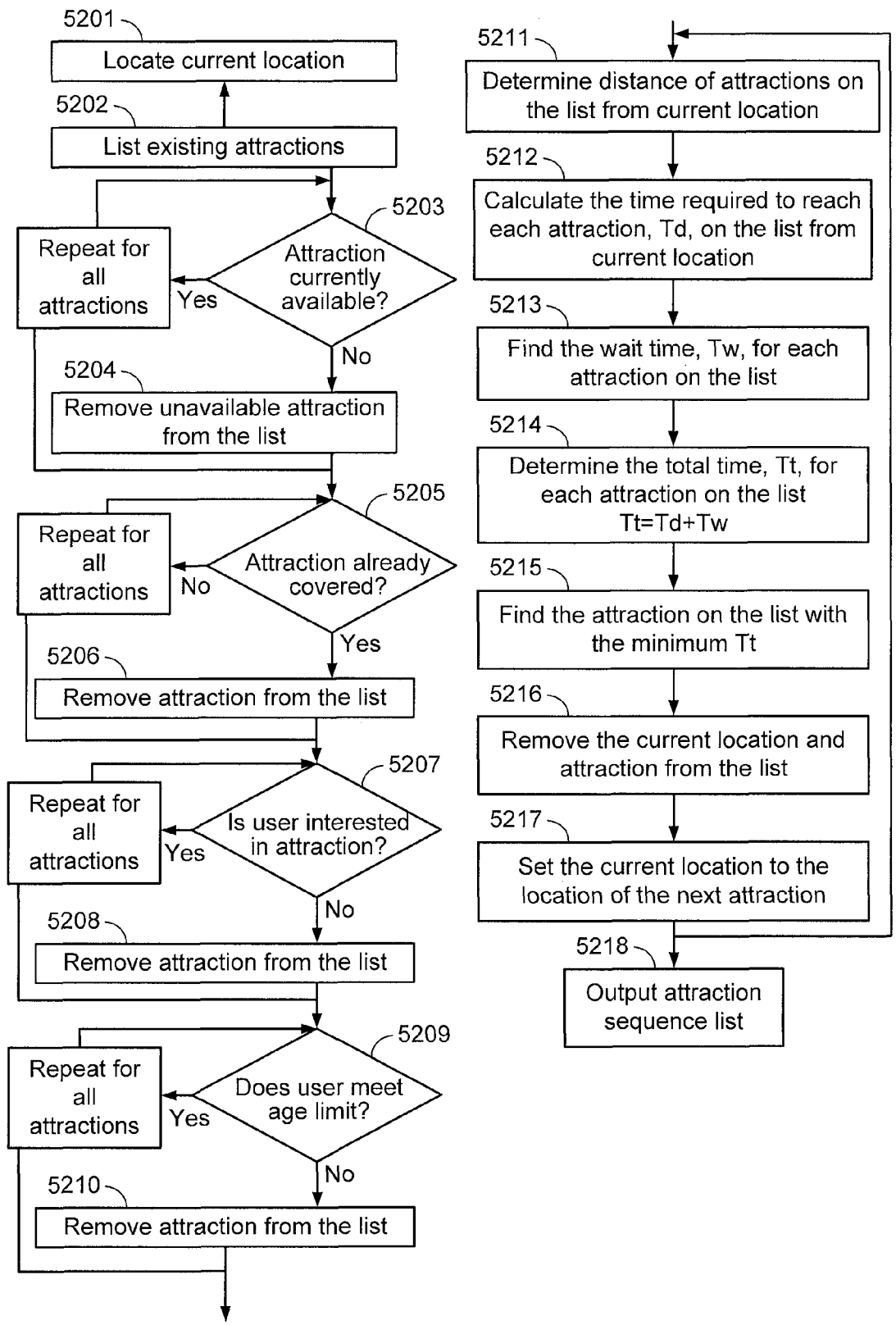
FIG. 52 depicts aspects of an exemplary visit planning application for use with a venue-cast system.

FIG. 52 illustrates exemplary steps that may be taken in a visit planning application. This figure illustrates aspects of an algorithm that plans visits to attractions based on availability of the attraction, a mobile device's desire to visit the attraction, an age limit of the attraction, and a distance to the attraction. This is merely an illustration of aspects of the visit planning application. The application may include any combination of the above described considerations.

First, in step 5201, the mobile device determines a current location of the mobile device either by user input or by a location determination feature. Then, the application lists the existing attractions in step 5202. At step 5203, the application determines whether each of the existing attractions is available. This determination may be made using information broadcast at the venue or based on a downloaded list of available dates and times and comparing it to the date and time determined by the mobile device. At step 5204, if an attraction is unavailable, the application removes the attraction from the list. The application returns to step 5203 until the availability of each of the attractions has been determined.

The application determines whether the attraction has already been visited in step 5205. Previously visited attractions are removed from the list, in step 5206. These steps continue until all previously visited attractions are removed.

Then, the application uses an indication of user desire to visit the attraction in step 5207. If the user has not indicated a desire to visit the attraction, the attraction is removed from the list in step 5208. These steps continue until only user desired attractions remain.

In step 5209, the list compares an age input by the user of the mobile device with any age requirements for the remaining list of attractions. If the required age is greater than the age input by the user, the attraction is removed from the list in step 5210.

Then, the application determines the distance from each remaining attraction to the current location of the user in step 5211. In step 5212, the application calculates the time, Td, required to reach each ride from the current location. In step 5213, the application finds the wait time, Tw, for each ride. The wait time, Tw, may be a current wait time received from the venue broadcast system. In addition, the wait time may be an average wait time for the attraction. As the wait time often changes according to the time of day, the application may take into consideration the various average wait times based on a time of the potential visit to the attraction. In step 5214, the application determines a total time for visiting the attraction Tt, which is equal to the sum of the time required to reach the attraction and the wait time for the attraction, or Tt=Td+Tw. In step 5215, the application determines the attraction with the minimum attraction visit time Tt in the remaining list of attractions. This attraction is selected. The selected attraction may be provided as a suggested option and this attraction may be added to a sequence list as the first attraction.

If the application is creating a list of attractions to visit, the application may then remove the current location, illustrated as step 5216 and perform a calculation to find a second attraction having the minimum total visit time Tt from the location of the first selected attraction. The application does this by replacing the determined current location with the location for the first attraction in the sequence list, in step 5217. The second attraction is then added to the sequence list. The application may continue the calculations until a predetermined number of attractions are listed or until each of the desired attractions are included in the sequence list. The application may also stop when a combined total time for visiting the selected attractions exceeds the amount of time the user will spend in the venue. An attraction sequence list may be created in step 5218. The predetermined number of attractions may be one, so that the application recalculates a next attraction each time a mobile device user finishes a visit to a previously selected attraction. This may enable the application to most effectively use a current wait time being broadcast by the venue broadcast system. Rather than selecting only one attraction, the application may be configured to provide the mobile device user with a predetermined number of attractions having the lowest total visit time, so that the user may select among the attractions. The predetermined number may be preset or selected by a user. For example, the application may display the top three attractions that will have the lowest total visit time.

D. Venue Departure Detection

As every visitor to a venue may not have a mobile device, the venue may provide rental mobile devices capable of receiving targeted venue broadcasts. As it is often difficult to collect all rental devices at an exit, the rental mobile device may include a mechanism to remind a user to return the device once the user reaches the venue exit.

The rental mobile device may include a position determining application, such as GPS. The rental mobile device determines the current position of the device and determines if the device is either (1) determined to be at the periphery of the venue or (2) determined to be within a predetermined area of the venue. If the mobile device is determined to be either at the periphery or within the predetermined area, the mobile device starts an alarm on the rental mobile device to alert the user to return the rental mobile device.

One variation may include defining a venue periphery in terms of latitude and longitude and storing the information in the rental mobile device. A central point of the venue may also be defined. The device continues to detect its current location and to compare its location to the defined venue periphery and central point. If the current location of the device is between the central point and the defined periphery, the device does not sound the alarm. When the device is determined not to be between the central point and the periphery, the device triggers the alarm.

Another variation may include defining an area in latitude and longitude for each exit gate, the defined area including a small periphery around the exit gate. The defined area is stored in the device. The device continues to detect its current location and to compare its location to the defined area. If the current location of the device falls within the defined periphery of the exit gate, the device triggers the alarm to signal the user to return the device.

In addition to using a location determination to trigger an alarm, a rental device can be configured to trigger an alarm based on the detected signal strength of a venue broadcast system. As the venue broadcast system is limited to the venue periphery, the strength of the signal received by a rental device is another way to determine whether the device is at the periphery or outside the venue. A strength of the venue broadcast signal is determined at the periphery of the venue. This peripheral signal strength is stored in the mobile device. The mobile device monitors the signal strength received from the venue broadcast system and compares it to the stored peripheral signal strength. When the power of the signal falls below the peripheral signal strength, the device triggers the alarm. The device may be configured to trigger the alarm only after the monitored signal falls below the peripheral signal strength for a predetermined duration. In order to make sure that the signal power received at an exit gate is low, a directional antenna may be used.

E. Delivery of Content for Storage

Aspects of the venue-cast system may include a broadcast, multicast, or unicast system for distributing content to be stored at an access terminal. Exclusive venue content may be transmitted to access terminals at the venue for storage on the access terminal. Among other things, the exclusive content may include a recording of a performance or event at a venue, an edited summary clip of the performance or event, other recordings, an application related to the venue, and a coupon/offer for a venue related item.

Similar to the distribution of coupons and offers described in above, the coupons and offers may include a variable value component based on time and/or location.

The exclusive content may be streamed for storage simultaneously with the broadcast of other venue-cast content that is not configured for storage.

For example, at a concert live content may be broadcast, such as alternate camera angles. At any time, additional venue-cast content may be streamed to a receiving access terminal for storage on the access terminal. For example, one venue-cast channel may broadcast live concert content, such as multiple camera angles, to access terminals while a second channel broadcasts exclusive content to be stored at the access terminal. This exclusive content is saved at the access terminal for later consumption.

As the exclusive content is stored at the access terminal, any type of digital rights management may be applied to the stored exclusive content. The content may include temporal, geographic, and other limitations to storage and access.

Often, attendees to a concert or performance will arrive before a performance. By offering exclusive content at the performance, the venue-cast system offers exclusive performance content to a targeted audience waiting for and/or attending the performance. This may include an exclusive content package that fans cannot obtain elsewhere. By distributing exclusive applications such as games for storage at an access terminal, the venue-cast system further entertains a waiting audience. The venue-cast system also allows for a more efficient use of the existing investment in production. For example, audio and/or video recordings of the performance may already be captured for other purposes. This also provides an additional form of souvenir that allows the performance attendee to save a memorable reminder of their experience. By providing a high quality recording of the actual performance attended by a fan, the venue-cast system reduces the motivation for piracy. By distributing coupons or offers relating to a concert or performance, the stored content promotes purchases by the attendee.

Figure 53:
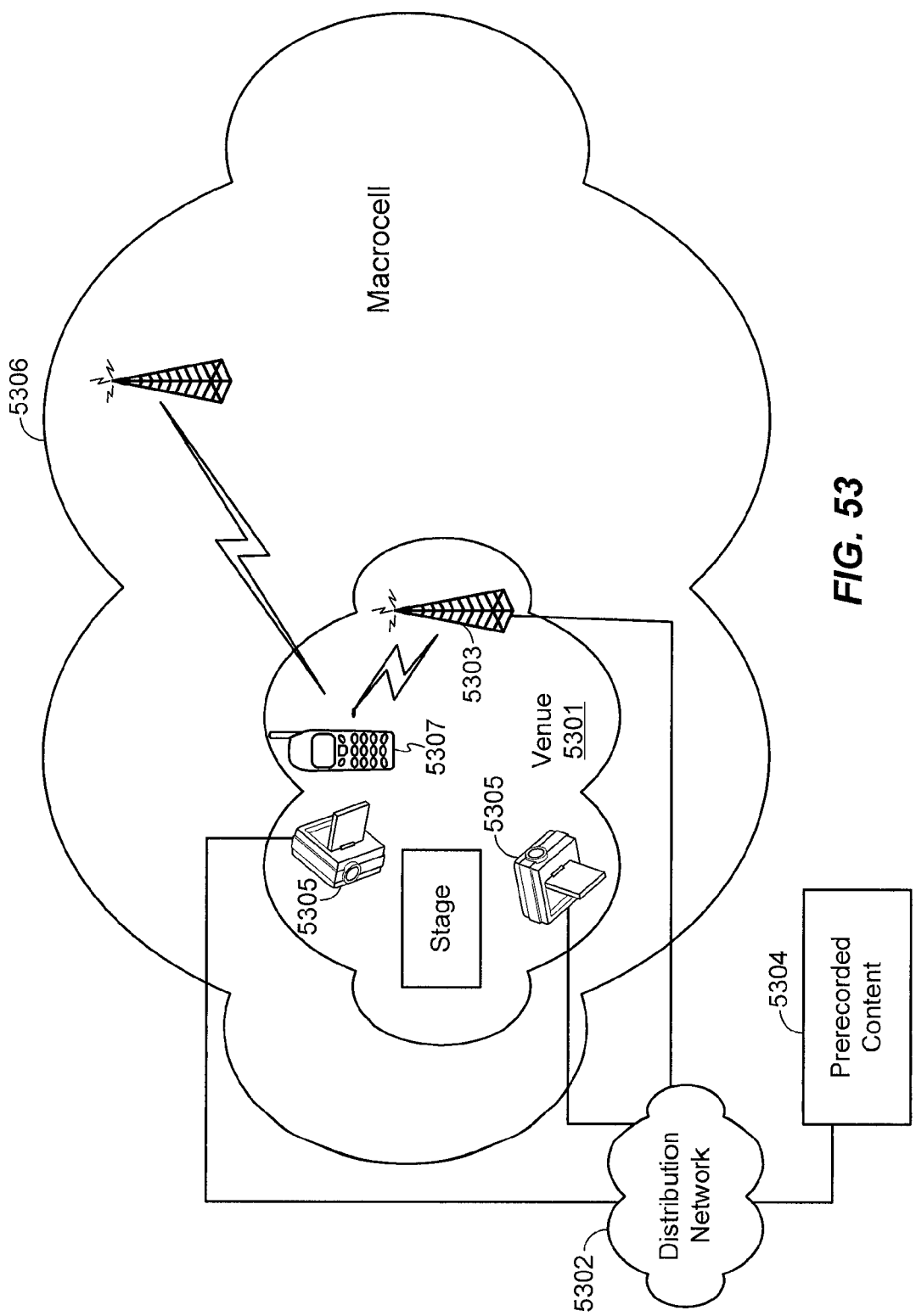
FIG. 53 depicts aspects of an exemplary venue-cast system at a single attraction venue.

FIG. 53 illustrates exemplary aspects of a venue-cast system transmitting content for storage at a performance venue 5301. Although a performance venue is illustrated, aspects may be applied to any venue. The venue-cast system may include a distribution center 5302 that distributes venue content via a transmitter 5303. The venue distribution network may receive both pre-recorded content 5304 and content recorded live during a performance, such as via multiple cameras 5305. Both the pre-recorded content 5304 and the content 5305 recorded during the performance may be recorded at a production quality level. Although cameras 5305 are illustrated, the distribution network may receive audio and/or video recordings during the performance. As described in more detail below, the venue-cast system may operate in cooperation with a larger macrocell 5306 that provides a mobile device 5307 with information on accessing the venue-cast.

Security mechanisms may be provided to limit access to the transmission. For example, receipt of the transmission may be limited to concert attendees, or to a subgroup of concert attendees. This subgroup may include attendees paying an additional fee.

The exclusive content from the performance may also be used to broaden the performance audience. For example, the content may be offered to users beyond the performance venue. These variations may be applied to other single or multiple attraction venue-cast systems.

XI. Security and Billing

Another aspect includes providing a mechanism for efficiently billing the venue-cast services to an end user in a reliable way. This aspect includes suitable security features applied to the venue-cast transmission and providing a subscription to the venue-cast transmission. The venue-cast system may include a Conditional Access System to grant access to transmissions to mobile device users based on predetermined criteria. The predetermined criteria may limit access to dedicated devices, to devices within a predefined geographic boundary, or to devices with a subscription to the venue transmission system. The venue-cast service may be part of the MediaFLO™ service package. In addition, users may subscribe to the venue-cast service for a period of time, such as for a day spent at the venue. A subscription may also be offered and obtained on the spot, via the venue-cast system.

Billing may be provided as an aspect of use of the venue-cast system. Billing may be carried out in a number of ways. For example, billing may be carried out using a CSR or as part of a purchase at a venue. A mobile device's usage of the venue transmission system may also be tracked and billed to a user.

Returning to FIG. 1, exemplary security and billing aspects of a venue-cast system are depicted. In some aspects, the multimode mobile device 104 subscribes, depicted as paying a fee 120, to the venue-cast network 108 in order to receive keys (e.g., decryption) 122 that enable access to broadcast 112 and/or venue-cast 132. For example, the multimode mobile device utilizes a cellular or wireless two-direction data channel in order to subscribe (not shown). The identity of this mobile device 104 and subscription keys, depicted at 124, are shared with a local mobile data network 126 (e.g., EV-DO) that receives venue-cast content from provider 128 (e.g., live video feed; venue-specific clips; etc) and distributes it by data packet unicast or multicast via AP 118.

It should be appreciated with the benefit of the present disclosure that security associated with an air-interface specific architecture can be incorporated. For example, in EV-DO BCMCS, if a BCMCS controller is used in the service discovery and information acquisition procedures, then a key exchange mechanism in BCMCS can be used for venue-cast. The venue-cast service provider could receive revenue in one or combination of the following mechanisms. First, advertisement and/or sponsorship can be arranged, in which case the service could be offered to the end user with no charge. Alternatively or in addition, subscription via flat fee to one of the terrestrial mobile TV service packages can be offered. The terrestrial mobile TV network then delivers the relevant service keys to both the user and the venue-cast network. The authentication mechanism could be based on the underlying air interface for venue-cast. For example, for delivering venue-cast over EV-DO BCMCS to MediaFLO™ system users, the user can subscribe to a venue-cast package from the MediaFLO™ system. The MediaFLO™ system network then dispatches the service key for the venue-cast package to both the user and the BCMCS network. Both sides then generates broadcast access key (BAK) based on the service key to encrypt and decipher the content. Alternatively or in addition, subscription at the spot or at the venue can be supported. In this case the venue-cast application would direct the user to a local website for instant subscription, after which the relevant key parameters can be delivered to the user, for example, by the venue-cast network via unicast.

Authentication, depicted at 130, over a bi-directional venue-cast wireless channel 132 can serve as a usage measure that is communicated from the local mobile data network 126 to the media broadcast network 108 or the cellular network 150, as depicted at 134, for purposes such as compensation for a venue (sporting franchise, theme park, etc.).

Figure 54:
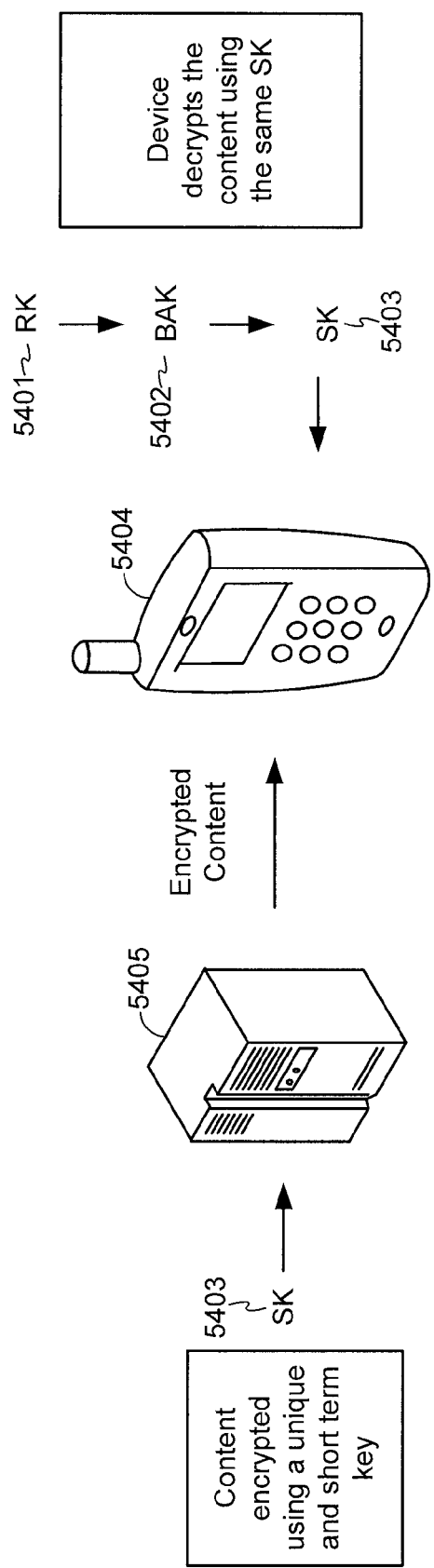
FIGS. 54-55 depicts aspects of an exemplary security mechanism for a venue-cast system.

FIG. 54 illustrates a variation on venue-cast encryption. A registration key 5401 is a pre-provisioned key stored in a device 5404 and also in the AAA. A broadcast access key (BAK) 5402 provides access to one or more IP flows for a certain amount of time. For example, access may be provided for a day, a week, a month, etc. A short term key SK 5403 is derived by the device 5404 from a BAK 5402 and a random value transmitted along with the encrypted content. It is not transmitted over the air. FIG. 54 shows that content is encrypted using a unique and short term key SK 5403. The encrypted content is transmitted to a device 5404. The device decrypts the content using the same SK 5403, which is derived at the device from a BAK 5402 and a random value transmitted along with the encrypted content 5405. Application level encryption may be provided for the entire file.

Figure 55:
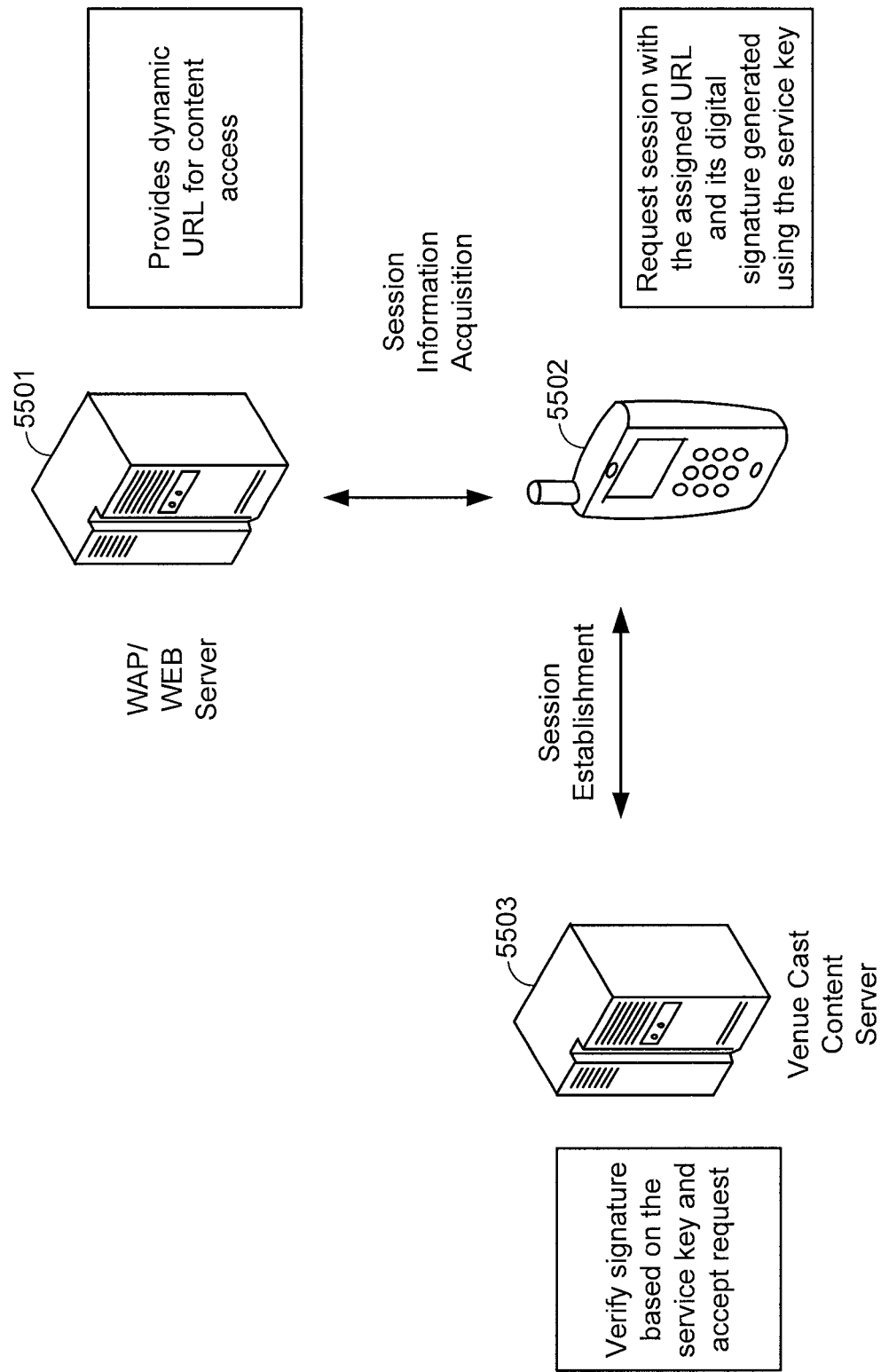

FIG. 55 shows a security procedure for one aspect of unicast streaming. The security procedure may be performed at the beginning of a connection setup. A device generates a digital signature of a dynamic URL using a service key. A server 5501 provides a dynamic URL for content access. A device 5502 requests a session with the assigned URL and its digital signature generated using a service key. A venue-cast server 5503 verifies the signature based on the service key and once verified, accepts the request to establish a unicast session.

In order to limit the reception of venue-cast information to those inside a venue, a service key may be delivered locally, upon entering a venue. For example, it may be desirable to limit the reception of a concert targeted venue-cast to those who purchased tickets to the concert and are inside the concert venue.

Figure 56:
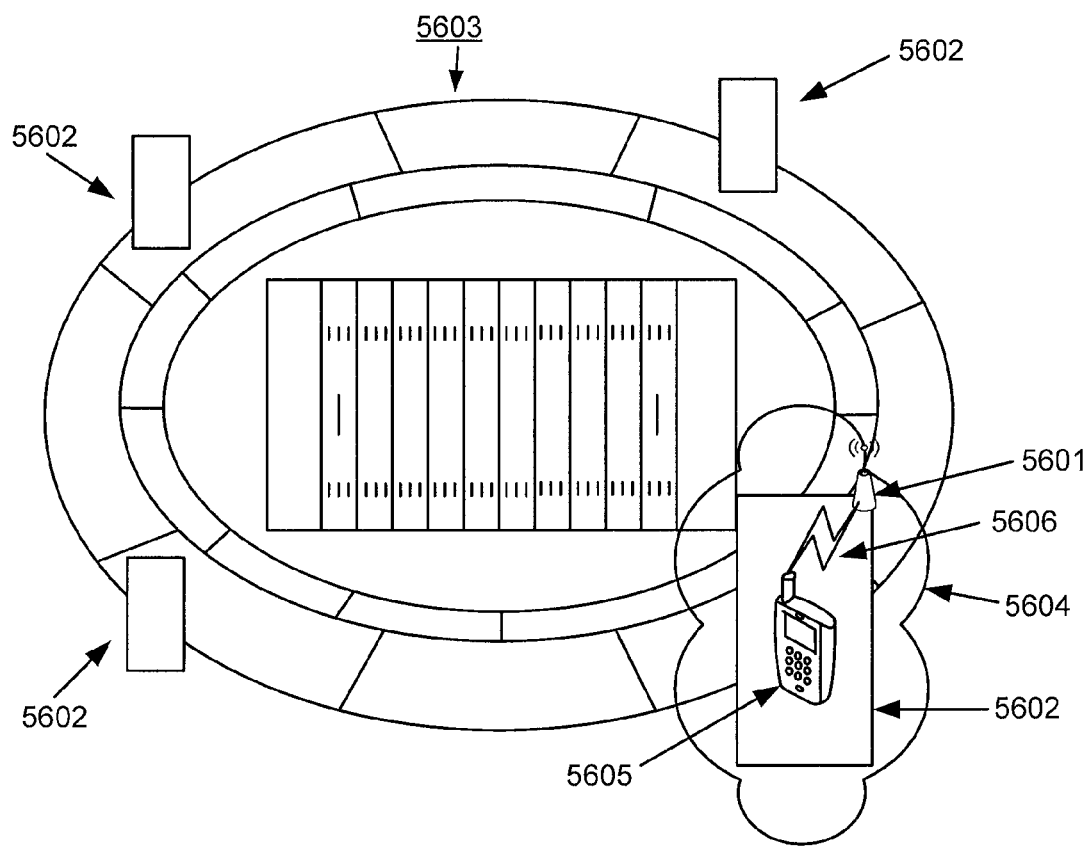
FIG. 56 depicts aspects of an exemplary key delivery mechanism for a venue-cast system.

As illustrated in FIG. 56, a key delivery mechanism 5601 may be provided near entrances 5602 to provide ATs entering the venue 5603 with a token identifier. The transmission coverage area 5604 of the key delivery mechanism 5601 may be set up to cover the entrance area 5602 of the venue 5603. As the AT 5605 passes through the entrance, it passes through the transmission area of the key delivery mechanism and receives the key. The key delivery mechanism may be, for example, a blue tooth or Near Field Communications (NFC) type device that transmits a signal 5606 with a token identifier or other key to be used by the AT to decrypt a venue-cast. A subscription may still be required, but the delivery of the key may limit the users able to subscribe to those users that pass through the entrance of the venue.

Figure 57:
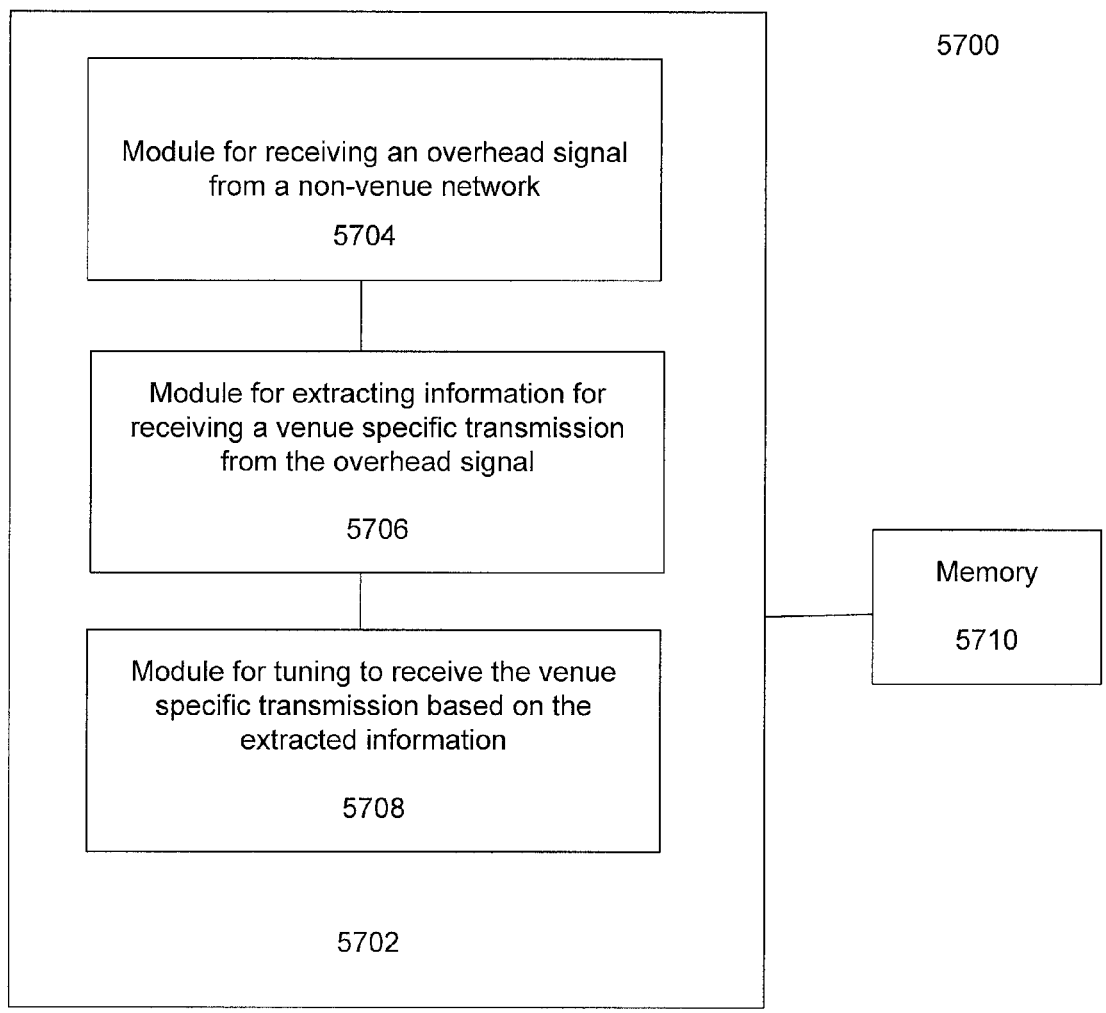
FIG. 57 depicts service discovery aspects for discovering and receiving an exemplary venue-cast system.

With reference to FIG. 57, illustrated is a system 5700 capable of performing service discovery for a venue-cast transmission and receiving the venue-cast transmission. For example, system 5700 can reside at least partially within a transmitter, mobile device, etc. It is to be appreciated that system 5700 is represented as including functional blocks, which can be functional blocks that represent functions implemented by a processor, software, or combination thereof (e.g., firmware). System 5700 includes a logical grouping 5702 of electrical components that can act in conjunction. For instance, logical grouping 5702 can include a module for receiving an overhead signal from a non-venue network 5704.

Further, logical grouping 5702 can comprise a module for extracting information for receiving a venue specific transmission from the overhead signal 5706. Therefore, the system may discovery the existence of a venue level transmission by monitoring a signal from a non-venue network. Furthermore, the system may extract the information necessary to receive the venue level transmission from an overhead signal from the non-venue network. Furthermore, logical grouping 5702 can comprise a module for tuning to receive the venue specific transmission based on the extracted information 5708. Additionally, system 5700 can include a memory 5710 that retains instructions for executing functions associated with electrical components 5704, 5706, and 5708. While shown as being external to memory 5710, it is to be understood that one or more of electrical components 5704, 5706, and 5708 can exist within memory 5710.

It should be apparent that the aspects herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than the one or more of the aspects set forth herein.

It is to be recognized that depending on the aspect, certain acts, or events of any of the methods described herein, can be performed in a different sequence, may be added, merged, or left out together (e.g., not all described acts or events are necessary for the practice of the method). Moreover, in certain aspects, acts or events may be performed concurrently, e.g., through multi-threaded processing, interrupt processing, or multiple processors, rather than sequentially.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM etc. UTRA and E-UTRA are part of Universal, Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features are presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

In yet another aspect of the present invention, a service and application management framework for venue-specific services is provided to manage applications that may be delivered and/or used in connection with a venue. Services or applications that are relevant and available only at specific venues may need to be managed to enhance a user's experience. Consider a multitude of venues and different applications that may be required to interact with the data available at such different venues. As an example, at a shopping mall, a user may desire access to: an interactive map application on his/her handheld which helps the user navigate the mall; a coupons application; an inventory application; and/or a restaurant seating/ordering application. When the user travels to a different venue like a sports stadium, a different set of application may be needed to access the data available in that venue, e.g. a video application providing the user with videos of live action from the ongoing game; and a news application providing scores and statistics from games around the country. When a user moves between venues that have different services available, there are some fundamental problems: —upon entering a given venue, discovering what services are available—once the available services are known, presenting the appropriate applications for the user so that they may access those services. —once the user leaves the venue, cleaning up the applications (both to control dispersion of content and to free up resources on the wireless device).

A service layer may, for example, be provided as a channel over on broadcast or it may be accessed interactively via unicast. The service layer may provide information about which services are available in a given venue. For example, the service layer (or channel) may provide information about the applications are needed to access services and how to obtain such applications (available over a unicast connection at a specific URL or being broadcast over a broadcast system like FLO). The application information may contain metadata including an identification of which version of the application can be used on particular devices (to accommodate the multitude of devices and the fact that different devices probably need different builds of applications—ex. Windows mobile app vs Brew app). The application information may also contain management rules, for example: providing an expiration date for when the application must be deleted (ex. once the user leaves the venue, 2 days after the user leaves the venue); how long an application can have access to content (like video footage at sports games) downloaded through the application (ex. content deleted as soon as user leaves the venue, content available for a month after the user leaves the venue, etc.). Such applications may also be signed for security.

A management agent may be provided on the wireless device to interact with the service layer. Such a management agent may be configured to be running all the time or it may be manually or automatically activated upon entry to a venue. The management agent receives information from the service layer to identify and download the applications needed to access venue services based on user interest and device capabilities. The management agent may notify a user about the availability of such services via a popup on their device or similar means and may access the applications. Once the user is done accessing the applications or leaves the venue, the applications may be deleted based on the management rules.

While the foregoing disclosure discusses illustrative aspects and/or aspects, it should be noted that various changes and modifications could be made herein without departing from the scope of the described aspects and/or aspects as defined by the appended claims. Furthermore, although elements of the described aspects and/or aspects may be described or claimed in the singular, the plural is contemplated unless limitation to the singular is explicitly stated. Additionally, all or a portion of any aspect and/or aspects may be utilized with all or a portion of any other aspect and/or aspect, unless stated otherwise.

What is claimed is:

1. A method for discovery of a venue specific transmission, comprising:
   receiving an overhead signal from a non-venue network, wherein the overhead signal is received from a mobile broadcast network having a coverage area in which the venue is located;
   extracting information for receiving the venue specific transmission from the overhead signal;
   tuning to receive the venue specific transmission based on the extracted information;
   receiving the venue specific transmission during a first time slot in a mobile broadcast transmission; and
   receiving a transmission from the non-venue network during a second time slot that overlaps and extends beyond the first time slot.

2. The method of claim 1, further comprising:
   receiving the transmission from the non-venue network only on a reserved portion of a frequency band during the first time slot.

3. A method for discovery of a venue specific transmission, comprising:
   receiving an overhead signal from a non-venue network on a frequency band, wherein the overhead signal is received from a mobile broadcast network having a coverage area in which the venue is located;
   extracting information for receiving the venue specific transmission from the overhead signal, wherein the information for receiving the venue specific transmission includes information about a type of venue specific transmission and an energy ratio for the venue specific transmission; and
   tuning to receive the venue specific transmission based on the extracted information.

4. A method for discovery of a venue specific transmission, comprising:
   receiving an overhead signal from a non-venue network on a frequency band, wherein the overhead signal is received from a mobile broadcast network having a coverage area in which the venue is located;
   receiving a second overhead signal from a venue transmitter on the frequency band, wherein further identification information for the venue specific transmission is included within the second overhead signal;
   extracting information for receiving the venue specific transmission from the overhead signal; and
   tuning to receive the venue specific transmission based on the extracted information.

5. The method of claim 4, wherein the overhead signal from a non-venue transmitter is received during a first time slot and the second overhead signal from the venue transmitter is received during a second time slot reserved for venue transmission overhead information.

6. A method for discovery of a venue specific transmission, comprising:
   receiving a pilot positioning channel signal, wherein a first portion of the pilot positioning channel signal is received from a non-venue network and a second portion of the pilot positioning channel signal is received from a venue transmitter;
   receiving an overhead signal from the non-venue network on a frequency band, wherein the overhead signal is received from a mobile broadcast network having a coverage area in which the venue is located;
   extracting information for receiving the venue specific transmission from the overhead signal; and
   tuning to receive the venue specific transmission based on the extracted information.

7. The method of claim 6, wherein a third portion of the pilot positioning channel is reserved portion of the frequency band that is reserved for transmissions from the non-venue network during an inactive state.

8. The method of claim 6, further comprising:
   storing information regarding a geographic boundary for the venue transmission;
   monitoring a current location; and
   when the current location is within the geographic boundary for the venue transmission, searching for the venue transmission.

9. The method of claim 6, wherein the extracted information includes at least one of a frequency on which the venue transmission is transmitted, a venue identifier, a type of venue transmission, and information on obtaining a service guide for the venue transmission.

10. The method of claim 6, further comprising:
    detecting availability of a supplemental service guide; and
    requesting the supplemental service guide via one of a unicast, a scheduled multicast, and a scheduled broadcast.

11. An apparatus for receiving a venue specific transmission, comprising:
    means for receiving an overhead signal from a non-venue network, wherein the overhead signal is received from a mobile broadcast network having a coverage area in which the venue is located;
    means for extracting information for receiving the venue specific transmission from the overhead signal;
    means for tuning to receive the venue specific transmission based on the extracted information;

means for receiving the venue specific transmission during a first time slot in a mobile broadcast transmission; and means for receiving a transmission from the non-venue network during a second time slot that overlaps and extends beyond the first time slot.

12. The apparatus of claim 11, further comprising:
means for receiving the transmission from the non-venue network only on a reserved portion of a frequency band during the first time slot.

13. A computer program product, comprising:
a non-transitory computer-readable medium comprising:
code for causing a computer to receive an overhead signal from a non-venue network, wherein the overhead signal is received from a mobile broadcast network having a coverage area in which the venue is located;
code for causing a computer to extract information for receiving a venue specific transmission from the overhead signal;
code for causing a computer to tune to receive the venue specific transmission based on the extracted information;
code for causing a computer to receive the venue specific transmission during a first time slot in a mobile broadcast transmission; and
code for causing a computer to receive a transmission from the non-venue network during a second time slot that overlaps and extends beyond the first time slot.

14. The computer program product of claim 13, wherein the non-transitory computer-readable medium further comprises:
code for causing a computer to receive the transmission from the non-venue network only on a reserved portion of a frequency band during the first time slot.

15. An apparatus for receiving a venue specific transmission, comprising:
a receiver for receiving an overhead signal from a non-venue network, wherein the overhead signal is received from a mobile broadcast network having a coverage area in which the venue is located, the receiver is configured to receive the venue specific transmission during a first time slot in a mobile broadcast transmission, and the receiver is configured to receive a transmission from the non-venue network during a second time slot that overlaps and extends beyond the first time slot;
a processor for extracting information for receiving the venue specific transmission from the overhead signal; and
a communications component for tuning to receive the venue specific transmission over resources reserved only for venue specific transmission.

16. The apparatus of claim 15, wherein the receiver receives at least a portion of the non-venue network transmission and the venue specific transmission on a frequency band, and wherein the receiver is configured to receive the transmission from the non-venue network only on a reserved portion of a frequency band during the first time slot.

17. An apparatus for receiving a venue specific transmission, comprising:
a receiver for receiving an overhead signal on a frequency band from a non-venue network, wherein the overhead signal is received from a mobile broadcast network having a coverage area in which the venue is located, and the receiver is configured to receive the venue specific transmission on at least a portion of the frequency band;

a processor for extracting information for receiving the venue specific transmission from the overhead signal, wherein the information for receiving the venue specific transmission includes information about a type of venue specific transmission and an energy ratio for the venue specific transmission; and
a communications component for tuning to receive the venue specific transmission over resources reserved only for venue specific transmission.

18. An apparatus for receiving a venue specific transmission, comprising:
a receiver for receiving an overhead signal on a frequency band from a non-venue network, wherein the overhead signal is received from a mobile broadcast network having a coverage area in which the venue is located, the receiver is configured to receive the venue specific transmission on at least a portion of the frequency band, the receiver is configured to receive a second overhead signal from a venue transmitter on the frequency band, and further identification information for the venue specific transmission is included within the second overhead signal;
a processor for extracting information for receiving the venue specific transmission from the overhead signal; and
a communications component for tuning to receive the venue specific transmission over resources reserved only for venue specific transmission.

19. The apparatus of claim 18, wherein the overhead signal from a non-venue transmitter is received during a first time slot and the overhead signal from the venue transmitter is received during a second time slot reserved for venue transmission overhead information.

20. An apparatus for receiving a venue specific transmission, comprising:
a receiver for receiving an overhead signal on a frequency band from a non-venue network, wherein the overhead signal is received from a mobile broadcast network having a coverage area in which the venue is located, the receiver is configured to receive the venue specific transmission on at least a portion of the frequency band and a pilot positioning channel signal, wherein a first portion of the pilot positioning channel signal is received from the non-venue network and a second portion of the pilot positioning channel signal is received from a venue transmitter;
a processor for extracting information for receiving the venue specific transmission from the overhead signal; and
a communications component for tuning to receive the venue specific transmission over resources reserved only for venue specific transmission.

21. The apparatus of claim 20, wherein a third portion of the pilot positioning channel is reserved portion of the frequency band that is reserved for transmissions from the non-venue network during an inactive state.

22. The apparatus of claim 20, further comprising:
memory storing information regarding a geographic boundary for the venue transmission;
a location determination component configured to monitor a current location of the apparatus; and
a service detection component configured to search for the venue specific transmission when the current location is within the geographic boundary for the venue specific transmission.

23. The apparatus of claim 20, wherein the extracted information includes at least one of a frequency on which the venue transmission is transmitted, a venue identifier, a type of venue transmission, and information on obtaining a service guide for the venue transmission.

24. The apparatus of claim 20, further comprising:
a service guide component for detecting availability of a supplemental service guide, wherein the service guide component is further configured to request the supplemental service guide via one of a unicast, a scheduled multicast, and a scheduled broadcast.

25. An apparatus for discovery of a venue specific transmission, comprising:
means for receiving an overhead signal from a non-venue network on a frequency band, wherein the overhead signal is received from a mobile broadcast network having a coverage area in which the venue is located;
means for extracting information for receiving the venue specific transmission from the overhead signal, wherein the information for receiving the venue specific transmission includes information about a type of venue specific transmission and an energy ratio for the venue specific transmission; and
means for tuning to receive the venue specific transmission based on the extracted information.

26. An apparatus for discovery of a venue specific transmission, comprising:
means for receiving an overhead signal from a non-venue network on a frequency band, wherein the overhead signal is received from a mobile broadcast network having a coverage area in which the venue is located;
means for receiving a second overhead signal from a venue transmitter on the frequency band, wherein further identification information for the venue specific transmission is included within the second overhead signal;
means for extracting information for receiving the venue specific transmission from the overhead signal; and
means for tuning to receive the venue specific transmission based on the extracted information.

27. The apparatus of claim 26, wherein the overhead signal from a non-venue transmitter is received during a first time slot and the second overhead signal from the venue transmitter is received during a second time slot reserved for venue transmission overhead information.

28. An apparatus for discovery of a venue specific transmission, comprising:
means for receiving a pilot positioning channel signal, wherein a first portion of the pilot positioning channel signal is received from a non-venue network and a second portion of the pilot positioning channel signal is received from a venue transmitter;
means for receiving an overhead signal from the non-venue network on a frequency band, wherein the overhead signal is received from a mobile broadcast network having a coverage area in which the venue is located;
means for extracting information for receiving the venue specific transmission from the overhead signal; and
means for tuning to receive the venue specific transmission based on the extracted information.

29. The apparatus of claim 28, wherein a third portion of the pilot positioning channel is reserved portion of the frequency band that is reserved for transmissions from the non-venue network during an inactive state.

30. A computer program product, comprising:
a non-transitory computer-readable medium comprising:
code for causing a computer to receive an overhead signal from a non-venue network on a frequency band, wherein the overhead signal is received from a mobile broadcast network having a coverage area in which the venue is located;
code for causing a computer to extract information for receiving a venue specific transmission from the overhead signal, wherein the information for receiving the venue specific transmission includes information about a type of venue specific transmission and an energy ratio for the venue specific transmission; and
code for causing a computer to tune to receive the venue specific transmission based on the extracted information.

31. A computer program product, comprising:
a non-transitory computer-readable medium comprising:
code for causing a computer to receive an overhead signal from a non-venue network on a frequency band, wherein the overhead signal is received from a mobile broadcast network having a coverage area in which the venue is located;
code for causing a computer to receive a second overhead signal from a venue transmitter on the frequency band, wherein further identification information for a venue specific transmission is included within the second overhead signal;
code for causing a computer to extract information for receiving the venue specific transmission from the overhead signal; and
code for causing a computer to tune to receive the venue specific transmission based on the extracted information.

32. The computer program product of claim 31, wherein the overhead signal from a non-venue transmitter is received during a first time slot and the second overhead signal from the venue transmitter is received during a second time slot reserved for venue transmission overhead information.

33. A computer program product, comprising:
a non-transitory computer-readable medium comprising:
code for causing a computer to receive a pilot positioning channel signal, wherein a first portion of the pilot positioning channel signal is received from a non-venue network and a second portion of the pilot positioning channel signal is received from a venue transmitter;
code for causing a computer to receive an overhead signal from the non-venue network on a frequency band, wherein the overhead signal is received from a mobile broadcast network having a coverage area in which the venue is located;
code for causing a computer to extract information for receiving a venue specific transmission from the overhead signal; and
code for causing a computer to tune receive the venue specific transmission based on the extracted information.

34. The computer program product of claim 33, wherein a third portion of the pilot positioning channel is reserved portion of the frequency band that is reserved for transmissions from the non-venue network during an inactive state.

* * * * *